United States Patent
Guo

(10) Patent No.: US 11,343,777 B2
(45) Date of Patent: May 24, 2022

(54) METHOD AND APPARATUS FOR MULTI-ANTENNA TRANSMISSION IN VEHICLE TO VEHICLE COMMUNICATION

(71) Applicant: Samsung Electronics Co., Ltd., Suwon-si (KR)

(72) Inventor: Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/247,328

(22) Filed: Dec. 7, 2020

(65) Prior Publication Data

US 2021/0092688 A1 Mar. 25, 2021

Related U.S. Application Data

(63) Continuation of application No. 16/508,204, filed on Jul. 10, 2019, now Pat. No. 10,863,447.

(51) Int. Cl.
*H04W 52/24* (2009.01)
*H04W 76/14* (2018.01)
(Continued)

(52) U.S. Cl.
CPC ........ *H04W 52/241* (2013.01); *H04B 17/327* (2015.01); *H04L 1/1812* (2013.01); *H04W 76/14* (2018.02); *H04W 92/18* (2013.01)

(58) Field of Classification Search
CPC ... H04W 52/241; H04W 76/14; H04W 92/18; H04W 52/346; H04W 52/383;
(Continued)

(56) References Cited

U.S. PATENT DOCUMENTS

2017/0078863 A1* 3/2017 Kim ............... H04W 48/16
2017/0367056 A1 12/2017 Wei

FOREIGN PATENT DOCUMENTS

EP       3225044 A1    10/2017
WO   2016/085624 A1     6/2016

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.7.0 (Sep. 2015), 165 pages.
(Continued)

*Primary Examiner* — Shaima Q Aminzay

(57) ABSTRACT

A method of a user equipment (UE) in a wireless communication system is provided. The method comprises: receiving, from a base station (BS), configuration information for a power control of a sidelink and a downlink reference signal (RS) to measure a downlink channel from the BS, wherein the sidelink is established between the UE and another UE; receiving, from the BS, the downlink RS based on the configuration information; calculating a first pathloss for the downlink channel between the UE and the BS based on the configuration information; identifying a second pathloss for the sidelink between the UE and the other UE; and transmitting, to the other UE, a physical sidelink shared channel (PSSCH) and a physical sidelink control channel (PSCCH) based on the first pathloss and the second pathloss.

20 Claims, 23 Drawing Sheets

Related U.S. Application Data

(60) Provisional application No. 62/783,472, filed on Dec. 21, 2018, provisional application No. 62/754,269, filed on Nov. 1, 2018, provisional application No. 62/750,965, filed on Oct. 26, 2018, provisional application No. 62/734,472, filed on Sep. 21, 2018, provisional application No. 62/729,128, filed on Sep. 10, 2018, provisional application No. 62/719,788, filed on Aug. 20, 2018, provisional application No. 62/764,842, filed on Aug. 16, 2018, provisional application No. 62/696,686, filed on Jul. 11, 2018.

(51) Int. Cl.
*H04L 1/18* (2006.01)
*H04B 17/327* (2015.01)
*H04W 92/18* (2009.01)

(58) Field of Classification Search
CPC .............. H04W 52/146; H04W 52/242; H04B 17/327; H04L 1/1812; H04L 1/0026; H04L 1/0029; H04L 1/1861; H04L 1/20; H04L 5/005; H04L 5/0051; H04L 5/0053; H04L 5/0048
USPC ......................................................... 455/522
See application file for complete search history.

(56) References Cited

OTHER PUBLICATIONS

Huawei, HiSilicon, "Power control for V2V", 3GPP TSG RAN WG1 Meeting #85, May 23-27, 2016, R1-164855, 8 pages.
Supplementary European Search Report dated Jul. 13, 2021 in connection with European Patent Application No. 19 83 4460, 13 pages.

\* cited by examiner

METHOD AND APPARATUS FOR MULTI-ANTENNA TRANSMISSION IN VEHICLE TO VEHICLE COMMUNICATION

CROSS-REFERENCE TO RELATED APPLICATIONS AND CLAIM OF PRIORITY

This application is a continuation of U.S. patent application Ser. No. 16/508,204, filed on Jul. 10, 2019, which claims priority to U.S. Provisional Patent Application No. 62/696,686, filed on Jul. 11, 2018; U.S. Provisional Patent Application No. 62/764,842, filed on Aug. 16, 2018; U.S. Provisional Patent Application No. 62/719,788, filed on Aug. 20, 2018; U.S. Provisional Patent Application No. 62/729,128, filed on Sep. 10, 2018; U.S. Provisional Patent Application No. 62/734,472, filed on Sep. 21, 2018; U.S. Provisional Patent Application No. 62/750,965, filed on Oct. 26, 2018; U.S. Provisional Patent Application No. 62/754,269, filed on Nov. 1, 2018; and U.S. Provisional Patent Application No. 62/783,472, filed on Dec. 21, 2018. The content of the above-identified patent document is incorporated herein by reference.

TECHNICAL FIELD

The present application relates generally to wireless communication systems, more specifically, the present disclosure relates to multi-antenna transmission in vehicle to vehicle communication.

BACKGROUND

The present disclosure relates to a pre-$5^{th}$-generation (5G) or 5G communication system to be provided for supporting higher data rates beyond $4^{th}$-generation (4G) communication system such as long term evolution (LTE). A communication system includes a downlink (DL) that conveys signals from transmission points such as base stations (BSs) or NodeBs to user equipments (UEs) and an uplink (UL) that conveys signals from UEs to reception points such as NodeBs. Additionally, a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as E-UTRAN (Evolved Universal Terrestrial Access Network).

SUMMARY

The present disclosure relates to a pre-5th-Generation or 5G communication system to be provided for supporting vehicle to vehicle communication. Embodiments of the present disclosure provide transmission structures and format in advanced communication systems.

In one embodiment, a user equipment (UE) in a wireless communication system is provided. The UE comprises a transceiver configured to receive, from a base station (BS), configuration information for a power control of a sidelink and a downlink reference signal (RS) to measure a downlink channel from the BS, wherein the sidelink is established between the UE and another UE; and receive, from the BS, the downlink RS based on the configuration information. The UE further comprises at least one processor operably connected to the transceiver, the at least one processor configured to calculate a first pathloss for the downlink channel between the UE and the BS based on the configuration information; and identify a second pathloss for the sidelink between the UE and the other UE, wherein the transceiver is further configured to transmit, to the other UE, a physical sidelink shared channel (PSSCH) and a physical sidelink control channel (PSCCH) based on the first pathloss and the second pathloss.

In another embodiment, a base station (BS) in a wireless communication system is provided. The BS comprises a transceiver configured to transmit, to a user equipment (UE), configuration information for a power control of a sidelink and a downlink reference signal (RS) to measure a downlink channel from the BS, wherein the sidelink is established between the UE and another UE; and transmit, to the UE, the downlink RS based on the configuration information, wherein a first pathloss for the downlink channel between the UE and the BS is based on the configuration information, and a second pathloss for the sidelink between the UE and the other UE is determined for a physical sidelink shared channel (PSSCH) and a physical sidelink control channel (PSCCH) via the sidelink.

In yet another embodiment, a method of a user equipment (UE) in a wireless communication system is provided. The method comprises: receiving, from a base station (BS), configuration information for a power control of a sidelink and a downlink reference signal (RS) to measure a downlink channel from the BS, wherein the sidelink is established between the UE and another UE; receiving, from the BS, the downlink RS based on the configuration information; calculating a first pathloss for the downlink channel between the UE and the BS based on the configuration information; identifying a second pathloss for the sidelink between the UE and the other UE; and transmitting, to the other UE, a physical sidelink shared channel (PSSCH) and a physical sidelink control channel (PSCCH) based on the first pathloss and the second pathloss.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v15.0.0, "E-UTRA, Physical channels and modulation;" 3GPP TS 36.212 v15.0.0, "E-UTRA, Multiplexing and Channel coding;" 3GPP TS 36.213 v15.0.0, "E-UTRA, Physical Layer Procedures;" 3GPP TS 36.321 v15.0.0, "E-UTRA, Medium Access Control (MAC) protocol specification;" and 3GPP TS 36.331 v15.0.0, "E-UTRA, Radio Resource Control (RRC) Protocol Specification."

Figure 1:
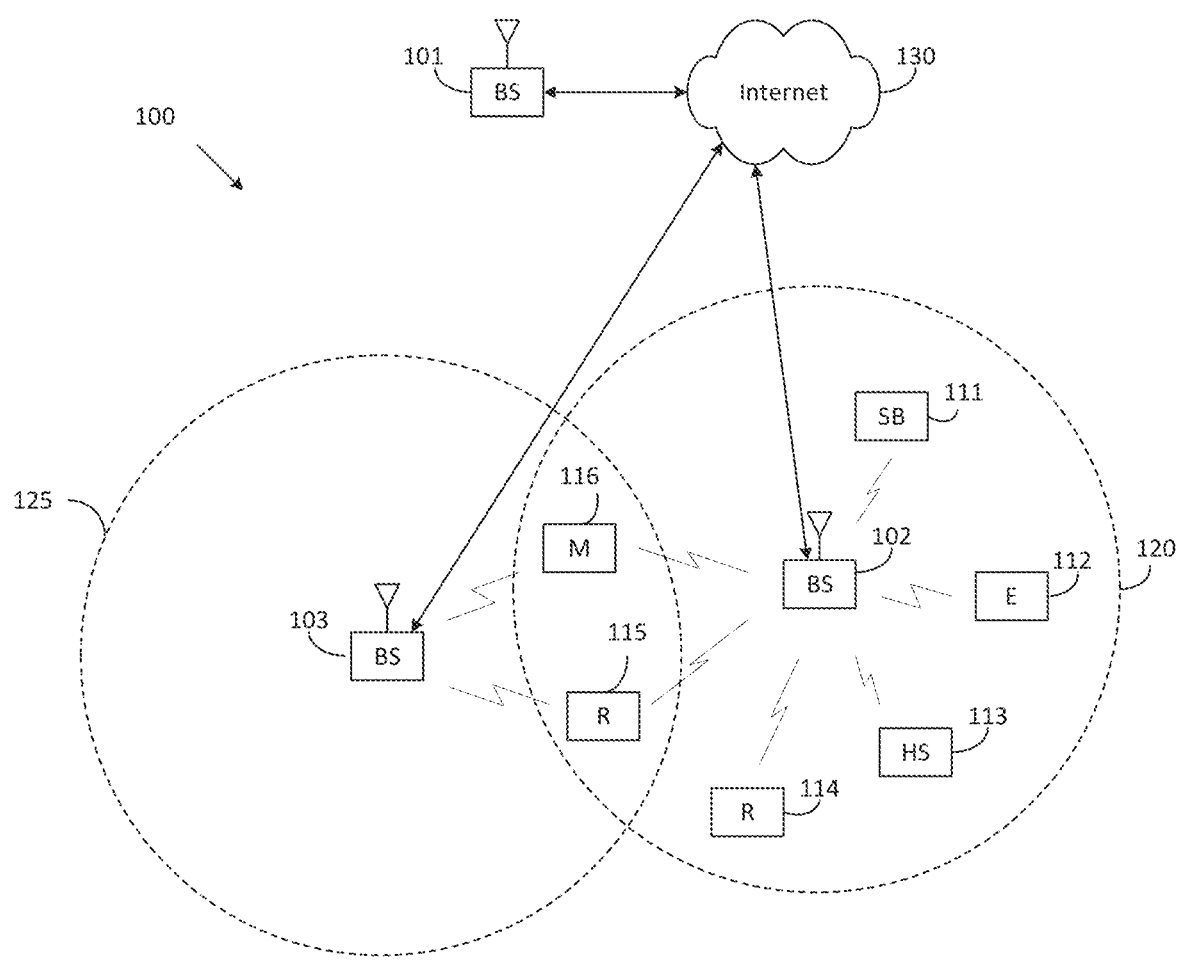
FIG. 1 illustrates an example wireless network according to embodiments of the present disclosure.
Figure 2:
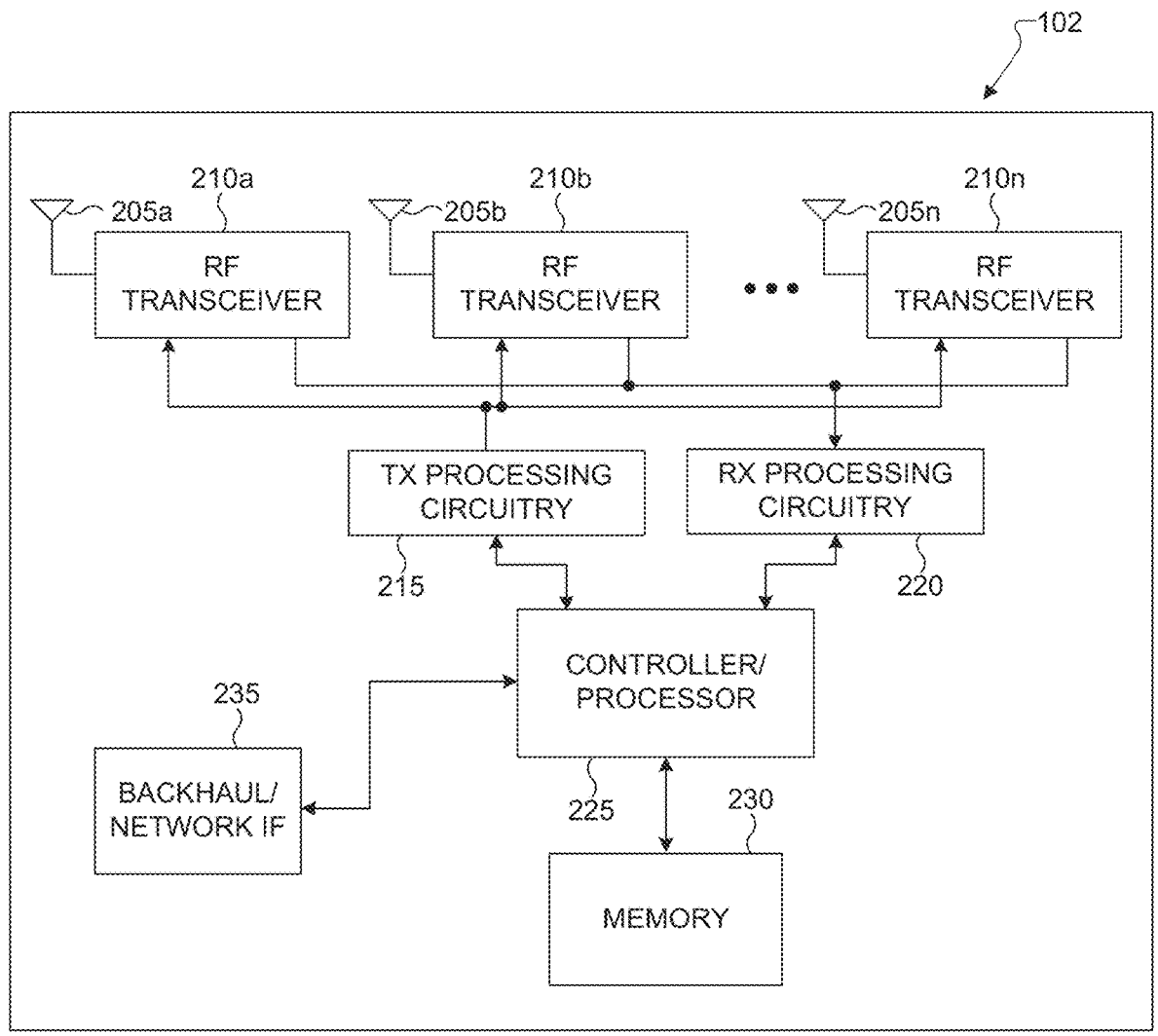
FIG. 2 illustrates an example gNB according to embodiments of the present disclosure.
Figure 3:
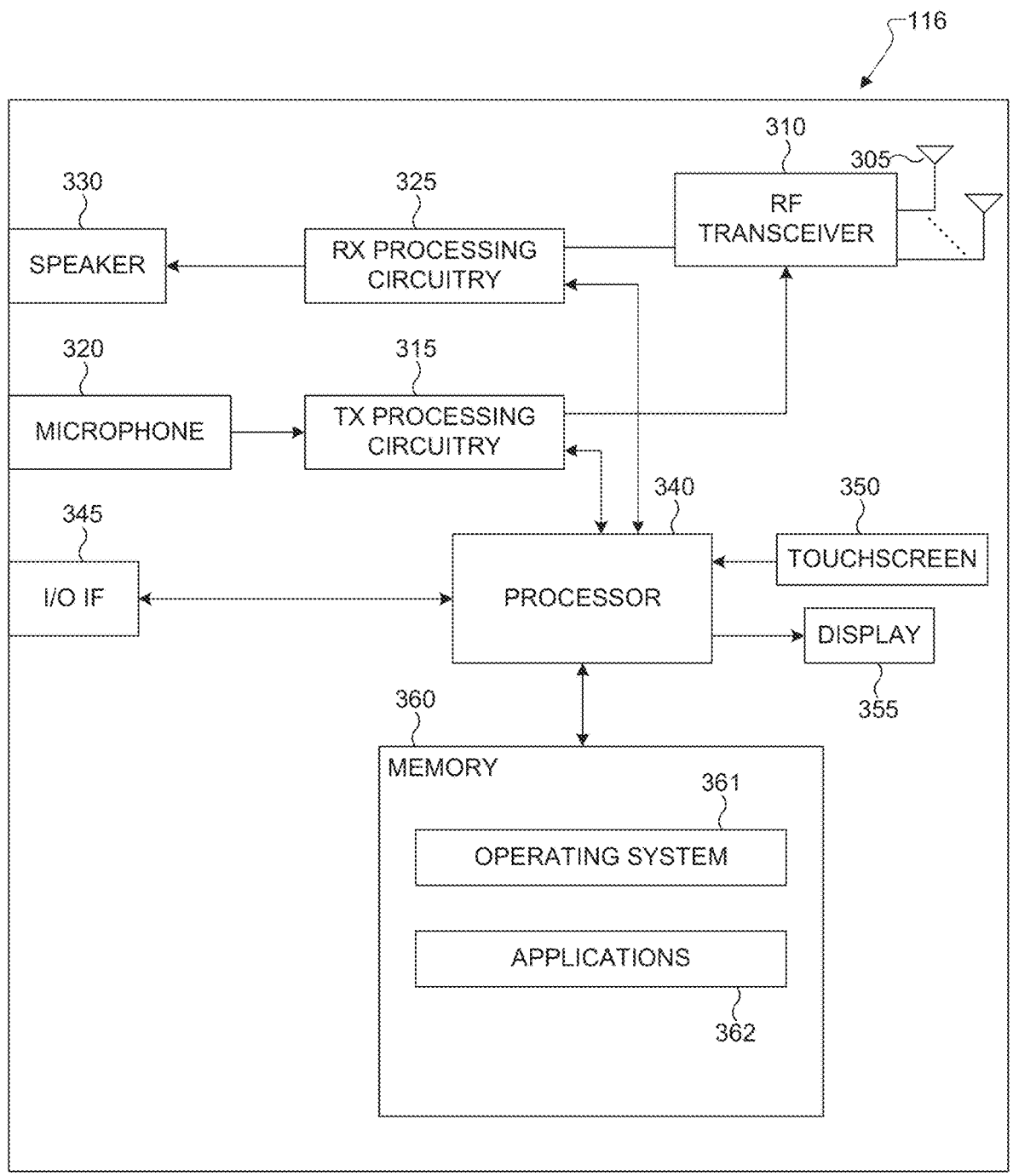
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient multi-antenna transmission in vehicle to vehicle communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to vehicular communication network protocols, including vehicle-to-device, vehicle-to-vehicle, and vehicle-to-network communication resource allocation and synchronization schemes. A communication system includes a downlink (DL) that conveys signals from transmission points such as base stations (BSs) or NodeBs to user equipments (UEs) and an uplink (UL) that conveys signals from UEs to reception points such as NodeBs.

Additionally, a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as an evolved universal terrestrial access network (E-UTRAN).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH). Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection.

A NodeB transmits one or more of multiple types of RS including a UE-common RS (CRS), a channel state information RS (CSI-RS), or a DeModulation RS (DMRS). A CRS is transmitted over a DL system bandwidth (BW) and can be used by UEs to obtain a channel estimate to demodulate data or control information or to perform measurements. To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

Figure 4:
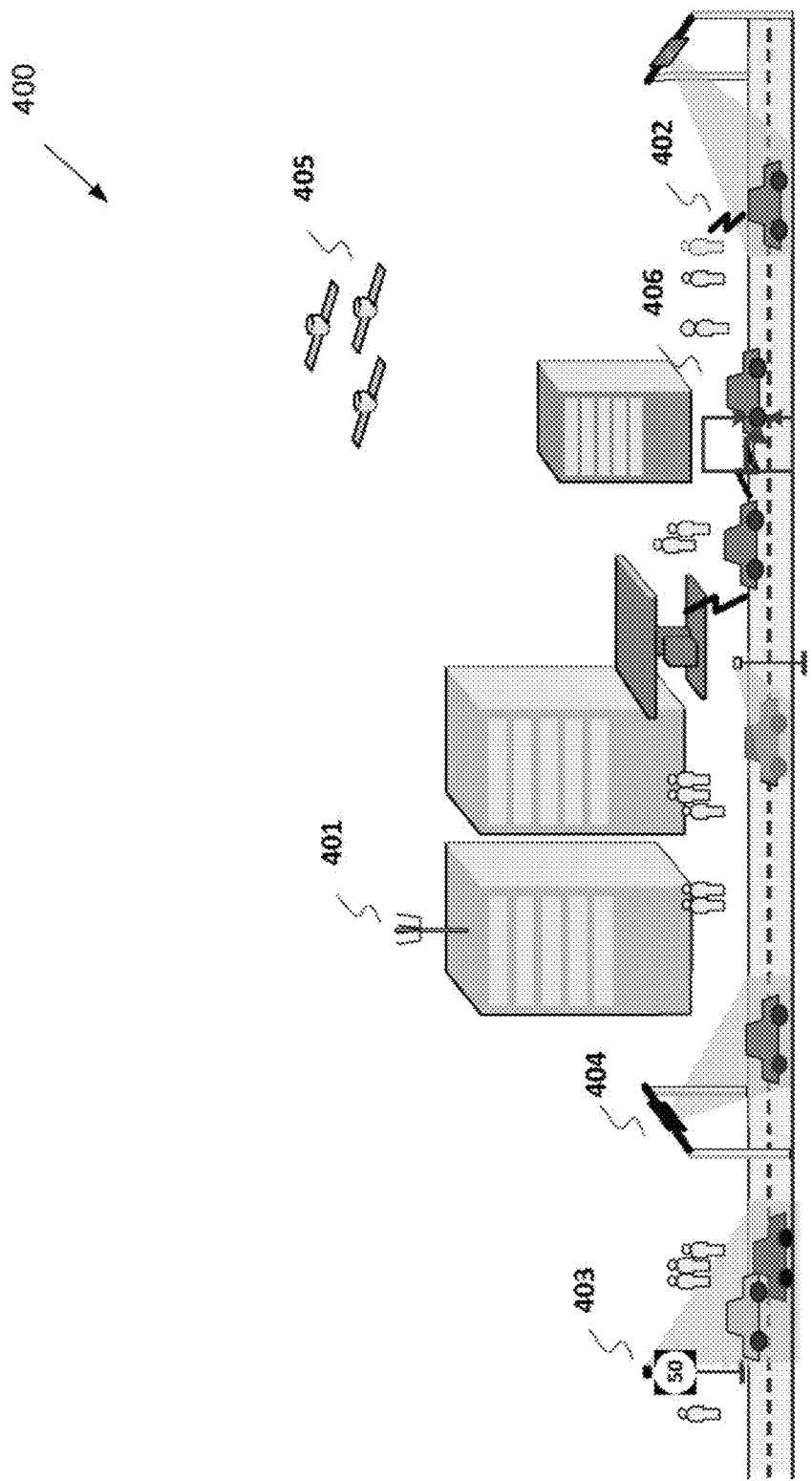
FIG. 4 illustrates an example use case of a vehicle-centric communication network according to embodiments of the present disclosure.

While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems. FIG. 4 illustrates an example use case of a vehicle-centric communication network according to illustrative embodiments of the present disclosure.

FIG. 4 illustrates an example use case of a vehicle-centric communication network 400 according to embodiments of the present disclosure. The embodiment of the use case of a vehicle-centric communication network 400 illustrated in FIG. 4 is for illustration only. FIG. 4 does not limit the scope of the present disclosure to any particular implementation.

The vehicular communication, referred to as Vehicle-to-Everything (V2X), contains the following three different types: vehicle-to-vehicle (V2V) communications; vehicle-to-infrastructure (V2I) communications; and vehicle-to-pedestrian (V2P) communications.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X communication can be used to implement several types of services that are complementary to a primary communication network or to provide new services based on a flexibility of a network topology. V2X can support unicasting, broadcasting, or group/multicasting as potential means for V2V communication 100 where vehicles are able to transmit messages to all in-range V2V-enabled devices or to a subset of devices that are members of particular group. The protocol can be based on LTE-D2D or on a specialized LTE-V2V protocol.

As illustrated in FIG. 4, V2X can support V2I communication 401 between one or more vehicles and an infrastructure node to provide cellular connectivity as well as specialized services related to control and safety of vehicular traffic. V2P communication 402 can also be supported, for example to provide safety services for pedestrians or traffic management services. V2X multicast communication 403 can be used to provide safety and control messages to large numbers of vehicles in a spectrally efficient manner.

The two primary standardized messages for V2V/V2I communication are the periodic beacons called cooperative awareness messages (CAM) and the event-triggered warning messages, called decentralized environment notification messages (DENM). The CAMs are periodically broadcasted beacons used to maintain awareness of the surrounding vehicles. These messages are sent with an adaptive frequency of 1-10 Hz. The CAMs include information such as position, type and direction. The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 404 can be supported such as, for example, traffic tracking beacons. Satellite-based communication 405 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface. SL communication is defined as a functionality enabling proximity services (ProSe) Direct Communication between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the MNO. However, UEs supporting V2V Service can exchange such information when served by or not served by E-UTRAN which supports V2X Service. The UE supporting V2V applications transmits application layer information (e.g., about the UE's location, dynamics, and attributes as part of the V2V Service).

The V2V payload must be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 5:
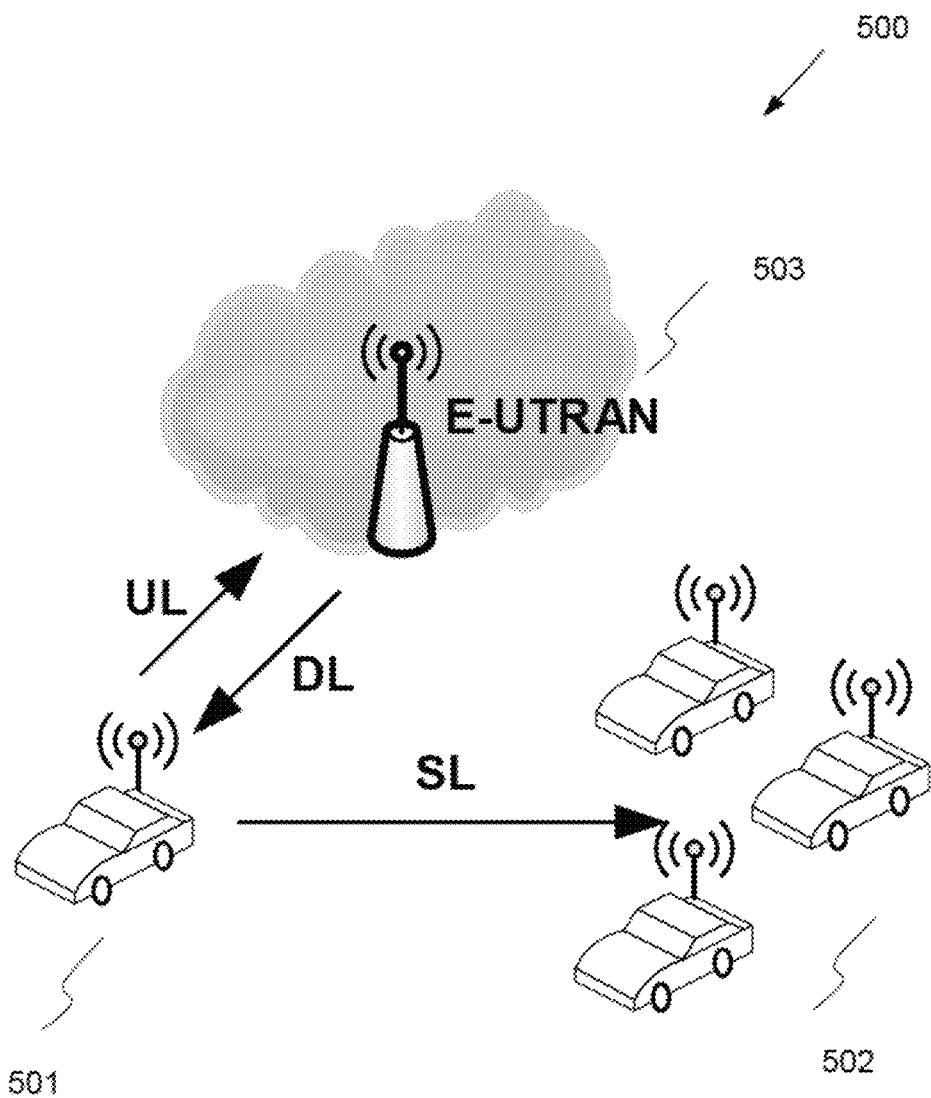
FIG. 5 illustrates an example SL interface according to embodiments of the present disclosure.

FIG. 5 illustrates an example SL interface 500 according to embodiments of the present disclosure. The embodiment of the SL interface 500 illustrated in FIG. 5 is for illustration only. FIG. 5 does not limit the scope of the present disclosure to any particular implementation.

FIG. 5 illustrates an example SL interface according to illustrative embodiments of the present disclosure. While UL designates the link from UE 501 to NodeB 503 and DL designates the reverse direction, SL designates the radio links over the PC5 interfaces between UE 501 and UEs 502. A UE 501 transmits a V2V message to multiple UEs 502 in the SL. SL communication happens directly without using E-UTRAN technology and not traversing any network node NodeB 503.

The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

SL transmission and reception occurs with resources assigned to a group of devices. A resource pool (RP) is a set of resources assigned for sidelink operation. It consists of the subframes and the resource blocks within the subframe. For SL communication, two additional physical channels are introduced: physical sidelink control channel (PSCCH) carrying the control information, and physical sidelink shared channel (PSSCH) carrying the data.

Figure 6:
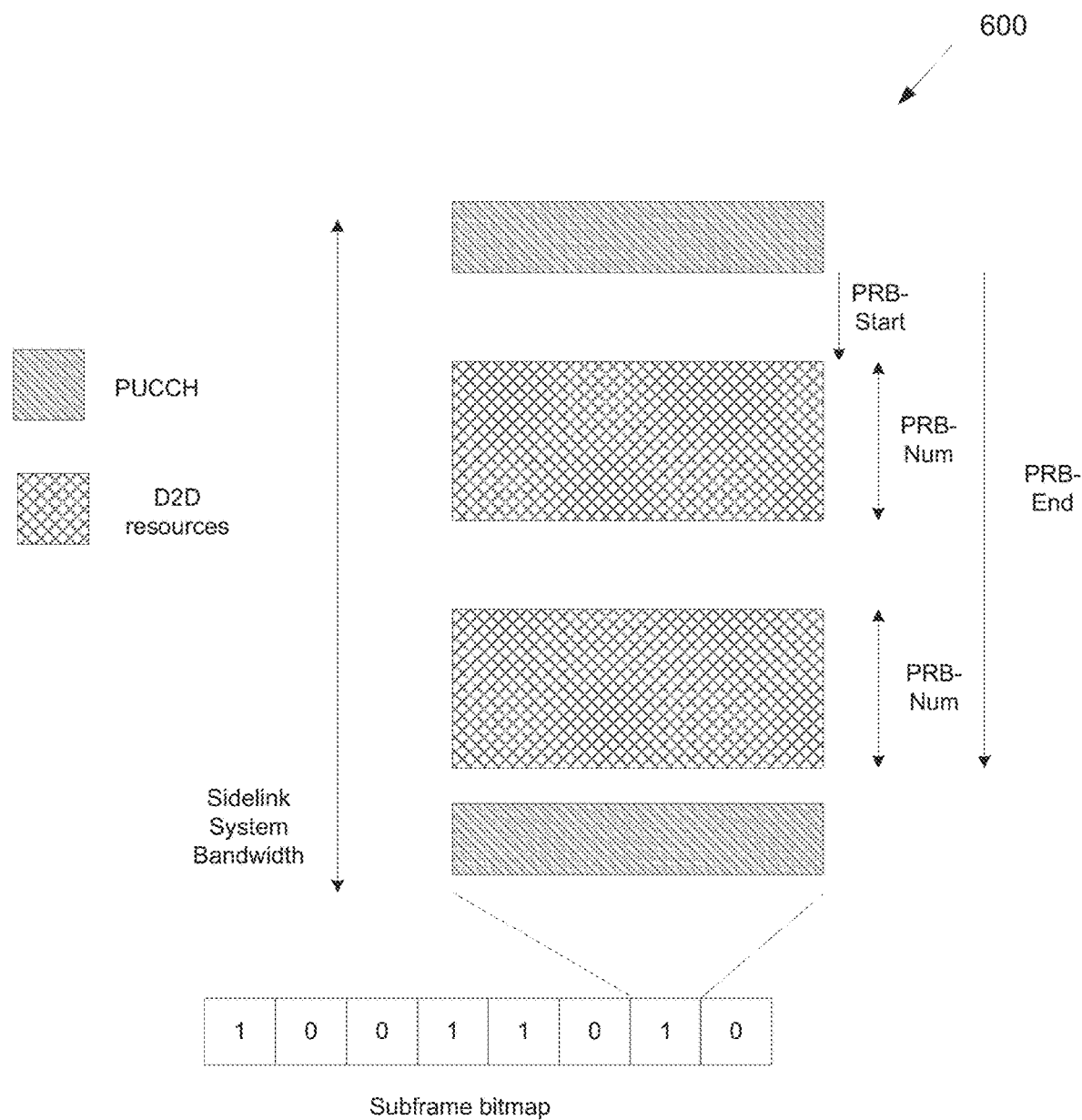
FIG. 6 illustrates an example resource pool for PSCCH according to embodiments of the present disclosure.

FIG. 6 illustrates an example resource pool for PSCCH 600 according to embodiments of the present disclosure. The embodiment of the resource pool for PSCCH 600 illustrated in FIG. 6 is for illustration only. FIG. 6 does not limit the scope of the present disclosure to any particular implementation.

FIG. 6 illustrates an example resource pool for PSCCH according to illustrative embodiments of the present disclosure. In one example, the pool is defined in the frequency, by parameters: PRBnum: that defines the frequency range in Physical Resource Block (PRB) bandwidth units; and PRBstart, PRBend: which defines the location in the frequency domain within the uplink band. In one example, the pool is defined in the time domain, by a bitmap that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

All the parameters needed to define the resource pool are broadcasted in a system information block (SIB) by the network. The devices which are not within coverage (and hence cannot acquire the SIB) may use some pre-configured values internally stored. The PSCCH is used by the V2X transmitting UE to make the members of the group aware of the next data transmission that may occur on the PSSCH. The V2X transmitting UE sends the sidelink control information (SCI) format 1 on the PSCCH as shown in TABLE 1.

TABLE 1

Sidelink control information

| Parameter | Usage and Notes |
|---|---|
| Priority | 3 bits |
| Resource reservation | 4 bits |
| Frequency resource location of initial transmission and retransmission | give the receiving devices information about the resources of the PSSCH that may be decoded in the frequency domain |
| Time gap between initial transmission and retransmission | 4 bits |
| Modulation and coding scheme | 5 bits |
| Retransmission index | 1 bit to indicate first or second transmission |
| Reserved information bits | To make the size of SCI format 1 to be 32 bits |

Devices interested in receiving V2X services blindly scan the whole PSCCH pool to search if a SCI format matching their group identifier can be detected. On the transmitting device side, resources to transmit the SCI format information may be selected within the PSCCH pool.

There are two types of resource pools: reception resource pools (Rx RPs) and transmission resource pools (Tx RPs). These are either signaled by the NodeB for in-coverage case or a pre-configured value is used for the out-of-coverage case. Within a cell, there may be more Rx RPs than Tx RPs to enable reception from adjacent cells or from out-of-coverage UEs.

Two modes of resource allocation have been defined for V2X communication: mode 3 that is also referred as "scheduled resource allocation" and mode 4 that is also referred as "UE autonomous resource selection". In mode 3, transmission of V2X on sidelink is scheduled by NodeB. The UE receives DCI format 5A from the NodeB and then sends SCI format 1 over the resources indicated by DCI format 5A that is illustrated in TABLE 2.

TABLE 2

DCI format and usage

| Parameter | Usage and Notes |
|---|---|
| Carrier indicator | Carrier indicator to support cross carrier scheduling |
| Lowest index of the subchannel allocation to the initial transmission | The resource allocation for PSCCH on V2X sidelink |
| SCI format 1 fields | The resource allocation for PSCH |
| SL index | 2 bits |
| SL SPS configuration index | 3 bits Configure the SPS transmission on sidelink |
| Activation/release indication | 1bits to activate or release the SPS transmission on sidelink |

In LTE V2X, the data transmission on sidelink does not support HARQ. There is no ACK or NACK feedback for a PSSCH transmission. To improve the transmission reliability, re-transmission is one good approach.

Figure 7:
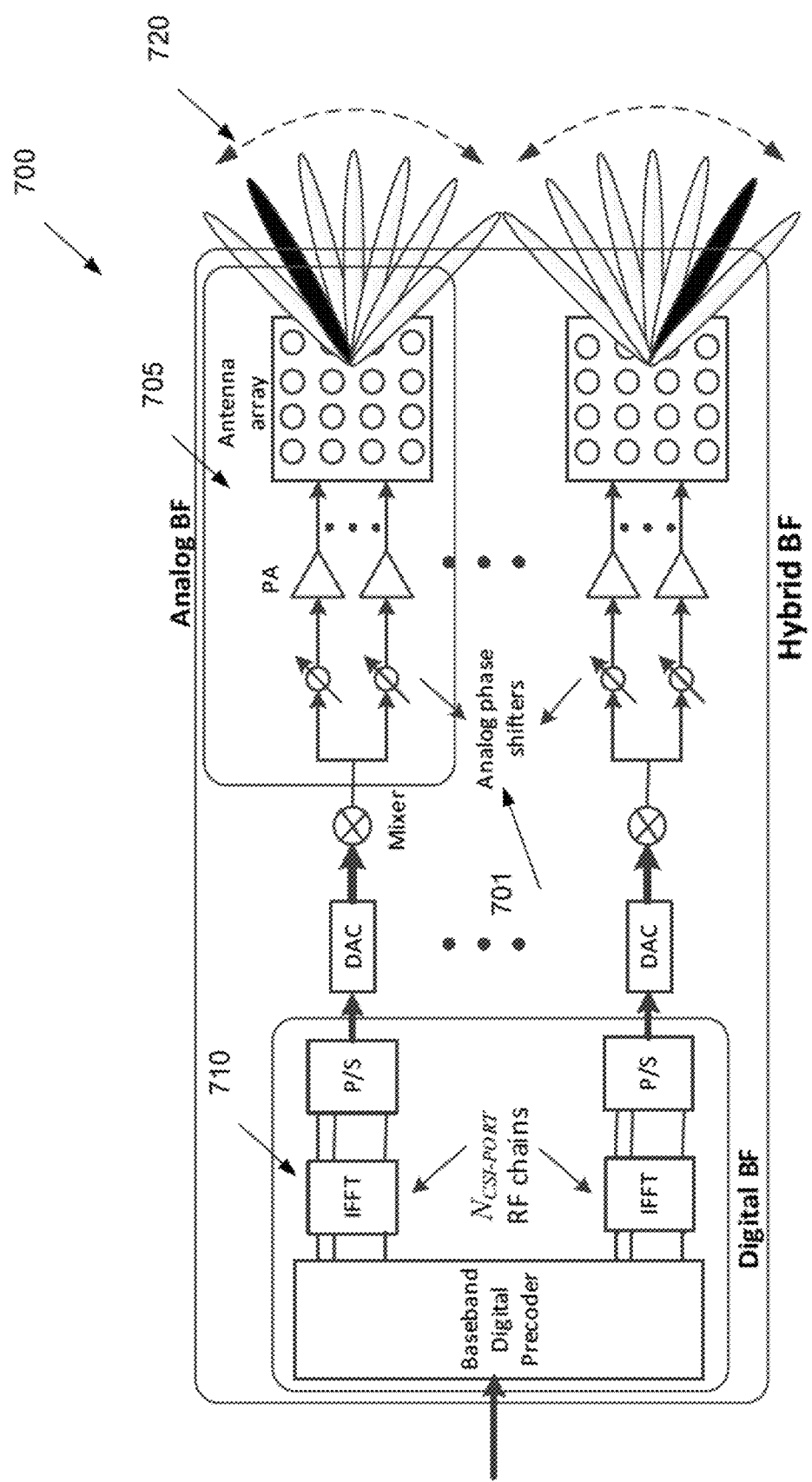
FIG. 7 illustrates an example RF chain according to embodiments of the present disclosure.

FIG. 7 illustrates an example RF chain 700 according to embodiments of the present disclosure. The embodiment of the RF chain 700 illustrated in FIG. 7 is for illustration only. FIG. 7 does not limit the scope of the present disclosure to any particular implementation.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles (720) by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks.

In the present disclosure, the schemes of multi-antenna transmission on sidelink are provided.

In some embodiments, multi-antenna-based transmission scheme can be used for the transmission on sidelink from one UE to another one UE or multiple UEs. One example of multi-antenna transmission scheme can be spatial multiplexing, i.e., multiple layers can be transmitted, or called MIMO transmission (multi-input multi-output). One example of multi-antenna transmission scheme can be some transmit diversity schemes, for example STC (space time coding) schemes and cyclic-delay diversity schemes.

Multi-antenna-based transmission scheme can provide the following benefits for sidelink transmission of vehicle-to-vehicle or everything (V2X) communications. In one example of increase the data throughput, new use cases for V2X communication requires up to 1 Gbps data rate. Multi-antenna transmission would be a necessary component to achieve that. In one example of 5G, 100 MHz bandwidth with 64QAM can roughly provide 290 Mbps. To achieve ~1 Gpbs, MIMO transmission with 4 layers would be needed.

In one example of reduce the interference, with multi-antenna transmission, the transmitter UE (or vehicle) can beamform his transmission to particular direction(s), instead of transmitting to an omni-direction. That can reduce the interference to the transmission of other vehicles.

In one example of boost the link reliability of sidelink transmission, beamforming on transmitted signals can boost the signal-to-interference noise ratio and thus boost the reliability of sidelink transmission. Reducing the interference can also boost the reliability of sidelink transmission.

In one embodiment, a UE can choose the multi-antenna transmission scheme for a transmission on sidelink in an autonomous mode. A UE can choose the multi-antenna transmission based on the traffic type, the channel measurement of surrounding sidelink, whether the transmission is unicast/broadcast/multi-cast, the occupancy of resource pools, etc. Then in the scheduling assignment sent on sidelink to indicate the transmission of data packet on sidelink, the UE can indicate one or more of the following information elements.

In one example of the transmission scheme, a UE can indicate spatial multiplexing with two or more layers, some transmit diversity scheme (for example CDD, space frequency block coding (SFB), space time block coding (STBC)), single-port or single layer transmission.

In one example, a number of layers is transmitted and a UE can indicate 2, 3, 4 . . . layers are used in the transmission.

In one example of a number of codewords or the number transport blocks, the number of codewords or the number transport blocks can be limited that the transmission on sidelink is always one codeword. In one example, some information bit in scheduling assignment message can indicate whether 1 or 2 codewords are transmitted.

Figure 8:
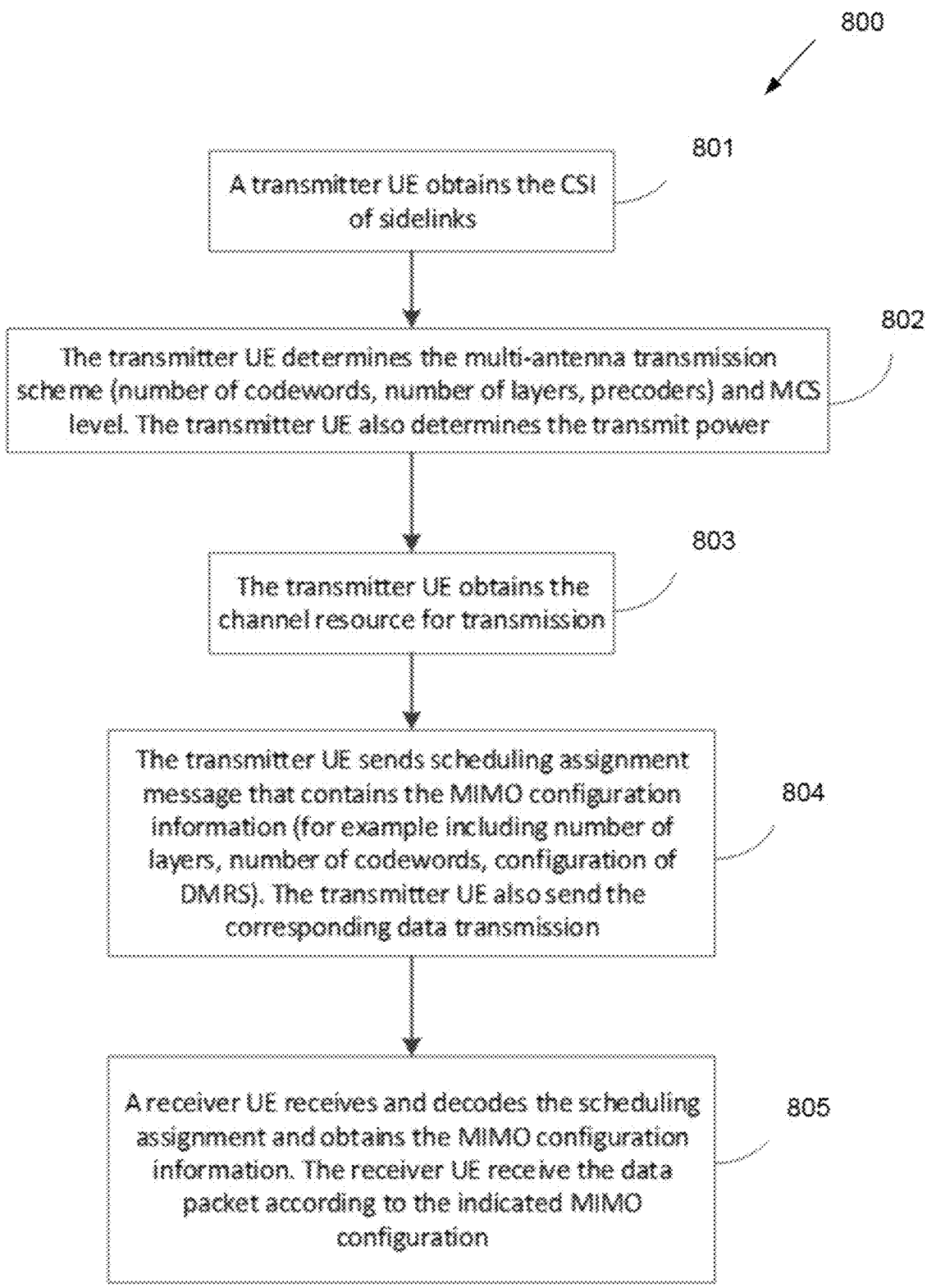
FIG. 8 illustrates a flow chart of a method for MIMO transmission on sidelink according to embodiments of the present disclosure.

FIG. 8 illustrates a flow chart of a method 800 for MIMO transmission on sidelink according to embodiments of the present disclosure. The embodiment of the method 800 illustrated in FIG. 8 is for illustration only. FIG. 8 does not limit the scope of the present disclosure to any particular implementation.

As illustrated in FIG. 8, a transmitter UE obtains the CSI of sidelink(s) between the transmitter UE and one or more receiver UEs in step 801. That CSI information can help the transmitter UE to determine proper MIMO transmission configuration. In one example, the transmitter UE can determine the number of layers (1, 2, 3, 4, . . . ) of MIMO transmission, the precoders used for transmission, the number of codewords (1 or 2 for example) and also the MCS (modulation coding scheme) level.

So in step 802, the transmitter UE determines the configuration of multi-antenna transmission, which can include number of layers, number of codewords, precoders, the index of transmit beam(s) and also the MCS level. The UE can also determine the transmit power in step 802. Then the transmitter UE can obtain channel resource from the configure resource pool in step 803. Generally, the transmitter UE need first determine the transmission scheme and then determine the size of resource request. And then the UE can obtain channel resource from the configure resource pool.

After channel resource is obtained, the transmitter UE can transmit scheduling assignment message (for example one SCI in PSCCH channel) and the corresponding data packet as indicated in scheduling assignment in step 804. The scheduling assignment message can carry the configuration MIMO transmission in corresponding scheduled data packet, which can include, for example, number of layers, number of codewords, the configuration of DMRS (demodulation reference signal) and MCS. In step 805, a receiver UE can first decode the scheduling assignment and then receives the data packet scheduled by the scheduling assignment and decodes the data packet according to at least the MIMO configuration conveyed in scheduling assignment.

In one embodiment, a gNB can configure the UE to transmit a multi-antenna transmission scheme for transmission on sidelink. In one example, a UE send request to a gNB to request the scheduling of transmission on sidelink through uplink transmission. The request message can include: the packet size; whether the transmission is unicast or broadcast or multi-cast; the channel condition of the sidelink.

In another example, a gNB sends configuration message to schedule the transmission on sidelink in downlink transmission. One example of the configuration message can be a DCI (downlink control information) element. The configuration message sent from gNB can contain one of more of the following information. In one example, the transmission scheme that may be applied to the scheduled transmission on sidelink. In such instance, the transmission scheme can be spatial multiplexing with two or more layers; the transmission scheme can be a transmit diversity scheme; and the transmission scheme can be a single-layer transmission or single-port transmission. In another example, a number of layers is transmitted. In yet another example, a number of codewords is provided.

In yet another example, after receiving the configuration message from the gNB, the UE can transmit the scheduling assignment message and corresponding data packet on sidelink as configured by the configuration message from the gNB.

Figure 9:
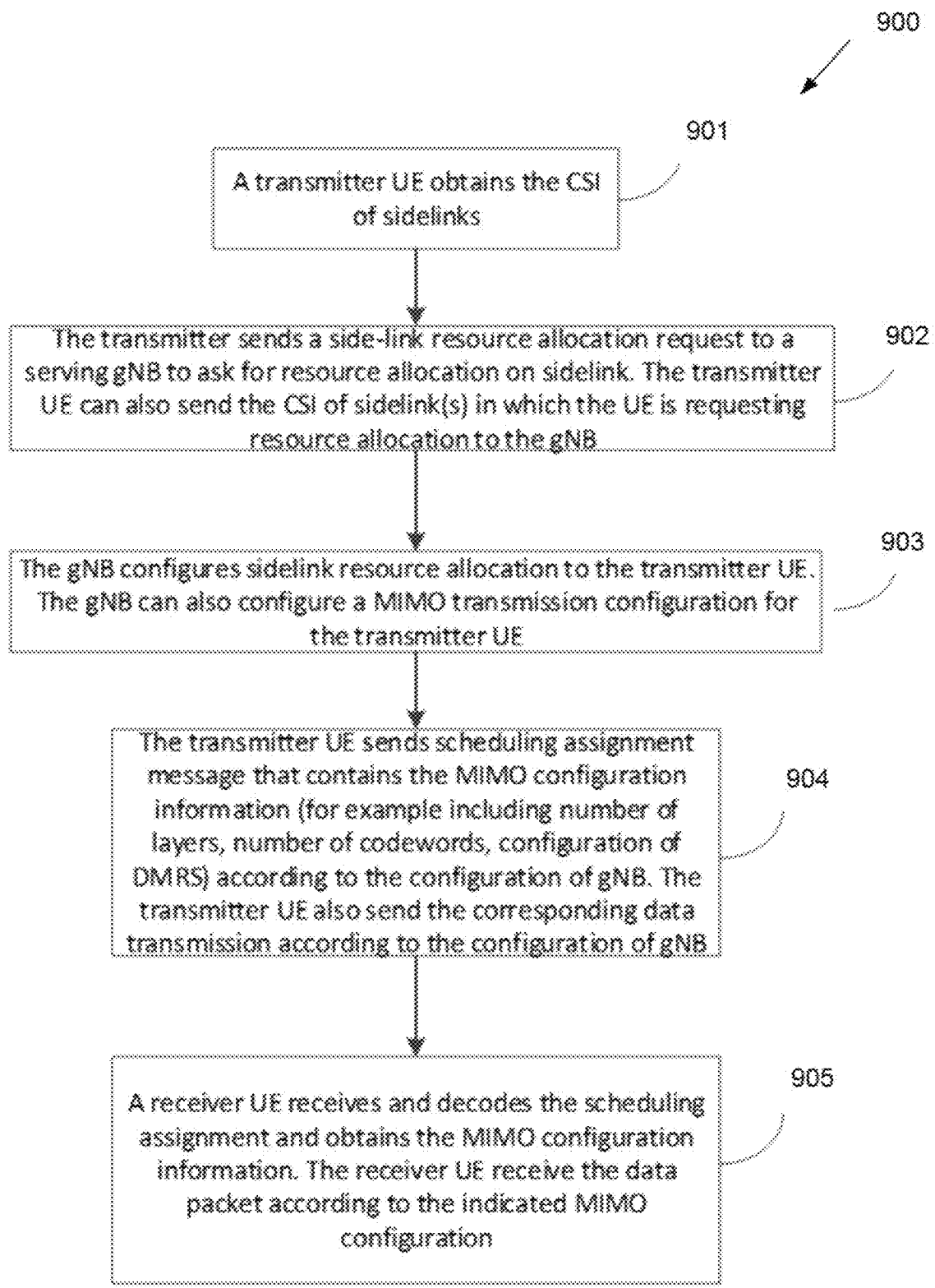
FIG. 9 illustrates another flow chart of a method for MIMO transmission on sidelink according to embodiments of the present disclosure.

FIG. 9 illustrates another flow chart of a method 900 for MIMO transmission on sidelink according to embodiments of the present disclosure. The embodiment of the method 900 illustrated in FIG. 9 is for illustration only. FIG. 9 does not limit the scope of the present disclosure to any particular implementation.

As illustrated in FIG. 9, a transmitter UE obtains the CSI of sidelink(s) between the transmitter UE and one or more receiver UEs in step 901. That CSI information can be used to determine proper MIMO transmission configuration. In one example, the CSI information can be used to determine the number of layers (1, 2, 3, 4, . . . ) of MIMO transmission, the precoders used for transmission, the number of codewords (1 or 2 for example) and also the MCS (modulation coding scheme) level.

In step 202, the transmitter UE sends requests to a serving gNB to request resource allocation on sidelink. In step 202, the transmitter UE can also report the CSI of sidelink of which the UE is requesting resource allocation to the gNB. The CSI can help the gNB to determine the resource allocation. The gNB can determines number of layers and then determine the needed resource size according to the packet size request, determined number of MIMO layers and MCS level.

In step 203, the gNB sends the resource allocation of sidelink to the transmitter UE and the gNB can also send the determined MIMO transmission configuration for the transmission on sidelink to the transmitter UE. After receiving the configuration of resource allocation from the gNB, the transmitter UE can transmit scheduling assignment message (for example one SCI in PSCCH channel) and the corresponding data packet as indicated in scheduling assignment in step 904 according the configuration received from the gNB in step 903.

The scheduling assignment message can carry the configuration MIMO transmission in corresponding scheduled data packet, which can include, for example, number of layers, number of codewords, the configuration of DMRS (demodulation reference signal) and MCS. In step 905, a receiver UE can first decode the scheduling assignment and then receives the data packet scheduled by the scheduling assignment and decodes the data packet according to at least the MIMO configuration conveyed in scheduling assignment.

Figure 10:
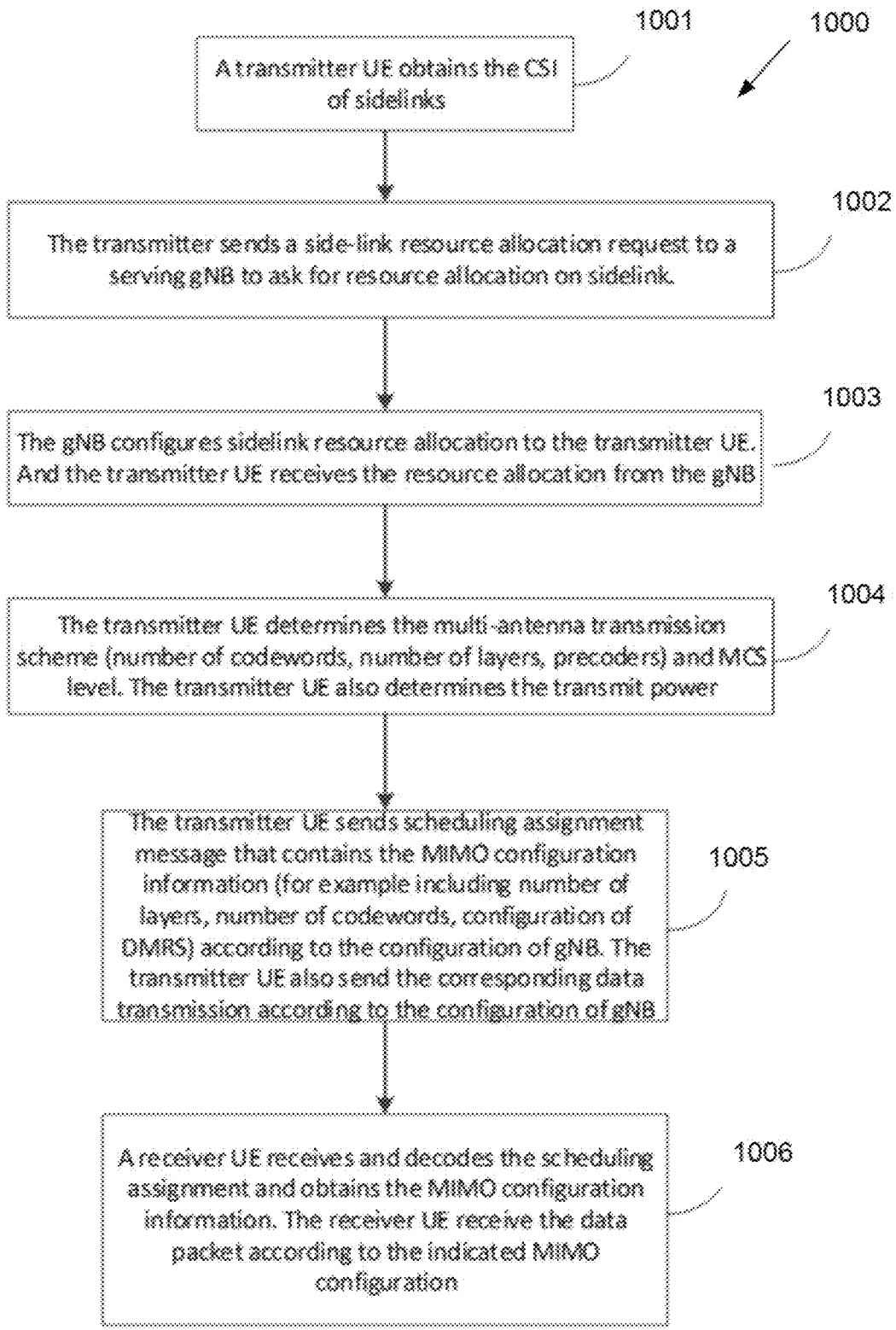
FIG. 10 illustrates yet another flow chart of a method for MIMO transmission on sidelink according to embodiments of the present disclosure.

FIG. 10 illustrates yet another flow chart of a method 1000 for MIMO transmission on sidelink according to embodiments of the present disclosure. The embodiment of the method 1000 illustrated in FIG. 10 is for illustration only. FIG. 10 does not limit the scope of the present disclosure to any particular implementation.

As illustrated in FIG. 10, a transmitter UE obtains the CSI of sidelink(s) between the transmitter UE and one or more receiver UEs in 1001. That CSI information can be used to determine proper MIMO transmission configuration. In one example, the transmitter UE can determine the number of layers (1, 2, 3, 4, . . . ) of MIMO transmission, the precoders used for transmission, the number of codewords (1 or 2 for example) and also the MCS (modulation coding scheme) level.

In step 1002, the transmitter UE sends requests to a serving gNB to request resource allocation on sidelink. After receiving the request, the gNB can determine resource allocation on sidelink according to transmission request from the transmitter UE. In step 1003, the gNB configures a resource allocation on sidelink to the transmitter UE and the transmitter UE receives the resource allocation from the gNB. Then in step 1004, the transmitter UE determines the transmission configuration for the transmission on the configured resource allocation on sidelink. The transmitter UE can determine the number of layers, number of codewords, precoders, the configuration of DM-RS and MCS level in step 1004.

After receiving the configuration of resource allocation from the gNB, the transmitter UE can transmit scheduling assignment message (for example one SCI in PSCCH channel) and the corresponding data packet as indicated in scheduling assignment in 1005 according the configuration received from the gNB in 1003. The scheduling assignment message can carry the configuration MIMO transmission in corresponding scheduled data packet, which can include, for example, number of layers, number of codewords, the configuration of DMRS (demodulation reference signal) and MCS. In step 1006, a receiver UE can first decode the scheduling assignment and then receives the data packet scheduled by the scheduling assignment and decodes the data packet according to at least the MIMO configuration conveyed in scheduling assignment.

In a sidelink transmission, more than one V2X UEs may be supported to use the same or overlapped sidelink resource to transmit sidelink TB (transport block). By multiplexing more than one sidelink transmission on same frequency-time sidelink resource can boost the resource efficiency of sidelink transmission significantly and then increase the data rate of NR sidelink transmission. This scheme can be called sidelink MU-MIMO (multi-UE multiple input multiple output) transmission.

Figure 11:
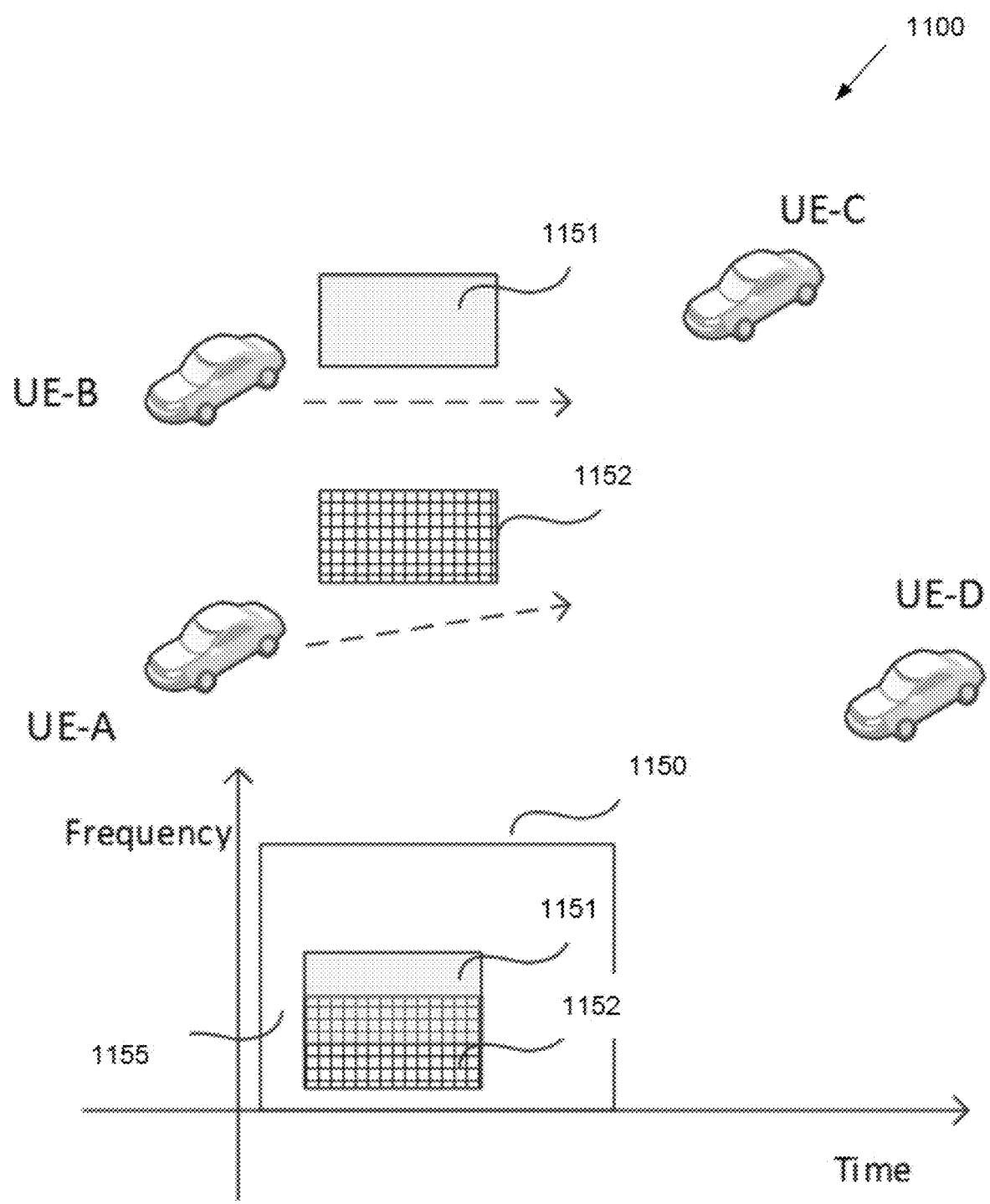
FIG. 11 illustrates an example sidelink MU-MIMO transmission according to embodiments of the present disclosure.

FIG. 11 illustrates an example sidelink MU-MIMO transmission 1100 according to embodiments of the present disclosure. The embodiment of the sidelink MU-MIMO transmission 1100 illustrated in FIG. 11 is for illustration only. FIG. 11 does not limit the scope of the present disclosure to any particular implementation.

As shown in FIG. 11, a V2X UE-A transmits PSSCH 1152 and a V2X UE-B transmits PSSCH 1151 on the same or overlapped sidelink frequency-time resource 1155. UE-A can transmit a first SCI to indicate the transmission of PSSCH 1152 and the UE-B can transmit a second SCI to indicate the transmission of PSSCH 1151. A first SCI and A second SCI can be transmitted on different frequency-time resources. For the proper reception of PSSCHs 1151 and 1152, different DM-RS ports can be used for PSSCH 1151 and 1152 so that the receiver UE (for example UE-C and UE-D in FIG. 11) can apply algorithm to separate the signals of PSSCH 1151 and 1152.

To enable sidelink MU-MIMO transmission, the capability may be required to configure proper DM-RS port(s) for one PSSCH so that the receiver UE is able to use orthogonal DM-RS ports to estimate the channel separately for multiple PSSCH occupying overlapped resource and thus use receive separation algorithm on those PSSCH.

In one embodiment, a serving gNB can schedule the sidelink transmission. The serving gNB can send DCI format to one V2X UE-A to schedule the sidelink resource and also transmission configuration for PSSCH transmission on sidelink. In the DCI format that the serving gNB uses to schedule sidelink transmission can include the DM-RS port(s) of sidelink DM-RS for the scheduled PSSCH transmission to the UE-A. After receiving scheduling DCI format, the UE-A may transmit the sidelink DM-RS for the scheduled PSSCH according to the configuration from the serving gNB.

In one example, a serving gNB can send a first DCI format to V2X UE-A and a second DCI format to V2X UE-B to schedule sidelink resource for sidelink transmission for UE-A and UE-B, respectively. In a first DCI format, the serving gNB can indicate the antenna port(s) of sidelink DM-RS for the UE-A transmission of PSSCH and in a second DCI format, the serving gNB can indicate the antenna port(s) of sidelink DM-RS for the UE-B transmission of PSSCH. By implementation, the serving gNB can indicate different antenna ports for the UE-A and the UE-B and overlapped sidelink resource for the UE-A and the UE-B.

For the sidelink resource selection, there is one mode in which the UE can select sidelink resource autonomously without the needing of gNB's scheduling. A UE can be configured with a resource pool and when some packets for sidelink arrive, the UE can select some sidelink resource from the configure resource pool based on some channel assessment criterion. The UE can first exclude all the sidelink resources that are reserved by other UEs or the signal energy level is higher than some threshold.

In one embodiment, a UE-A can include the sidelink resources that are reserved by other UEs but not all the antenna port(s) of sidelink DM-RS for PSSCH are used as part of available sidelink resources for the UE-A to select for his sidelink transmission. In one example, antenna ports $\{a_0, a_1, a_2, a_3\}$ can be used for sidelink DM-RS for PSSCH transmission on sidelink. A UE-A would select sidelink resources from the sidelink subchannels in sidelink slots $\{t_1, t_2, \ldots, t_L\}$. For a first sidelink resource among those resources, a UE-A can select a first sidelink resource if the first sidelink resource is reserved by a UE-B and the only a subset of antenna ports of $\{a_0, a_1, a_2, a_3\}$ are used by a UE-B for the PSSCH transmission in a first sidelink resource. If UE-A chooses a first sidelink resource, the UE-A may choose antenna ports that are different from the ones used by the UE-B for the sidelink DM-RS of PSSCH.

In one example, a UE-A can determine whether a UE-A can choose a first sidelink resource that is used by UE-B and the UE-B only use a subset of sidelink DM-RS antenna ports $\{a_0, a_1, a_2, a_3\}$ based on the priority level or QoS requirement of the packet that the UE-A is going to transmit on the chosen sidelink resource. For example, the condition can be the priority level or QoS requirement is higher than some threshold.

In one example, a UE-A can determine whether a UE-A can choose a first sidelink resource that is used by UE-B and the UE-B only use a subset of sidelink DM-RS antenna ports $\{a_0, a_1, a_2, a_3\}$ based on the priority level or QoS requirement of the packet that the UE-B is going to transmit on the chosen sidelink resource. For example, the condition can be the priority level or QoS requirement is lower than some threshold.

In one example, a UE-A can determine whether a UE-A can choose a first sidelink resource that is used by UE-B and the UE-B only use a subset of sidelink DM-RS antenna ports $\{a_0, a_1, a_2, a_3\}$ based on the priority level or QoS requirement of the packets that the UE-A and UE-B are going to transmit on the chosen sidelink resource. For example, the condition can be the priority level of QoS requirement indictor level of UE-A is larger than that of the packets of UE-B by a predefined offset.

In the mode of UE autonomous sidelink resource selection, at slot n, a first UE may be able to know which antenna port(s) of sidelink DM-RS would be used by a second UE in sidelink resource at slot n+l, where l is >0. In other word, a first UE may be able to know which antenna port(s) of sidelink DM-RS would be used by a second UE in future sidelink slots so that a first UE can determine whether he can occupy that same sidelink resource but with different antenna port(s) for sidelink DM-RS.

To support that function, there are a few alternative designs. In one example, a UE can be requested to keep using the same antenna port(s) for sidelink DM-RS in all the PSSCH transmissions within one sidelink resource occupation period. In one example, a UE-A makes sidelink resource selection at slot n and then occupies the selected sidelink resource with periodicity=$m_1$ slots for up to $L_1$ times. Within those L PSSCH transmissions, the UE-A can be requested to use the same antenna port(s) for sidelink DM-RS. After using all $L_1$ times and the UE-A can change the antenna port(s) for sidelink DM-RS for next sidelink resource occupation period.

In one example, a UE can be requested to include bit-field(s) in one SCI indicating the transmission of one PSSCH to indicate the antenna port(s) of sidelink DM-RS of next PSSCH transmission.

MU-MIMO embodiments to support high-priority service "grasping" resources from low-priority service.

In one embodiment, if a UE-A has a higher priority (or with higher/tighter QoS requirement) packet to transmit and a UE-B is going to transmit a packet with lower priority (or with looser QoS requirement) use a first sidelink resource at slot n, then the UE-A can use a first sidelink resource for his transmission at slot n. The UE-A can have a few different alternative designs for the transmission.

In one example, the UE-A can first send a first SCI format to indicate that the UE-A is going to transmit on that a first sidelink resource at slot n at some slot no later than slot n–$l_2$, where $l_2$ is a non-negative value. In one instance, the UE-A can include bit-field(s) in a first SCI format to indicate which antenna port(s) of sidelink DM-RS for PSSCH is going to be used in the transmission in a first sidelink resource at slot n.

In another instance, the UE-A can include bit-field(s) in a first SCI format to indicate: the priority of the packet that the UE-A is going to transmit; the indicator for QoS requirement of the packet that the UE-A is going to transmit; and/or indicator to indicate whether the UE-B can send packet on a first sidelink resource but with different antenna port(s) of sidelink DM-RS of PSSCH.

In one example, the UE-A can transmit his packet on a first sidelink resource at slot n but with the antenna port(s) of sidelink DM-RS of PSSCH that are different from the antenna port(s) of sidelink DM-RS of PSSCH that are used by the UE-B on a first sidelink resource at slot n. To reduce the impact on higher-priority packet transmission, the UE-A can be requested to do that if some condition is met.

In one instance, the examples for the condition can be the priority level of the packet of UE-A is higher than some threshold. Or the indicator of QoS requirement of the packet of UE-A indicates the QoS requirement being higher than some threshold.

In one instance, the priority level of the packet of UE-B is less than some threshold. Or the indicator of QoS requirement of the packet of UE-A indicates the QoS requirement being less than some threshold.

In one instance, the priority level of the packet of UE-A is higher than that of the packet of the UE-B. Or the indicator of QoS requirement of the packet of UE-A indicates the QoS requirement being higher than that of the packet of the UE-B.

Sidelink phase noise reference signal.

In some embodiments, a V2X UE can be requested to transmit reference signal on sidelink transmission for tracking the phase variation caused by phase noise. A V2X receiver UE then can use that reference signal to calculate the phase variation along sidelink transmission and then compensate the variation to improve the sidelink reception. Generally, phase noise is caused by imperfect in radio frequency (RF) part in wireless transmitter and receiver and the level of phase noise is proportional to the center carrier frequency of the transmission signal. Therefore, the impact of phase noise on the radio link performance is not ignorable. Specially, phase noise would increase the EVM noise level and thus the highest supportable MCS level is capped in mmWave band, for example 28 GHz and 39 GHz bands.

Some embodiments for configuring and transmitting reference signal for phase noise tracking in sidelink are provided in the present disclosure. The reference signal for phase noise tracking on sidelink can be called SL-PT-RS (sidelink phase tracking reference signal).

First of all, the reference signal for phase noise tracking is not needed in all cases. For example, the SL-PT-RS is needed only when the MCS level is higher than some MCS level and the carrier frequency of sidelink transmission is high enough. When the MCS level is low, for example, QPSK, the noise level caused by phase noise is not big enough to cause performance degradation to the QPSK transmission. Therefore, a scheme to properly configure the transmission of SL-PT-RS on sidelink is necessary.

In one embodiment, a V2X UE only transmits SL-PT-RS signals along with one PSSCH transmission. If SL-PT-RS for a first PSSCH transmission is transmitted, the V2X UE can be requested to map the signals of SL-PT-RS in some REs (resource elements) within the frequency-time resource allocated for a first PSSCH transmission. In other word, the REs where the SL-PT-RS are mapped for a first PSSCH transmission may be within the physical resource block and on the symbols that are allocated for a first PSSCH transmission. As explained above, the SL-PT-RS is not needed in some scenarios. Therefore, some configuration mechanism may be required to configure the transmission of SL-PT-RS in sidelink. There are a few alternative embodiments for configurations.

In one example, the possibility of transmission of SL-PT-RS on sidelink is configured per sidelink resource pool. In the configuration of a first resource pool for PSSCH, a parameter can be used to configure the possibility of transmission of SL-PT-RS for PSSCH transmitted in a first resource pool. In one example, a parameter SL-phaseTrackingRS can be used to configure the presence of SL-PT-RS for PSSCH in one resource pool or not: the presence/absence of parameter SL-phaseTrackingRS can be used to indicate whether the V2X UE can transmit SL-PT-RS or not for the PSSCH in that resource pool. In another example, the value of parameter SL-phaseTrackingRS can indicate that.

In such examples, a resource pool for sidelink can be configured by a serving gNB, for example through system information signaling or RRC configuration signaling. And in this case, the configuration parameter for SL-PT-RS can be configured as part of resource pool configuration as configured by the gNB.

In such examples, a resource pool can be preconfigured according to the V2X UE geographical location. A V2X UE calculates the resource pool configuration based on his geographical location. Then the V2X UE can also calculate the configuration for SL-PT-RS based on his geographical location.

In one example, the configuration of SL-PT-RS can be calculated according the frequency band. In one example, a threshold for carrier frequency is predefined and for the PSSCH transmission in bands that has carrier frequency less than the predefined threshold, the V2X UE may assume the SL-PT-RS is transmitted and for the PSSCH transmission in bands that has carrier frequency larger than the predefined threshold, the V2X UE can assume the SL-PT-RS can be transmitted.

In one example, the configuration of SL-PT-RS can be configured per sidelink bandwidth part (SL-BWP). In the configuration on one SL-BWP, one or more of the following parameters can be configured. In such example, the configuration of SL-PT-RS for the transmission of sidelink PT-RS in that SL-BWP. In one example, that can be a parameter to indicate the on or off of the transmission of sidelink PT-RS in that SL-BWP. If the parameter indicates the "On" of SL-PT-RS in that SL-BWP, then the transmitter UE can transmit SL-PT-RS and the receiver UE can expect to receive SL-PT-RS from the transmission in that SL-BWP. If the parameter indicates the "Off" of SL-PT-RS in that SL-BWP, then the transmitter UE would not transmit SL-PT-RS and the receiver UE does not expect to receive SL-PT-RS in that SL-BWP.

In such examples, the frequency location and bandwidth of that SL-BWP.

In such example, the numerology used by OFDM or DFT-s-OFDM in that SL-BWP. It can include the subcarrier spacing and the length of cyclic prefix.

In one embodiment, when SL-PT-RS is presented with the transmission of one PSSCH, the receiver UE can assume one or more of the follow alternatives for the transmission of SL-PT-RS and PSSCH.

In one example, the PSSCH does rate-match to the associated SL-PT-RS, i.e., the mapping of PSSCH may skip the REs (resource elements) occupied by the SL-PT-RS signals.

In one example, the PSSCH does not do rate-match to the associated SL-PT-RS. The receiver UE may assume the PSSCH signal is overridden by the SL-PT-RS signal on the REs where the SL-PT-RS signals are mapped.

In one embodiment, the presence of SL-PT-RS in a first PSSCH can be indicated through one or more bit-field(s) in a first SCI that indicates and configures the transmission of a first PSSCH. The bit-fields in a first SCI can indicate: (1) the presence or absence of the SL-PT-RS in a first PSSCH; and/or (2) the transmission configurations of the SL-PT-RS in a first PSSCH.

At the V2X receiver side, the V2X receiver UE can first decode the SCI and the use the decoded configuration of SL-PT-RS in the indicated a first PSSCH. In one example, the presence/absence of SL-PT-RS transmitted in a first PSSCH can be indicated through one or more of the following information elements in a first SCI that indicates/configure the transmission of a first PSSCH: the MCS level used in a first PSSCH as indicated in a first SCI; the priority level or QoS (quality of service) level of the packet transmitted in a first PSSCH as indicated in a first SCI; and/or one bit-field in a first SCI to explicitly indicate the presence/absence of SL-PT-RS in a first PSSCH.

In one embodiment, the MCS level and priority level indicator (or called QoS level indicator) of PSSCH indicated in a first SCI can be used to indicate the presence/absence of SL-PT-RS in a first PSSCH transmission and can also indicate the configuration and transmission parameters for the SL-PT-RS in a first PSSCH transmission. In one example, one codepoint of bit-filed priority level indicator in a first SCI can indicate the priority level (QoS level) of the indicated PSSCH transmission. For each priority level value, one MCS threshold is configured for the V2X UE to determine the configuration of SL-PT-RS in one PSSCH transmission.

In one example, for one priority level indicated in a first SCI, the UE can determine the presence/absence of SL-PT-RS in a first PSSCH that is indicated by a first SCI according the MCS level and the MCS level threshold corresponding to the indicated priority level. In one example, the V2X UE can be configured or preconfigured with the following per-priority level MCS level threshold for SL-PT-RS configuration as the following TABLE 3.

TABLE 3

Priority level and MCS threshold

| Priority level values | MCS threshold for SL-PT-RS |
|---|---|
| Priority_level#0 | MCS_thres_#0 |
| Priority_level#1 | MCS_thres_#1 |
| ... | ... |
| Priority_level#7 | MCS_thres_#7 |

The UE can also be configured with SL-PT-RS configuration associated with the priority level of one PSSCH as shown in TABLE 4.

TABLE 4

Priority level and configuration

| Priority level values | Configuration of SL-PT-RS |
|---|---|
| Priority_level#0 | SL_PT_RS_config_#0 |
| Priority_level#1 | SL_PT_RS_config_#1 |
| ... | ... |
| Priority_level#7 | SL_PT_RS_config_#7 |

In one example, a UE receives a first SCI indicating a first PSSCH and a first SCI indicating priority_level #i and MCS level used in a first PSSCH. Based on the indicated Priority_level #i, the UE can determine the MCS threshold for SL-PT-RS to be MCS_thres_#i and then the UE can determine the SL-PT-RS transmission configuration in a first PSSCH based on Priority_level #i, the calculated MCS_thres_#i and the indicated MCS level.

In one embodiment, a serving gNB can schedule the transmission on sidelink and the serving gNB can indicate the configuration of SL-PT-RS for the scheduled sidelink transmission. In one example, a serving gNB can send a DCI format to a V2X UE-A to schedule a sidelink transmission for V2X UE-A. In the DCI format, the serving gNB can indicate the resource allocation on sidelink and the transmission parameters for PSSCH transmission.

The serving gNB can also include bit-field(s) to indicate: (1) whether the V2X UE may transmit SL-PT-RS in the scheduled PSSCH transmission; and/or (2) the transmission configuration/parameters of the SL-PT-RS in the scheduled PSSCH. After the UE-A receives the DCI format from the serving gNB, the UE-A may fill the corresponding bit-fields in SCI format according to the SL-PT-RS configuration indicated by the serving gNB and transmit the SL-PT-RS in the scheduled PSSCH accordingly. Such embodiments can be applicable to the UE sidelink resource allocation mode, which is called mode 3 in LTE and called mode 1 in NR.

In one embodiment, the V2X UE-A can determine the SL-PT-RS transmission configuration based on the configuration of PSSCH that is scheduled by the serving gNB. In such embodiment, the serving gNB first schedules the sidelink resource (can also include PSSCH configuration parameters) through a DCI format to V2X UE-A and then the UE-A can determine the configuration of SL-PT-RS for the scheduled PSSCH and fill the corresponding bit-field in the SCI that indicates the transmission of the scheduled PSSCH.

To support multi-antenna transmission, proper channel statement information (CSI) measurement is needed. With the information of CSI, the transmitter UE can determine the precoders for multi-antenna transmission. To measure the CSI of one sidelink, some reference signal is needed.

In one embodiment, a UE can transmit some reference signals for CSI measurement on sidelink. One example of the reference signal sent on sidelink can be a CSI-RS (channel statement information-reference signal). One example of the reference signal sent n sidelink can be a SRS (sounding reference signal). The reference signal sent on sidelink can be called SL-RS (sidelink reference signal) or SL-CSI-RS (sidelink CSI-RS) or SL-SRS (sidelink SRS). In the following discussion, the term SL-RS is going to be used as example. SL-RS can be replaced with other terms without changing the design of provided embodiments.

In one embodiment, a UE-A can first obtain a configuration of SL-RS to be transmitted on sidelink. The configuration of SL-RS obtained by the UE-A can be sent to one or more other UEs which are the receiver UE that are supposed to receive SL-RS from the UE-A to measure the CSI of sidelink between him and the UE-A. In other word, a UE-B can be configured to measure SL-RS transmitted from the UE-A. For the UE-A, one alternative to configure the SL-RS is a gNB can configure the transmission of SL-RS on sidelink for the UE-A. For the UE-B, another alternative to configure the SL-RS is that the UE-A can obtain one configuration SL-RS from a pool of SL-RS configurations and the UE-A can select one SL-RS that is not occupied by other UEs from that pool.

For the UE-B, one alternative to configure measuring SL-RS from the UE-A is that the gNB can send message through the interface between the gNB and the UE (called Uu interface) to configure the UE-B to measure the SL-RS sent from UE-A. For the UE-B, another alternative to configure measuring SL-RS from the UE-A is that the configuration of SL-RS sent from the UE-A can be sent from the UE-A to the UE-B. Another alternative is the UE-A can first report the selected configuration of SL-RS to a lead UE and the lead UE then can broadcast the configuration of SL-RS of UE-A to other one or more UEs.

In one embodiment, the configuration of one SL-RS can include one or more of the following components: an identity of a SL-RS configuration; symbol location of SL-RS resource within a slot, in one example, a SL-RS resource can be transmitted at one of more of the last N=3 symbols within one slot; number of OFDM symbols in one SL-RS resource; number of SL-RS antenna ports; the information of reference signal sequence the UE may generate to transmit in this SL-RS resource; the frequency domain mapping offset; and slot level periodicity and slot level offset, which can define this SL-RS resource is sent in which slots.

Figure 12:
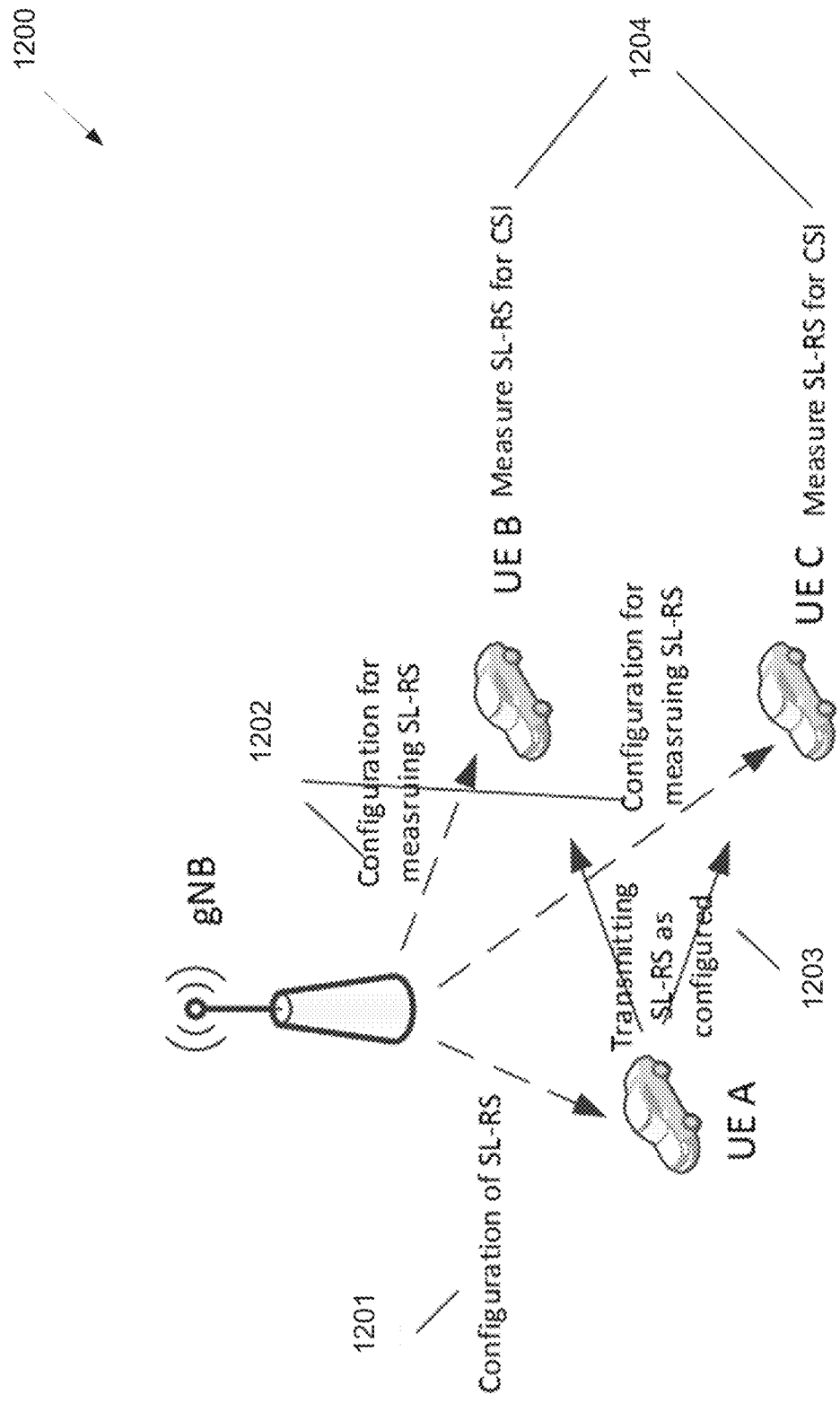
FIG. 12 illustrates an example procedure of SL-RS on sidelink according to embodiments of the present disclosure.

FIG. 12 illustrates an example procedure of SL-RS on sidelink 1200 according to embodiments of the present disclosure. The embodiment of the procedure of SL-RS on sidelink 1200 illustrated in FIG. 12 is for illustration only. FIG. 12 does not limit the scope of the present disclosure to any particular implementation.

As illustrated in FIG. 12, a UE A can first obtain a configuration SL-RS from the serving gNB in 1201. The configuration of SL-RS to the UE A can include the information of slot location in sidelink of sending SL-RS, OFDM symbol location of sending SL-RS, the number of SL-RS ports, the frequency domain location and offset and the information for generating reference signal sequences. The gNB can configure the UE B and the UE C to measure SL-RS from the UE-A in 1202. Then in 1203, UE A transmits SL-RS as configured by the gNB on sidelink. The UE B can measure the SL-RS sent from the UE-A to obtain the CSI of sidelink between the UE A and the UE B in 1204. The UE C can measure the SL-RS sent from the UE-A to obtain the CSI of sidelink between the UE A and the UE C in 1204.

In one embodiment, a serving gNB can configure a first UE to transmit SL-RS in sidelink connection and configure a second UE to measure some SL-RS and report the sidelink CSI.

In one embodiment, the serving gNB can configure a first UE to transmit one or more periodic SL-RS on sidelink connection. The gNB can configure a first UE with one or more of the following parameters for each SL-RS resource: the sidelink offset of that SL-RS resource; the sidelink periodicity of that SL-RS resource; the symbol location(s) of that SL-RS resource in one sidelink slot; the sequence used in that SL-RS resource; the mapping rule in frequency domain; the antenna port configuration of that SL-RS resource; and/or the comb configuration of that SL-RS resource.

In one embodiment, the serving gNB can configure a second UE to measure one or more periodic SL-RS one sidelink connection. The gNB can configure a second UE with one or more of the above parameters for each SL-RS resource.

In one embodiment, the serving gNB can configure a first UE to transmit one or more SL-RS in sidelink at sidelink slot n and then monitor the sidelink CSI feedback in a sidelink feedback channel at sidelink slot n+m through a first DCI format and the serving gNB can configure a second UE to receiver one or more SL-RS in sidelink at sidelink slot n and then transmit the sidelink CSI feedback in in a sidelink feedback channel at sidelink slot n+m through a second DCI format. In one example, a first DCI format and a second DCI format can be two separate DCI format. In one example, a first DCI format and a second DCI format can be one same DCI format, in which the ID of a first UE and ID of a second UE can be included to identify which UE is the transmitter of SL-RS and which UE is the receiver of the SL-RS.

Figure 13:
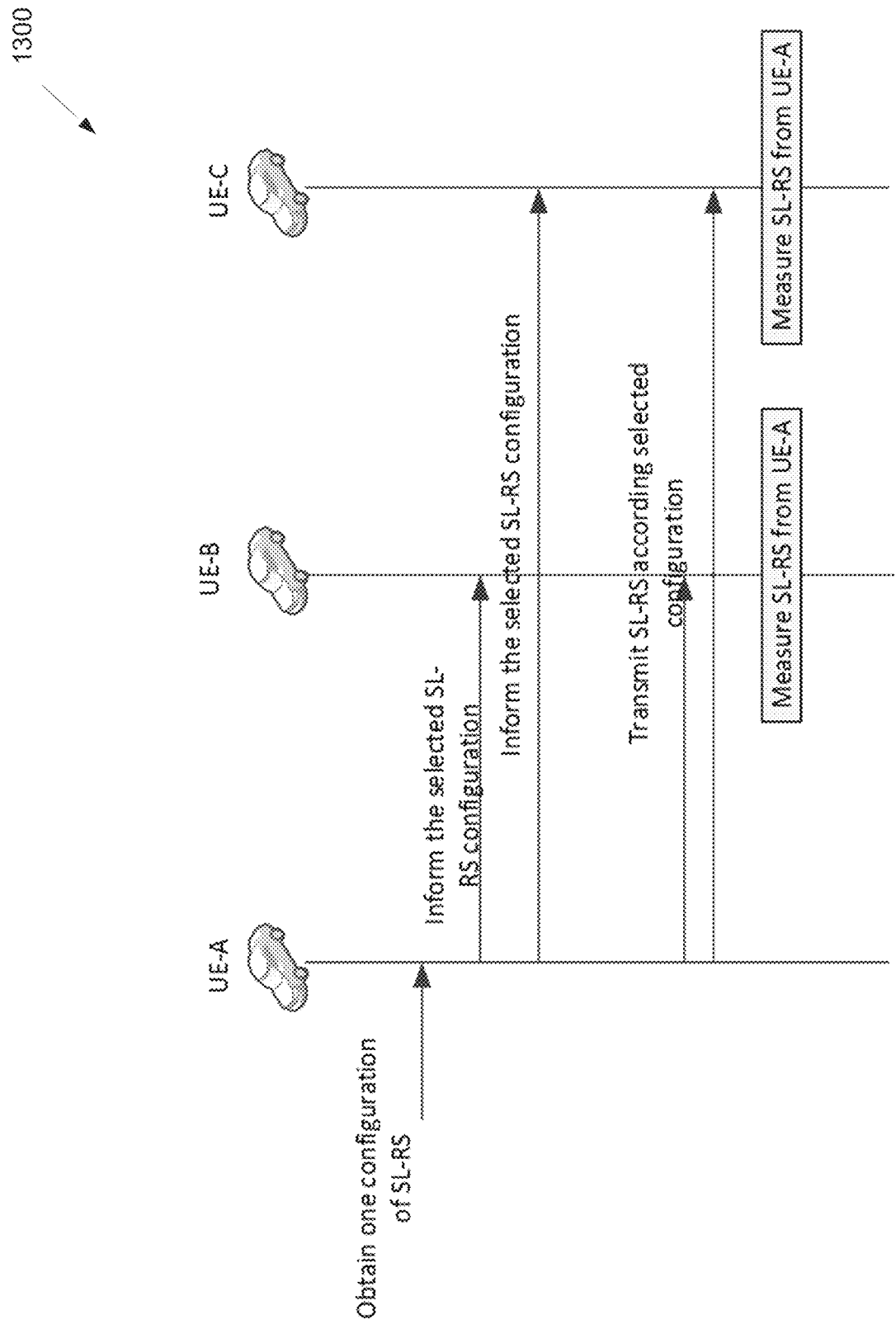
FIG. 13 illustrates another example procedure of SL-RS on sidelink according to embodiments of the present disclosure.

FIG. 13 illustrates another example procedure of SL-RS on sidelink 1300 according to embodiments of the present disclosure. The embodiment of the procedure of SL-RS on sidelink 1300 illustrated in FIG. 13 is for illustration only. FIG. 13 does not limit the scope of the present disclosure to any particular implementation.

As illustrated in FIG. 13, a UE-A first obtain one configuration of SL-RS. In one example, a UE-A can obtain one configuration of SL-RS from a pool of SL-RS configurations. Then the UE-A can inform his selected SL-RS configuration to one or more UEs on sidelink. In the example shown in FIG. 13, a UE-A informs his selected SL-RS configuration to the UE-B and UE-C. After that, the UE-A can transmit SL-RS one sidelink according to the selected SL-RS configuration. A UE-B then can measure the SL-RS sent from UE-A to measure the CSI of sidelink between the UE-A and the UE-B and the UE-C then can measure the SL-RS sent from the UE-A to measure the CSI of sidelink between the UE-A and the UE-C.

Figure 14:
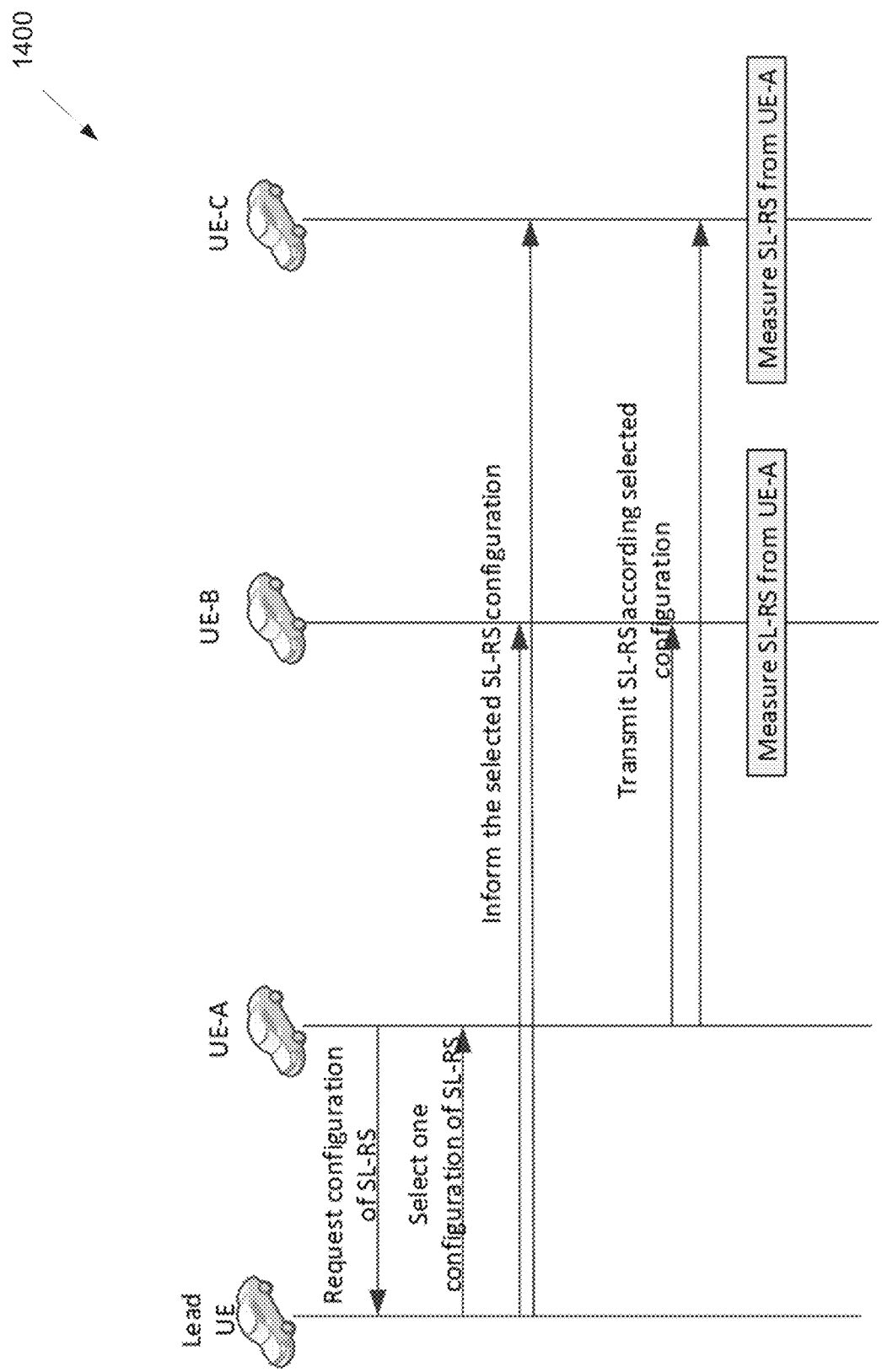
FIG. 14 illustrates yet another example procedure of SL-RS on sidelink according to embodiments of the present disclosure.

FIG. 14 illustrates yet another example procedure of SL-RS on sidelink 1400 according to embodiments of the present disclosure. The embodiment of the procedure of SL-RS on sidelink 1400 illustrated in FIG. 14 is for illustration only. FIG. 14 does not limit the scope of the present disclosure to any particular implementation.

As illustrated in FIG. 14, a UE-A can first request a configuration of SL-RS from a lead UE and the lead UE is responsible for maintaining and selecting configuration of SL-RS from UEs. After receiving the request from UE-A, the lead UE can select one non-used SL-RS configuration and then inform the UE-A of the selected configuration of SL-RS. The lead UE can inform other UEs about the selected SL-RS configuration of UE-A.

In one example, a lead UE can broadcast the information of {UE ID, the selected SL-RS configuration index}. From that, each UE associated with the same lead UE can be ware of configurations of SL-RS selected by all the UE associated with the same lead UE. Then in the example shown in FIG. 14, the UE-A can send SL-RS on sidelink according to selected SL-RS configuration. The UE-B then can measure the SL-RS sent from the UE-A to measure the CSI of sidelink between the UE-A and the UE-B. The UE-C then can measure the SL-RS sent from the UE-A to measure the CSI of sidelink between the UE-A and the UE-C.

To support MIMO transmission on sidelink, CSI of sidelink is necessary. The CSI information can be used by the transmitter UE to calculate the proper precoder (or called beamforming weights) and choose proper MIMO transmission configuration, including the number of layers. Proper precoders can provide the following advantages to the V2X system: boost the power of useful signals; reduce the interference to transmission on other links of sidelink; and/or boost the transmission data rate.

In a V2X sidelink, the transmission is between UEs. The transmission can be unicast, multi-cast and broadcast. For a unicast transmission, a transmitter UE sends data to a receiver UE. For a multi-cast transmission, the transmission from a transmitter UE is targeted to a group of UEs. For a broadcast transmission, the transmission from a transmitter UE is targeted to all the UEs in the proximity to the transmitter UEs. For different type of transmission, the transmitter needs different CSI information.

Figure 15:
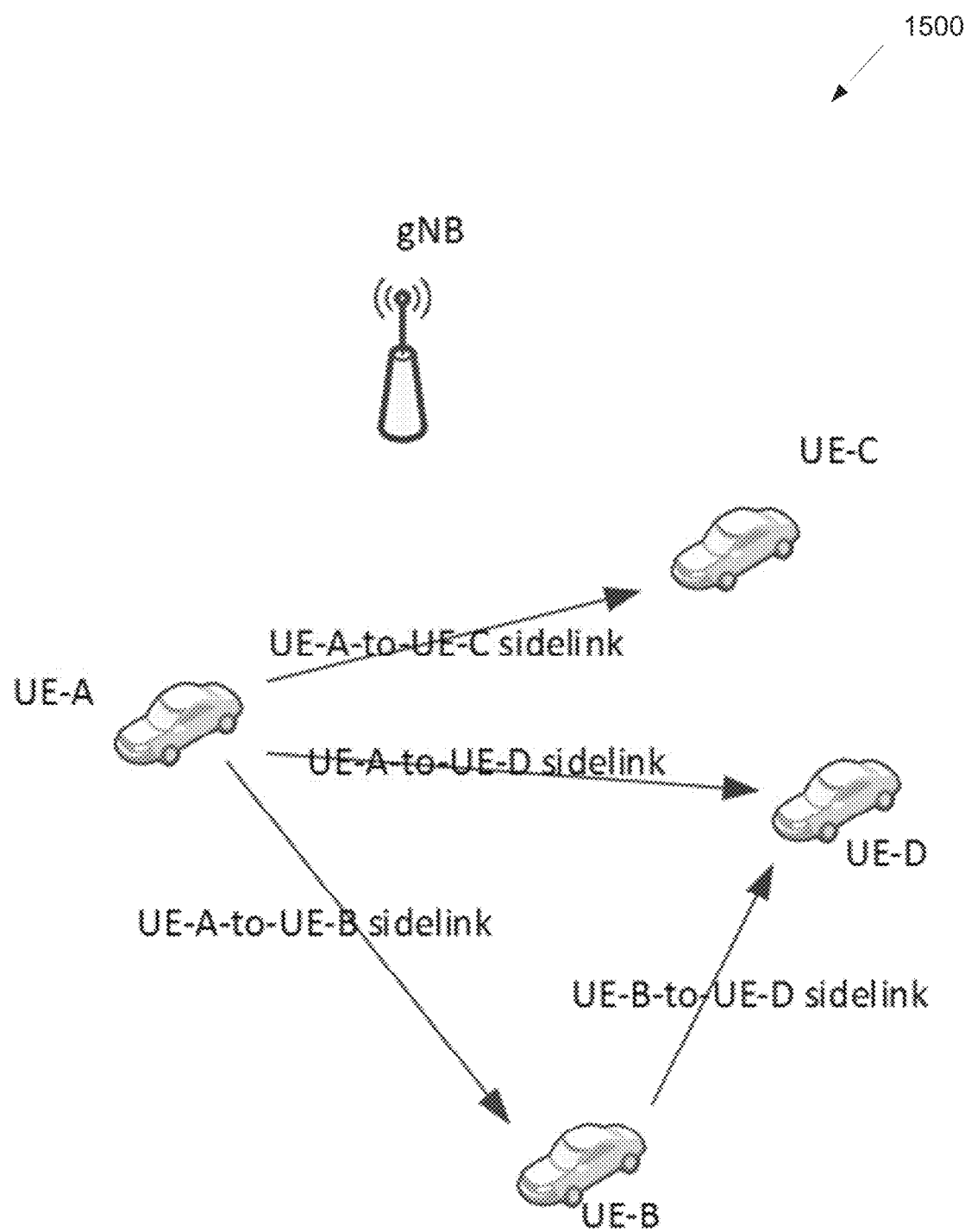
FIG. 15 illustrates an example V2X sidelink communication according to embodiments of the present disclosure.

FIG. 15 illustrates an example V2X sidelink communication 1500 according to embodiments of the present disclosure. The embodiment of the V2X sidelink communication 1500 illustrated in FIG. 15 is for illustration only. FIG. 15 does not limit the scope of the present disclosure to any particular implementation.

An example of V2X sidelink communication is shown in FIG. 15. There are four V2X UEs: a UE-A, a UE-B, a UE-C, and a UE-D. If the UE-A wants to transmit packet with MIMO transmission scheme to the UE-B, then the UE-A would need the CSI of the UE-A-to-UE-B sidelink. If the UE-A wants to transmit a multi-cast packet with MIMO transmission scheme to the UE-B, the UE-C, and the UE-D, then the UE-A would need the CSI of the UE-A-to-UE-B, the UE-A-to-UE-C, and the UE-A-to-UE-D sidelinks and then the UE-A can choose proper precoder and MIMO transmission configuration which is good for all three sidelinks. If the UE-B wants to transmit a packet with MIMO transmission to the UE-D, the UE-B would need the CSI of the UE-B-to-UE-D sidelink.

In one embodiment, the UE can measure the CSI of one sidelink according to the channel reciprocity of sidelink. In sidelink, the transmissions between two UEs are bidirectional. For example in FIG. 15, the UE-A transmits packet to the UE-B through the radio link between the UE-A and the UE-B and the UE-B transmits packet to the UE-A also through the radio link between the UE-A and the UE-B. The channel of transmitting from the UE-A to the UE-B would have reciprocity with the channel of transmitting from the UE-B to the UE-A. Thus, the UE-A can measure some reference signal transmitted from the UE-B to obtain the CSI of sidelink between the UE-A and the UE-B through using the channel reciprocity.

Figure 16:
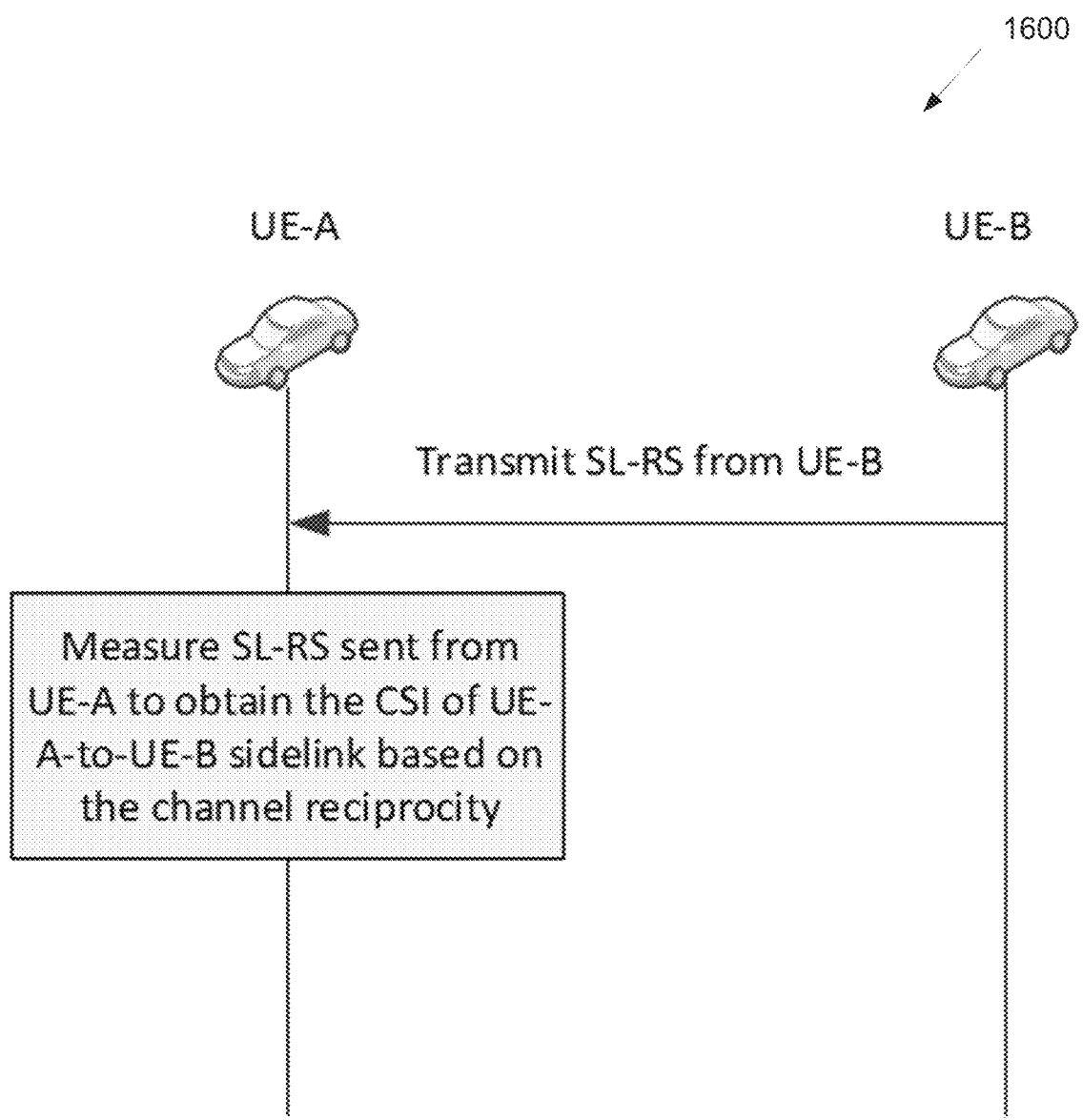
FIG. 16 illustrates an example procedure of obtaining CSI of sidelink according to embodiments of the present disclosure.

FIG. 16 illustrates an example procedure of obtaining CSI of sidelink 1600 according to embodiments of the present disclosure. The embodiment of the procedure of obtaining CSI of sidelink 1600 illustrated in FIG. 16 is for illustration only. FIG. 16 does not limit the scope of the present disclosure to any particular implementation.

As illustrated in FIG. 16, a UE-B transmits SL-RS and a UE-A can receive and measure the SL-RS transmitted by the UE-B. Then based on the channel reciprocity of sidelink, the UE-A can obtain the CSI of sidelink between the UE-A and the UE-B by measuring the SL-RS from the UE-B. Furthermore, the UE-A can feedback the measured CSI (for example, PMI (precoding matrix indicator), a rank indicator (RI), a channel quality indicator (QCI)) to the UE-B through some direct communication or in-direct communication.

In one embodiment, a receiver UE can measure the reference signal sent on sidelink to obtain the CSI of sidelink and then the UE can report the CSI of sidelink to the system and the system can forward the CSI of sidelink of transmitter UEs.

Figure 17:
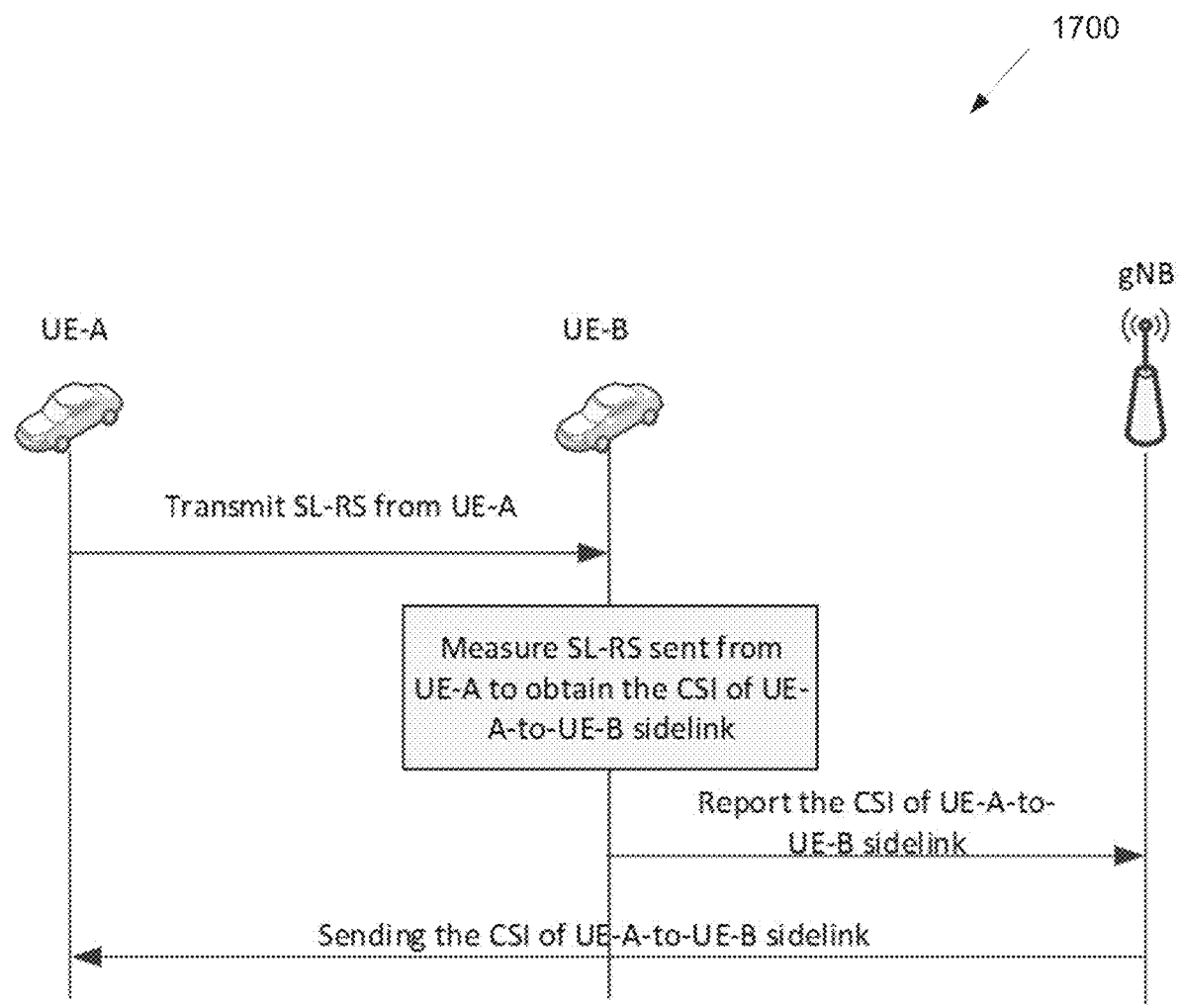
FIG. 17 illustrates an example procedure of obtaining CSI of sidelink according to embodiments of the present disclosure.

FIG. 17 illustrates an example procedure of obtaining CSI of sidelink 1700 according to embodiments of the present disclosure. The embodiment of the procedure of obtaining CSI of sidelink 1700 illustrated in FIG. 17 is for illustration only. FIG. 17 does not limit the scope of the present disclosure to any particular implementation.

As illustrated in FIG. 17, the purpose is to obtain the CSI of sidelink between the UE-A and the UE-B. The UE-A transmits SL-RS for the UE-B to measure the channel information of sidelink between the UE-A and the UE-B. The UE-B can obtain the CSI of sidelink between the UE-A and the UE-B by measuring the SL-RS sent from the UE-A to the UE-B. Then the UE-B can report the measured CSI to the serving gNB and the serving gNB can forward the reported CSI to the UE-A. The UE-B can report the following information to the gNB: the CSI information that can include CQI, PMI, RI and/or CQI; and/or the UE ID of the UE-A and the UE-B, which can be used to identify the sidelink between the UE-A and the UE-B.

In one embodiment, a receiver UE can measure the reference signal sent on sidelink to obtain the CSI of sidelink and then the receiver UE can report the CSI of sidelink to transmitter UE through a sidelink transmission.

Figure 18:
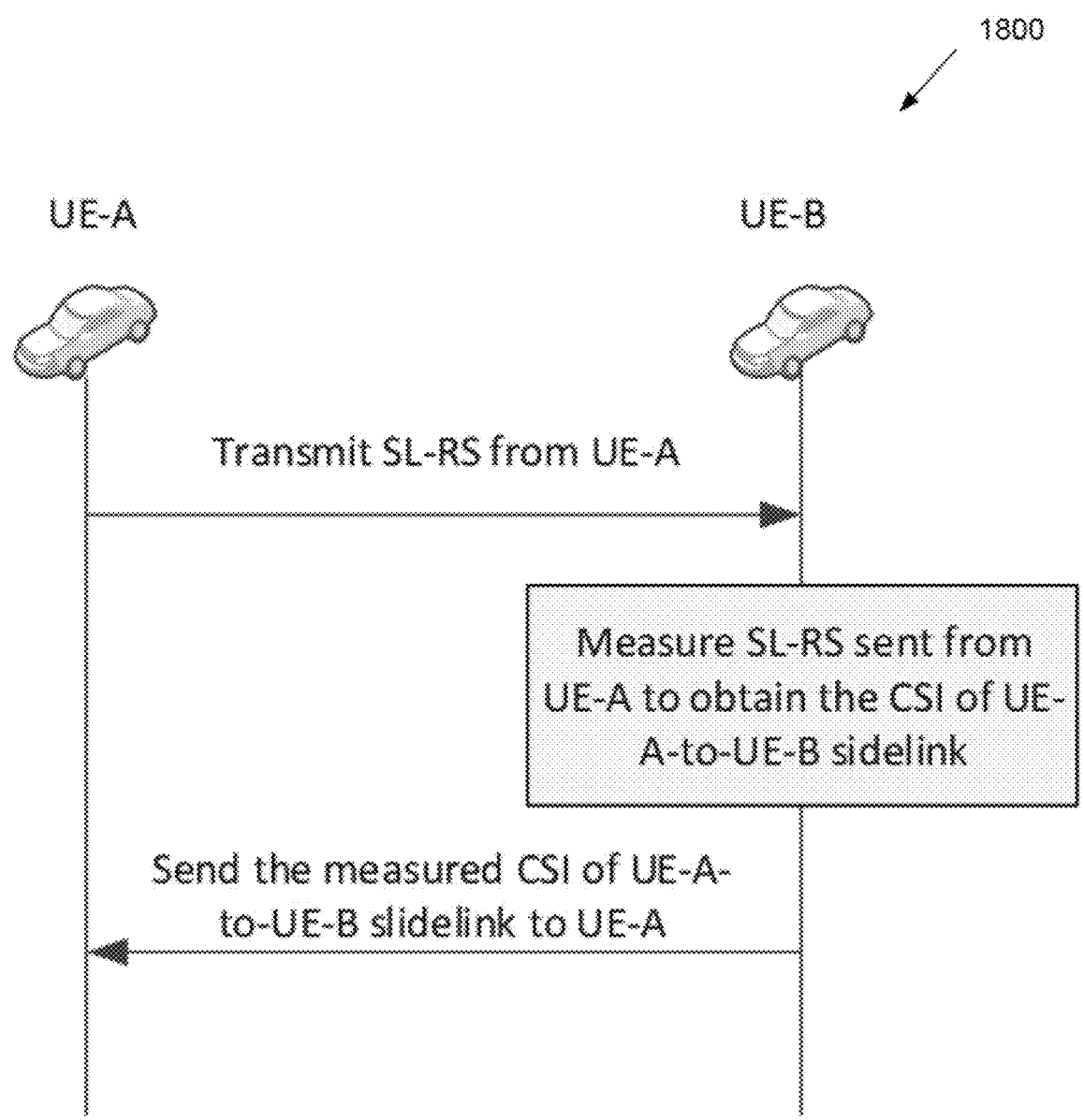
FIG. 18 illustrates an example procedure of obtaining CSI of sidelink according to embodiments of the present disclosure.

FIG. 18 illustrates an example procedure of obtaining CSI of sidelink 1800 according to embodiments of the present disclosure. The embodiment of procedure of obtaining CSI of sidelink 1800 illustrated in FIG. 18 is for illustration only. FIG. 18 does not limit the scope of the present disclosure to any particular implementation.

As illustrated in FIG. 18, the purpose is to obtain the CSI of sidelink between the UE-A and the UE-B. The UE-A transmits SL-RS for the UE-B to measure the channel information of sidelink between the UE-A and the UE-B. The UE-B can obtain the CSI of sidelink between the UE-A and the UE-B by measuring the SL-RS sent from the UE-A to the UE-B. Then the UE-B can report the measured CSI to UE-A. The UE-B can report the following information to the gNB: the CSI information that can include CQI, PMI, RI and/or CQI; and/or the UE ID of UE-A, which can be used to identify the sidelink between the UE-A and the UE-B.

In some embodiments, a serving gNB can request a UE to report the CSI (channel state information) of one or more than one sidelinks to the gNB. The CSI of sidelink can be CQI, RI and/or PMI as described in embodiments in the present disclosure. The serving gNB can send a request to a first UE through higher layer signaling (for example RRC or MAC-CE message) and/or physical layer signaling (for example one DCI format) to request the first UE to report the sidelink CSI information of sidelink connection between the first UE and another UE.

In the request message, the serving gNB can include one or more of the following information elements. In one example, the information on the identity of the sidelink(s) that the first UE is requested to report CSI; For example, one sidelink can be identified by the ID of one V2X UE. With a ID of V2X UE, the first UE may report the sidelink CSI for the sidelink between the first UE and the UE identified by the signaled ID.

In another example, the information on which CSI parameter may be reported. For example, the first UE can be requested to report the CQI and RI of one sidelink. In yet another example, the uplink channel or resource where the first UE may transmit the payload carrying the reported sidelink CSI information. In one example, the uplink channel or resource can be one PUCCH resource at one slot. In yet another example, the sidelink reference signal that the first UE may use to measure the CSI for the reporting. In one example, the serving gNB can configure the first UE to measure sidelink reference signals that are transmitted in one sidelink slot, and/or with particular sidelink reference signal resource ID.

Figure 19:
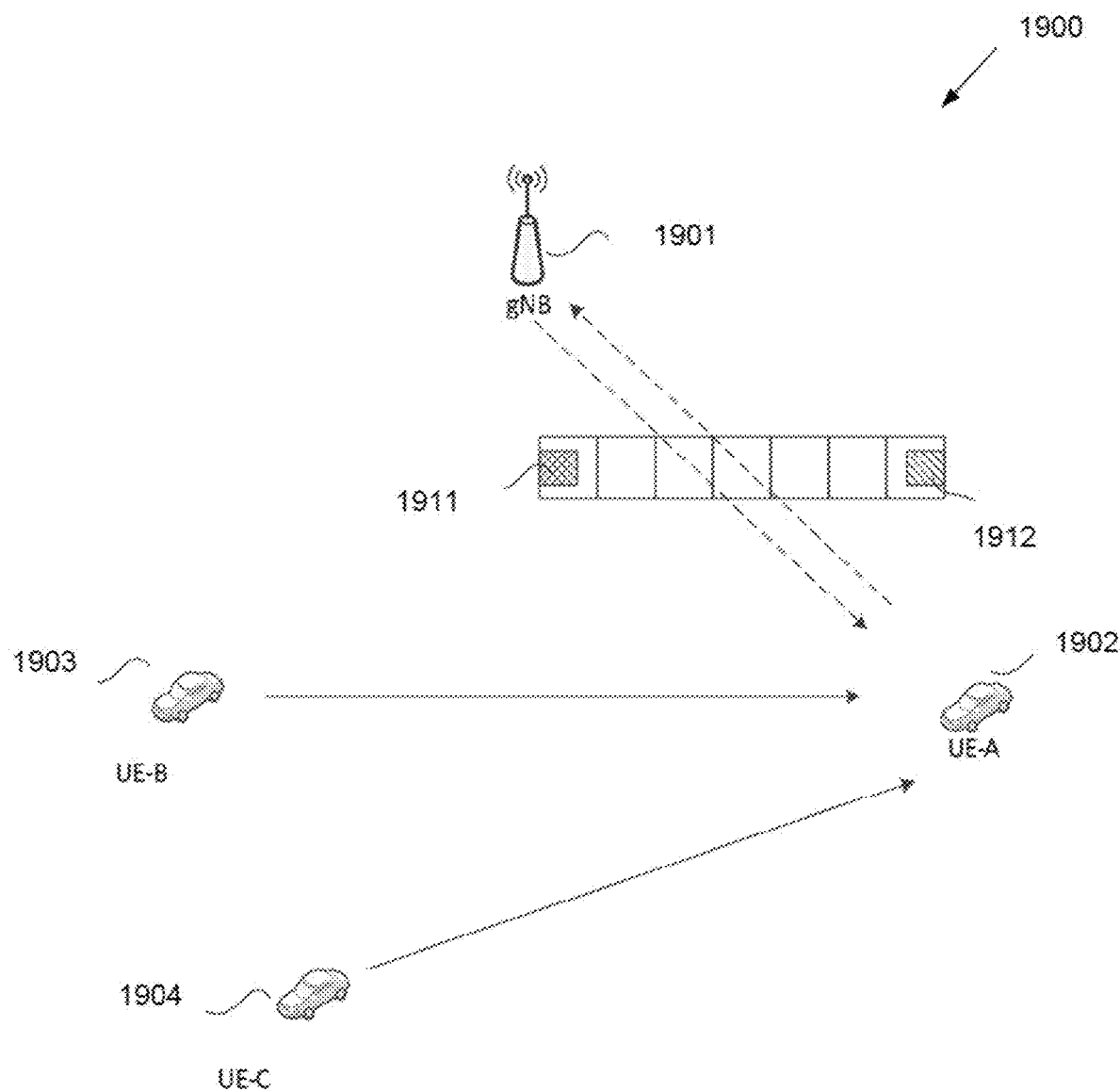
FIG. 19 illustrates an example procedure of sidelink CSI reporting according to embodiments of the present disclosure.

FIG. 19 illustrates an example procedure of sidelink CSI reporting 1900 according to embodiments of the present disclosure. The embodiment of the procedure of sidelink CSI reporting 1900 illustrated in FIG. 19 is for illustration only. FIG. 19 does not limit the scope of the present disclosure to any particular implementation.

As shown in FIG. 19, a serving gNB 1901 can indicate a UE-A 1902 to report the CSI of one or more sidelink connections to the gNB 1101. The serving gNB 1901 can send a request command (e.g., a higher layer signaling or a physical layer signaling DCI format) 1911 through the downlink transmission to request the UE-A 1902 to report the CSI of sidelink between the UE-A 1902 and the UE-B 1903. The gNB can also configure uplink resource (for example one PUCCH resource) 1912 for the UE-A 1902 to report the CSI of sidelink between the UE-A 1902 and the UE-B 1903. The gNB 1901 can request the UE-A 1902 to report the CSI of sidelink between the UE-A 1902 and the UE-B 1903 and the CSI of sidelink between the UE-A 1902 and the UE-C 1904 through the configured uplink resource (for example one PUCCH resource) 1912.

In some embodiments, a serving gNB can request a first UE to transmit sidelink reference signal and then request a second UE to measure the sidelink reference signal sent from a first UE and then a second UE to report the measured CSI to the serving gNB. The serving gNB can send higher layer signaling or physical layer signaling to a first UE and one or more of the following information elements can be include in that signaling. In one example, the configuration of the sidelink reference signals that the gNB requests a first UE to transmit. In one example, that can include the configuration of one sidelink reference signal resource and the time location (for example which sidelink slot and symbols) the first UE may transmit that sidelink reference signal.

In another example, the ID of a second UE who is requested to measure the sidelink reference signal sent by the first UE and then reports the CSI to the gNB.

In yet another example, the information on which CSI parameters may be reported, for example, CQI, RI, PMI, and SINR of sidelink.

In yet another example, the uplink channel or resource for the second UE to report the requested CSI of sidelink. In one example, that can be one PUCCH resource at some slot.

When the first UE receives the control signaling from the serving gNB, the first UE may formulate one sidelink control signaling accordingly and send the sidelink control signaling to the second UE and also transmits the sidelink reference signal as configured by the serving gNB.

The control signaling sent by the first UE can be a higher layer signaling or a physical layer signaling (for example one SCI format) and the first UE can include one or more of the following information elements in the control signaling: the ID of a second UE who is supposed to measure and report the CSI to the gNB; the configuration of the sidelink reference signal for the second UE to measure; and the uplink channel/resource for the second UE to report the CSI to the gNB.

The first UE can be requested to fill in those above information elements in this sidelink control signaling according to the control signaling received from the serving gNB.

Figure 20:
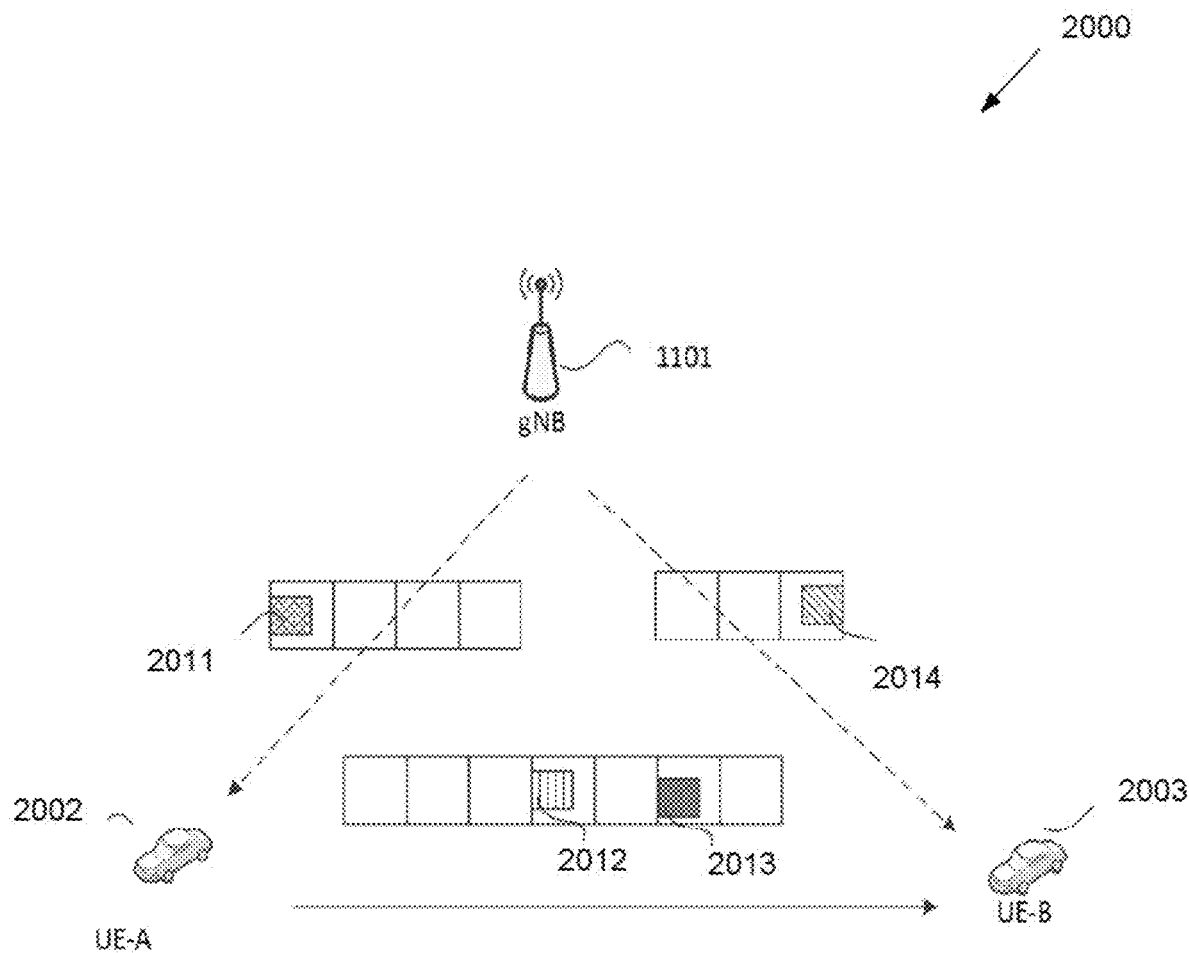
FIG. 20 illustrates an example procedure of sidelink CSI reporting according to embodiments of the present disclosure.

FIG. 20 illustrates an example procedure of sidelink CSI reporting 2000 according to embodiments of the present disclosure. The embodiment of the procedure of sidelink CSI reporting 2000 illustrated in FIG. 20 is for illustration only. FIG. 20 does not limit the scope of the present disclosure to any particular implementation.

As shown in FIG. 20, a serving gNB 2001 can send downlink signaling 2011 to the UE-A 2002 to schedule the UE-A to transmit sidelink reference signal on sidelink and request the UE-B 2003 to measure the CSI and then report the CSI of sidelink between the UE-A and the UE-B through the uplink channel 2014 (for example 2014 is one PUCCH resource).

In the control signaling 2011, the serving gNB 2001 can include one or more of the following information elements: the configuration of sidelink reference signal 2013 for the UE-A 2002 to transmit; the configuration of uplink channel 2014 for the UE-B 2003 to report CSI to the gNB 2001; and/or the ID of UE-B 2003 who is configured to measure and then report the CSI of sidelink between the UE-A 2002 and the UE-B 2003.

After receiving the control signaling 2011, the UE-A 2002 can transmit sidelink control signaling 2012 that can indicate the transmission of sidelink reference signal 2013 and can also indicate the UE-B 2003 to measure the sidelink reference signal 2013 and then report the measured CSI through uplink channel 2014 to the gNB 2001. The UE-A 2002 may fill in the bit-field in 2012 according to the configuration information in downlink control signaling 2011. The sidelink control signaling 2012 and the corresponding sidelink reference signal 2013 can be transmitted in different slot, in which case a time offset may be signaled in 2012 to indicate the time location of 2013.

The sidelink control signaling 2012 and the corresponding sidelink reference signal 2013 can be transmitted in the same slot, in which case the 2012 only needs to indicate the symbol location of 2013. The UE-B 2003 first detects the sidelink control signaling 2012. And then according to the configuration information in 2012, the UE-B 2003 measures the sidelink reference signal 2013 and report the CSI measured from sidelink reference signal 2013 through the uplink channel 2014 to the gNB.

For the V2X UEs being out-of-coverage of gNB, the transmission of sidelink reference signal and reporting CSI of sidelink cannot be scheduled by a gNB. To support the CSI measurement and feedback of sidelink, the first UE can send sidelink control signaling to a second UE to request the second UE to measure the CSI of the sidelink between the first UE and the second UE and then feedback the requested CSI quantity or quantities to the first UE. Examples of the CSI quantities can be CQI of the sidelink, RI and PMI.

In one embodiment, a UE-A can send a sidelink control signaling (for example SCI format sent in PSCCH) to a UE-B to request the measurement and reporting CSI of the sidelink between the UE-A and the UE-B. The control signaling the UE-A sends can include one or more of the following information elements: the ID of target UE, i.e., the ID of the UE-B; the configuration of transmission of sidelink reference signal for the UE-B to measure the requested CSI; and/or the configuration of sidelink feedback channel or resource for the UE-B to feedback the measured sidelink CSI.

In one example, a sidelink feedback channel for the UE-B to feedback CSI is a physical feedback channel (can be called PSFCH physical sidelink feedback channel). The control signaling of the UE-A can include the index of PSFCH channel and the slot index where the PSFCH is located.

In another example, a feedback CSI for the UE-B may be a PSSCH transmission from the UE-B to the UE-A, which can be a unicast transmission on sidelink.

In yet another example, a feedback CSI for the UE-B may be a sidelink MAC-CE message that contains the requested CSI measurement.

In one embodiment, in the configuration of one resource pool of sidelink resource, it can be configured that N≥1 sidelink reference signal resources. The configuration of sidelink reference signal resources can be part of the configuration of one sidelink resource pool. In one example, a gNB can use high layer signaling to configure one or multiple sidelink resource pool to a UE and in the configuration of one sidelink resource pool, the gNB can configure N≥1 sidelink reference signal resources.

In one example, one or multiple sidelink resource pools can be pre-configured for one geographical location and a UE can determine the configuration of sidelink resource pools according to his geographical location. Then from the configuration of one sidelink resource pool, the UE can determine the configuration of N≥1 sidelink reference signal resources.

The configuration of one sidelink reference signal can include: one ID for the sidelink reference signal (SL-RS) resource identity; the number of antenna ports and mapping configuration of the SL-RS resource, for example, including RE density; the symbol location of the SL-RS in one slot or in one sidelink subchannel. It can be the number of symbols and the index of starting symbol; the power offset between the SL-RS resource and the PSSCH sent by the same UE; the power offset between the SL-RS resource and the PSCCH sent by the same UE; and the scrambling ID of SL-RS resource.

In addition, the configuration of one sidelink reference signal can include a value of codepoint of a first bit-field in physical layer control signaling, for example one SCI format that corresponds to this SL-RS resource. In one example, a first SL-RS resource is configured with a value A of the codepoint of a first bit-field. Then if the UE-A transmit SCI format with a bit-field's codepoint=A, the first SL-RS resource is transmitted and the UE-B who detects the SCI format from the UE-A can measure the first SL-RS resource accordingly.

Note that multiple SL-RS resources can be configured with the same value of codepoint of a first bit-field in SCI. In this way, sending SCI format with a first bit-field's codepoint=that value can trigger the transmission of multiple SL-RS resources.

In one embodiment, the control signaling (for example one SCI format sent in PSCCH channel) sent from the UE-A can indicate the transmission of one SL-RS resource. In one example, the SCI format can include one bit-field as the indicator of one SL-RS resource to indicate the transmission of that SL-RS resource. In one example, the SCI format can include a first bit-field as the indicator of triggering the transmission of one or more SL-RS resources, and the mapping between the codepoints of a first bit-field and one or more SL-RS resources can be configured as part of the configuration of one sidelink resource pool.

In one embodiment, the transmission of PSSCH may do rate-match to a SL-RS transmission if the SL-RS and PSSCH are transmitted on same resource blocks and symbols. In one example, a UE-A can send one SCI format to indicate the transmission of a first PSSCH and also indicate the transmission of a first SL-RS resource. The SCI format includes the information of resource allocation and transmission configuration (for example, MCS level, transmission scheme, number of layers, DM-RS port(s) configuration) of the first PSSCH and also the indicator of a first SL-RS resource. The UE-A may do rate-match of a first PSSCH by skipping the REs where the first SL-RS resource is mapped and the receiver UE-B may assume the first PSSCH does rate match to the first SL-RS resource.

In one embodiment, a first UE can measure the channel and/or interference of one sidelink channel between a first UE and a second UE and then a first UE can report the CSI information of the sidelink channel between a first UE and a second UE to a second UE. Here a first UE can be a receiver UE to receiver transmission from a second UE, that can be a transmitter UE. A first UE can measure a reference signal transmitted by a second UE and the reference signal can be a SL-RS, or called SL-CSI-RS (sidelink CSI reference signal). A first UE can measure the DM-RS of PSSCH or PSCCH transmitted by a second UE to obtain the CSI of sidelink channel between a second UE and a first UE. A first UE can report the CSI information of sidelink channel between a first UE and a second UE through a sidelink feedback channel.

A first UE can report the CSI information of sidelink channel between a first UE and a second UE through PSSCH channel. A first UE can report the CSI information of sidelink channel between a first UE and a second UE to a serving gNB and the serving gNB can forward the CSI information to a second UE. A first UE can report the CSI information of sidelink channel between a first UE and a second UE to a serving gNB and then the serving gNB can schedule the transmission of a second UE on sidelink according to the CSI information reported by a first UE.

In one embodiment, a first UE can measure and report the CQI of sidelink channel between a first UE and a second UE. In one example, a first UE can report a wideband CQI of the sidelink channel between a first UE and a second UE and the CQI value can be represented by for example one 4-bit value. An example of 4-bit CQI is given in following TABLE 5.

TABLE 5

4 bit CQI

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A first UE can measure and report per-PSSCH subchannel CQI of sidelink channel between a first UE and a second UE. In the sidelink V2X resource pool configuration, one PSSCH subchannel can contain $N_s \geq 1$ PRBs. And a first UE can be requested to measure the CQI of one PSSCH subchannel, i.e., measure the CQI of PRBs within one PSSCH subchannel.

In one embodiment, a first UE can be requested to measure and report per-PSSCH subchannel CQI of one indicated PSSCH subchannel.

In one embodiment, a first UE can be requested to measure and report per-PSSCH subchannel CQI of all PSSCH subchannels configured in the PSSCH resource pool. In one example, a first UE can report the following CQI information: the first UE can report one or more sets (or pair) of {CQI value, index of PSSCH subchannel}. In each reported set (or pair), the reported CQI value is the CQI value measured from the PSSCH subchannel indicated by the index of PSSCH subchannel in the same reporting set.

In one example, a first can report the following CQI information: the UE can report one wideband CQI and one or more differential CQI per PSSCH subchannel. The differential CQI for a PSSCH subchannel can be calculated with a reference to the wideband CQI. In one example differential CQI value can use 2 bit and an example of differential CQI value is shown in below TABLE 6.

TABLE 6

CQI value and offset level

| Per-PSSCH subchannel differential CQI value | Offset level |
| --- | --- |
| 0 | 0 |
| 1 | 1 |
| 2 | ≥2 |
| 3 | ≤−1 |

In one example, a first UE can report the following CQI information: the first UE can report one or more CQI values $\{CQI_1, CQI_2, CQI_3, \ldots\}$ and one PSSCH subchannel index $p_0$. The reported $p_0$ is the starting PSSCH subchannel index where a first UE reports CQI. In the report, $CQI_1$ is the CQI of PSSCH subchannel $p_0$, $CQI_2$ is the CQI of PSSCH subchannel $p_0+1$, CQI3 is the CQI of PSSCH subchannel $p_0+2$, so on so forth.

In one example, a first UE can report the following CQI information: the first UE can report one or more CQI values $\{CQI_1, CQI_2, CQI_3, \ldots\}$. In the report, $CQI_1$ is the CQI of PSSCH subchannel with lowest index in the configured resource pool, $CQI_2$ is the CQI of PSSCH subchannel with the second lowest index in the configured resource pool. $CQI_3$ is the CQI of PSSCH subchannel with the third lowest index in the configured resource pool, so on so forth.

In one example, a first UE can report the following CQI information: the first UE can report one or more CQI values $\{CQI_1, CQI_2, CQI_3, \ldots\}$. In the report, $CQI_1$ is the CQI of PSSCH subchannel with lowest index within the bandwidth where the UE measures the reference signal for CQI; $CQI_2$ is the CQI of PSSCH subchannel with the second lowest index within the bandwidth where the UE measures the reference signal for CQI; $CQI_3$ is the CQI of PSSCH subchannel with the third lowest index within the bandwidth where the UE measures the reference signal for CQI, so on so forth.

In one embodiment, a first UE can be requested to measure and report the CQI and RI (rank indicator) of one sidelink channel between a first UE and a second UE. The information of CQI and RI is can be used by a transmitter UE to choose proper MIMO transmission parameters, for example, the number of layers in MIMO transmission and the level of MCS chosen for MIMO transmission. In one implementation example, a UE B can measure the CQI and RI of sidelink channel between the UE A and the UE B and then report the CQI and RI to UE B through some direct or indirect ways. And the UE B can measure the precoder (or called PMI information) of the sidelink channel from the UE-B to the UE-A based on the channel reciprocity. Then the UE B can transmit PSSCH with some MIMO configuration with the number of layers and MCS level determined according to the RI and CQI reported from UE-A and MIMO precoder(s) based on the channel reciprocity measurement.

In one embodiment, a first UE can be requested to report one RI and one CQI corresponding to the reported RI of the sidelink channel between a first UE and a second UE. Such reporting information is useful for the transmitter UE to choose proper number of layers and proper MCS level for the MIMO transmission to a receiver UE.

In one embodiment, a first UE can be requested to report one or more of the following information: one RI value; one wideband CQI value; and/or one or more per-PSSCH subchannel CQI values. The per-PSSCH subchannel CQI can also be represented by a per-PSSCH subchannel differential CQI with reference to wideband CQI value.

The aforementioned reporting information can be useful for a transmitter UE to schedule sidelink transmission flexibly. The UE can choose proper transmission parameters based on the resource allocation.

In one embodiment, a first UE can be requested to report one or multiple pairs of $\{RI, CQI\}$. In each reported pair of $\{RI, CQI\}$, the RI can indicate one value of rank indicator and the CQI is the corresponding CQI. For example, the UE can report $\{RI=0, CQI_1\}$, $\{RI=1, CQI_2\}$ where CQI1 is the CQI corresponding to when one layer is chosen and $CQI_2$ is the CQI corresponding to when two layers is chosen.

In one embodiment, a first UE can measure the sidelink channel between a first UE and a second UE and then report the following CSI information.

In one example, a first UE can report a set of one or more CQI values: $\{CQI_1, CQI_2, CQI_3, CQI_4\}$ where $CQI_1$ is the CQI value corresponding to RI=0 (i.e., number of layer=1) and $CQI_2$ is the CQI value corresponding to RI=1 (i.e., the number of layers=2), $CQI_3$ is the CQI value corresponding to RI=2 (i.e., the number of layers=3) and CQI4 is the CQI value corresponding to RI=3 (i.e., the number of layers=4).

In another example, a first UE can report one or more wideband CQI values, for example $\{w\_CQI_1, w\_CQI_2, w\_CQI_3, w\_CQI_4\}$ and one or more sets of per-PSSCH subchannel differential CQIs, for example, $\{\{CQI_{11}, CQI_{12}, \ldots\}, \{CQI_{21}, CQI_{22}, \ldots\}, \{CQI_{31}, CQI_{32}, \ldots\}, \{CQI_{41}, CQI_{42}, \ldots\}\}$.

In such examples, in the report, $w\_CQI_1$ is the wideband CQI value corresponding to RI=0 (i.e., number of layer=1) and $CQI_{11}, CQI_{12}, \ldots$ are per-PSSCH subchannel differential CQI with reference to $CQI_1$, corresponding to corresponding to RI=0 (i.e., number of layer=1).

In such examples, in the report, $w\_CQI_2$ is the wideband CQI value corresponding to RI=1 (i.e., number of layer=2) and $CQI_{21}, CQI_{22}, \ldots$ are per-PSSCH subchannel differential CQI with reference to $CQI_2$, corresponding to corresponding to RI=1 (i.e., number of layer=2).

In such examples, in the report, $w\_CQI_3$ is the wideband CQI value corresponding to RI=2 (i.e., number of layer=3) and $CQI_{31}, CQI_{32}, \ldots$ are per-PSSCH subchannel differential CQI with reference to $CQI_3$, corresponding to corresponding to RI=2 (i.e., number of layer=3).

In such examples, in the report, $w\_CQI_4$ is the wideband CQI value corresponding to RI=3 (i.e., number of layer=4) and $CQI_{41}, CQI_{42}, \ldots$ are per-PSSCH subchannel differential CQI with reference to $CQI_4$, corresponding to corresponding to RI=3 (i.e., number of layer=4).

The aforementioned embodiments are useful for the transmitter UE to choose proper number of layers. With such reporting, the transmitter UE knows the CQIs of various RIs. The transmitter then can choose proper number of layers and then choose proper MCS level accordingly.

In one embodiment, a first UE can measure the sidelink channel between a first UE and a second UE and then report the following CSI information.

In one example, a first UE can report a set of one or more CQI values $\{CQI_1, CQI_2, CQI_3\}$ and one RI value RI, where $CQI_1$ is the CQI value corresponding to $RI=RI_1$ and $CQI_2$ is the CQI value corresponding to $RI=R_1+1$ and $CQI_3$ is the CQI value corresponding to $RI=R_1+2$.

In one example, a first UE can report one or more wideband CQI values, for example $\{w\_CQI_1, w\_CQI_2, w\_CQI_3\}$ and one or more sets of per-PSSCH subchannel differential CQIs, for example, $\{\{CQI_{11}, CQI_{12}, \ldots\}, \{CQI_{21}, CQI_{22}, \ldots\}, \{CQI_{31}, CQI_{32}, \ldots\}\}$ and one RI value, for example RI: in the report, $w\_CQI_1$ is the wideband CQI value corresponding to $RI=RI_1$ and $CQI_{11}, CQI_{12}, \ldots$ are per-PSSCH subchannel differential CQI with reference to $CQI_1$, corresponding to corresponding to $RI=RI_1$; in the report, $w\_CQI_2$ is the wideband CQI value corresponding to $RI=RI_1+1$ and $CQI_{21}, CQI_{22}, \ldots$ are per-PSSCH subchannel differential CQI with reference to $CQI_2$, corresponding to corresponding to $RI=RI_1+1$; and/or In the report, $w\_CQI_3$ is the wideband CQI value corresponding to $RI=RI_1+2$ and $CQI_{31}, CQI_{32}, \ldots$ are per-PSSCH subchannel differential CQI with reference to $CQI_3$, corresponding to corresponding to $RI=RI_1+2$.

In one embodiment, a first UE can be requested to measure and report the information of CQI, RI and PMI of one sidelink channel between a first UE and a second UE. Such CSI reporting is useful for a transmitter to choose proper configuration for PSSCH transmission on sidelink. The CQI can help the transmitter to choose proper MCS level and the RI can help the transmitter to choose proper number of layers in MIMO transmission and the PMI information can help the transmitter to formulate precoder(s) for MIMO transmission.

In one embodiment, a first UE can be requested to report RI, wideband CQI and wideband PMI.

In one embodiment, a first UE can be requested to report RI, wideband CQI and per-PSSCH subchannel PMI(s).

In one embodiment, a first UE can be requested to report RI, wideband CQI, per-PSSCH subchannel differential CQI(s) and per-PSSCH subchannel PMI(s).

In one embodiment, a first UE can be requested to report one or more sets of {CQI, PMI} for example {{$CQI_1$, $PMI_1$}, {$CQI_2$, $PMI_2$}, {$CQI_3$, $PMI_3$}, {$CQI_4$, $PMI_4$}}: in the report, $CQI_1$ and $PMI_1$ are the CQI value and PMI value correspond to RI=0; $CQI_2$ and $PMI_2$ are the CQI value and PMI value correspond to RI=1; $CQI_3$ and $PMI_3$ are the CQI value and PMI value correspond to RI=2; $CQI_4$ and $PMI_4$ are the CQI value and PMI value correspond to RI=3; the CQI value can be one wideband CQI; the CQI value can be one wideband CQI and one or multiple per-PSSCH subchannel differential CQI with reference to the corresponding wideband CQI; the PMI can be wideband PMI; and/or the PMI can be one or more per-PSSCH subchannel PMI values.

In one example, a first UE can also report one RI value, for example RI1, in addition to those reported sets of {CQI, PMI}. The $RI_1$ is the least RI value corresponding to the CQI/PMI reported. For example, the reported value of {$CQI_1$, $PMI_1$} correspond to RI=$RI_1$; the reported value of {$CQI_2$, $PMI_2$} correspond to RI=$RI_1$+1 and the reported value of {$CQI_3$, $PMI_3$} correspond to RI=$RI_1$+2.

In one embodiment, a first UE can be requested to measure and report the CSI of one sidelink channel between a first UE and a second UE to a serving gNB. The first UE can report one or more of the following information to the serving gNB: the identity of a second UE; the identity of a first UE; one or more wideband CQI; If one wideband CQI, the CQI is the value corresponding to one particular RI. If multiple wideband CQIs, the CQI values can correspond to different RI values; one or more per-PSSCH subchannel CQI values; A per-PSSCH subchannel CQI value information can be presented by an absolute CQI value. A per-PSSCH subchannel CQI value information can be presented by a differential CQI with reference to a wideband CQI. The associated wideband CQI and differential CQI may correspond to one same RI value; one or more sets of wideband PMIs. If one set of wideband PMI(s), the PMI(s) is the value corresponding to one particular RI. If multiple sets of wideband PMI, the PMI(s) can correspond to different RI values; and/or one or more per-PSSCH subchannel PMI, which the PMI of one PSSCH subchannel.

In one embodiment, a first UE can be requested to measure and report the RSRP (reference signal received power) (or called L1-RSRP layer 1-RSRP) of the sidelink channel between a first UE and a second UE. Reporting RSRP to the transmitter UE is useful for the transmitter UE to do proper power control for transmission on sidelink.

In one embodiment, a sidelink UE can be configured to transmit sidelink feedback control information (SFCI) through a sidelink feedback channel, or PSCCH channel to another sidelink UE or uplink channel to a serving gNB. The UE can be configured one or more SFCI formats and different SFCI format can include different reporting quantities.

In one example, there may be one or more of the following SFCI formats: a first SFCI format, the UE is configured to report {CQI and RI} of one sidelink; a second SFCI format, the UE is configured to report $CQI_1$ and $CQI_2$, where CQI is the CQI corresponding to rank=1 and $CQI_2$ is the CQI corresponds to rank=2; a third SFCI format, the UE is configured to report one RSRP value of one sidelink. The RSRP can be measured from one sidelink RS. The RSRP can be measured from one sidelink channel. This SFCI information would be useful for one UE to calculate the pathloss between two sidelink UEs; a fourth SCFI format, the UE is configured to report the measured pathloss of one sidelink. The pathloss can be measured based on one SL RS sent by another UE through sidelink and the UE can assume the transmit power of that SL RS is some value; and a fifth SCFI format, the UE can be configured to report CQI, where CQI is the CQI measured of one sidelink connection. The CQI can be measured based on some SL-RS transmission or based on the DM-RS in PSSCH or PSCCH transmission.

In some embodiments, a UE can be requested to calculate the transmit power for a transmission on sidelink. A transmission on sidelink can be a transmission of SA (scheduling assignment) signaling in, e.g., a sidelink physical layer control channel (for example can be called PSCCH). A transmission on sidelink can be a transmission of data in sidelink physical channel (for example it can be called PSCCH). A transmission on sidelink can be transmission of feedback information in sidelink physical feedback channel (for example it can be called PSFCH (physical sidelink feedback channel)). When one UE-A has some transmission on sidelink, to determine the transmit power of one transmission on sidelink, the UE-A can be requested to include one or more of the following items.

In one example, the pathloss of sidelink channel between the UE-A and the receive UE is considered. If one transmission is groupcast, the transmitter UE can include the pathloss of sidelink channels between the UE-A and those multiple receive UEs. If one transmission is broadcast, the UE-A can include the pathloss of some expected transmission communication range.

In another example, the scenario of whether the UE-A is in the coverage of one gNB (or eNB) or not. The UE-A can apply different power control schemes for transmission on sidelink for the case of being in-coverage and the cases of being out of coverage.

In yet another example, the pathloss of communication between a serving gNB or eNB and the UE-A.

In yet another example, the multiplexing scheme of physical layer sidelink control channel (PSCCH) and physical layer sidelink data channel (PSSCH) and physical layer feedback channel. The UE-A may consider whether PSCCH and PSSCH and sidelink feedback channel are time division multiplexing (TDM) multiplexed or frequency division multiplexing (FDM) multiplexed.

In yet another example of the type of transmission, whether the transmission is unicast, groupcast or broadcast is considered. The UE-A can apply different power control scheme for different types of transmissions.

In yet another example, the MCS (modulation coding scheme) level that is used in the transmission.

In yet another example, the busy ratio of resource pool, which can be measured the percentage of resources are occupied in the resource pool In yet another example, the minimum transmission range and the maximal transmission range. That can be applied to a broadcast transmission. The UE-A can first estimate the pathloss that can cover the maximal expected transmission range for one broadcast transmission and calculate the Tx power accordingly.

Figure 21:
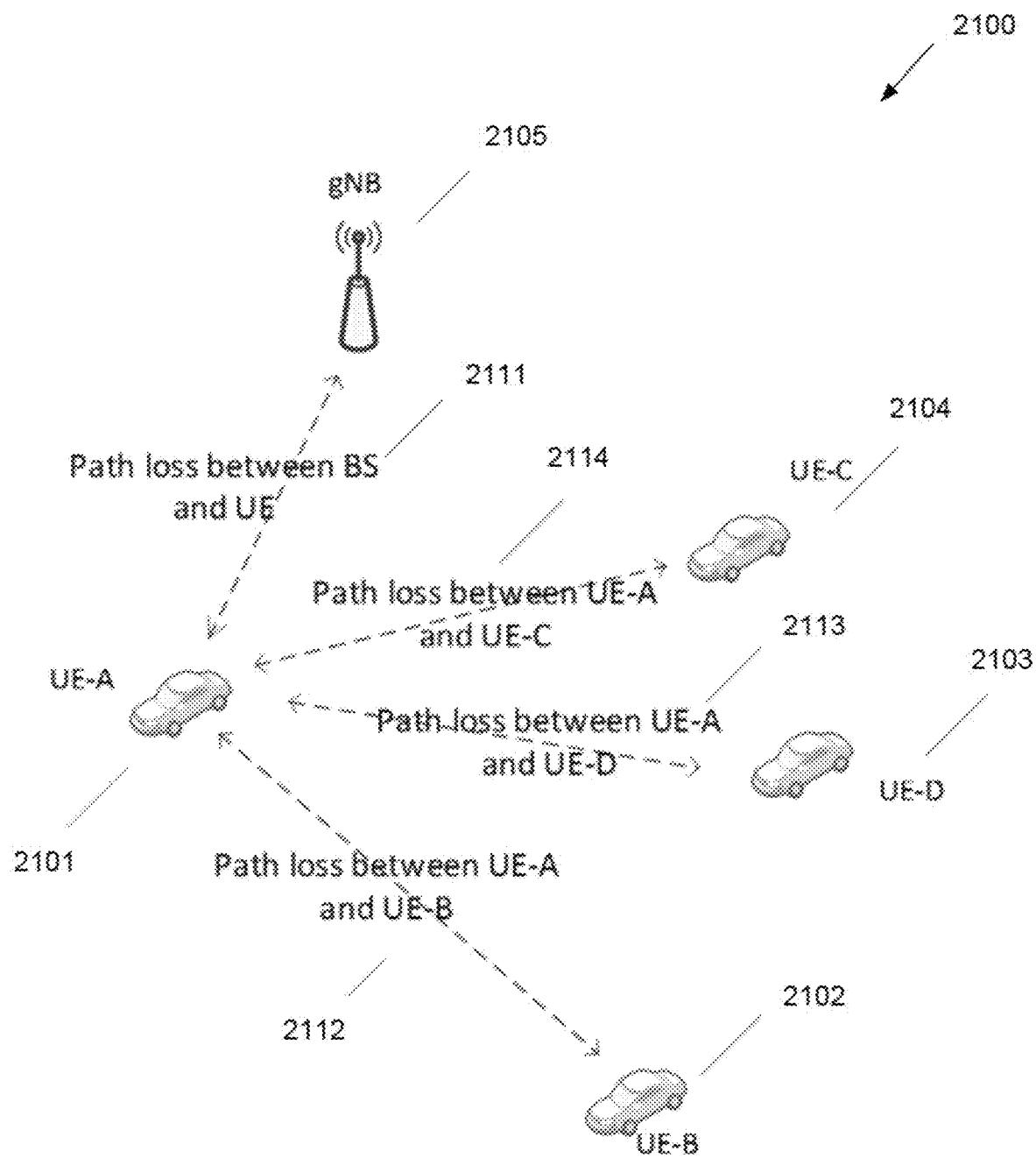
FIG. 21 illustrates an example sidelink power control according to embodiments of the present disclosure.

FIG. 21 illustrates an example sidelink power control 2100 according to embodiments of the present disclosure. The embodiment of the sidelink power control 2100 illustrated in FIG. 21 is for illustration only. FIG. 21 does not limit the scope of the present disclosure to any particular implementation.

As shown in FIG. 21, a UE-A 2101 can transmit data to a UE-B 2102 through sidelink. For the transmission on sidelink to a UE-B 2102, the UE-A can calculate the Tx power by including the pathloss 2112 of sidelink connection between the UE-A 2101 and the UE-B 2102. When the UE-A 2101 transmits a groupcast data to the UE-B 2102 and the UE-C 2104, the UE-A 2101 may calculate the Tx beam by including both pathloss 2112 of sidelink between the UE-A and the UE-B and pathloss 2113 of sidelink between the UE-A and the UE-C. When the UE-A 2101 transmits a broadcast data to all the UEs, including the UE-B 2102, the UE-C 2104 and the UE-D 2103, the UE-A 2101 may include the pathloss of maximal transmission range (or the largest pathloss of all receiver UEs) in the calculation of Tx power.

The UE-A can be in the coverage of one gNB 2105 and the UE-A may include the pathloss between the UE-A 2101 and the gNB 2105 in the calculation of Tx power for sidelink if the carrier frequency used for sidelink transmission is same to the carrier frequency used for uplink transmission of the gNB 2105.

In one embodiment, a UE-A may calculate the Tx power $P_{PSSCH}$ for data channel PSSCH transmission as: $P_{PSSCH}$ min$\{P_{C\,MAX}, 10\,\log_{10}(2^\mu \times M_{PSSCH}) + P_{0,PSSCH} + \Delta + \alpha_{PSSCH} \times PL_{SL}\}$ where $P_{C\,MAX}$ is the configured maximal Tx power the UE-A can transmit, $M_{PSSCH}$ is the PSSCH transmission bandwidth that can be expressed in number of PRBs, $P_{0,PSSCH}$ is configured by higher layer parameter as the power control parameter for PSSCH transmission that can be function of sidelink packet QoS and/or priority. $\alpha_{PSSCH}$ is configured by higher layer parameter as the power control parameter for PSSCH transmission that can be a function of packet type (for example, unicast transmission, groupcast transmission or broadcast transmission). $\Delta$ is the power level adjustment parameter for MCS level. $PL_{SL}$ is the pathloss of sidelink. In sidelink, flexible numerology can be supported.

Different subcarrier spacing may be used for different deployment scenarios or different application requirement. Thus, one parameter is required in power calculation to represent the selection of subcarrier spacing. $\mu$ is the parameter to represent the subcarrier spacing used for that PSFCH transmission. In one example, $\mu$=1, 2, 4, 8, 16 are for subcarrier spacing=15 KHz, 30 KHz, 60 KHz, 120 KHz and 240 KHz, respectively.

In one example, when a UE-A transmits PSSCH to a UE-B and the pathloss of sidelink between the UE-A and the UE-B is $PL_0$, then the transmit power for the UE-A transmitting PSSCH to the UE-B is given by $P_{PSSCH}$ min$\{P_{C\,MAX}, 10\,\log_{10}(2^\mu \times M_{PSSCH}) + P_{0,PSSCH} + \Delta + \alpha_{PSSCH,0} \times PL_0\}$ where $\alpha_{PSSCH,0}$ can be configured by higher layer parameter as the power control parameter for a unicast transmission and $PL_0$ is the pathloss of sidelink between the UE-A and the UE-B.

In one example, when a UE-A transmits PSSCH to a group of UEs for example including {UE-1, UE-2, . . . , UE-N} and the pathloss of sidelink between the UE-A and the UEs in the target group is $\{PL_{1,1}, PL_{1,2}, \ldots, PL_{1,N}\}$ then the transmit power for the UE-A transmitting groupcast PSSCH to {UE-1, UE-2, . . . , UE-N} is given by $P_{PSSCH}$ min$\{P_{C\,MAX}, 10\,\log_{10}(2^\mu \times M_{PSSCH}) + P_{0,PSSCH} + \Delta + \alpha_{PSSCH,1} \times \max\{PL_{1,1}, PL_{1,2}, \ldots, PL_{1,N}\}\}$ where $\alpha_{PSSCH,1}$ can be configured by higher layer parameter as the power control parameter for a groupcast transmission.

In one example, when a UE-A transmits PSSCH to broadcast to all the UEs. The UE-A can expect the maximal transmission range is L. Then the transmit power for UE-A transmitting broadcast PSSCH is given by $P_{PSSCH}$ min $\{P_{C\,MAX}, 10\,\log_{10}(2^\mu \times M_{PSSCH}) + P_{0,PSSCH} + \Delta + \alpha_{PSSCH,2} \times PL_2\}$ where $\alpha_{PSSCH,2}$ can be configured by higher layer parameter as the power control parameter for a broadcast transmission on sidelink. $PL_2$ is the pathloss corresponding the expected maximal transmission range L. $PL_2$ can be configured by higher layer. $PL_2$ can be calculated based on the estimated maximal transmission range L.

In one embodiment, a UE-A may calculate the Tx power $P_{PSSCH}$ for data channel PSSCH transmission as $P_{PSSCH}$=min$\{P_{C\,MAX}, 10\,\log_{10}(2^\mu \times M_{PSSCH}) + P_{0,PSSCH} + \Delta + $min$\{\alpha_{PSSCH,SL} \times PL_{SL}, \alpha_{PSSCH,NR} \times PL_{NR}\}\}$ where $P_{C\,MAX}$ is the configured maximal Tx power the UE-A can transmit, $M_{PSSCH}$ is the PSSCH transmission bandwidth that can be expressed in number of PRBs, $P_{0,PSSCH}$ is configured by higher layer parameter as the power control parameter for PSSCH transmission that can be function of sidelink packet QoS and/or priority. $\alpha_{PSSCH,SL}$ is configured by higher layer parameter as the sidelink power control parameter for PSSCH transmission that can be a function of packet type (for example, unicast transmission, groupcast transmission or broadcast transmission). $\Delta$ is the power level adjustment parameter for MCS level. $PL_{SL}$ is the pathloss of sidelink. $\alpha_{PSSCH,NR}$ is configured by higher layer parameter as the power control adjustment parameter considering the impact on uplink transmission and $PL_{NR}$ is the pathloss of link between the UE-A and a serving gNB. $\mu$ is the parameter to represent the subcarrier spacing used for that PSFCH transmission. In one example, $\mu$=1, 2, 4, 8, 16 are for subcarrier spacing=15 KHz, 30 KHz, 60 KHz, 120 KHz, and 240 KHz, respectively.

In one example, when a UE-A transmits PSSCH to a UE-B and the pathloss of sidelink between the UE-A and the UE-B is $PL_0$, then the transmit power for UE-A transmitting PSSCH to UE-B is given by $P_{PSSCH}$ min$\{P_{C\,MAX}, 10\,\log_{10}(2^\mu \times M_{PSSCH}) + P_{0,PSSCH} + \Delta + $min$\{\alpha_{PSSCH,SL0} \times PL_{SL0}, \alpha_{PSSCH,NR} \times PL_{NR}\}\}$ where $\alpha_{PSSCH,SL0}$ can be configured by higher layer parameter as the power control parameter for a unicast transmission and $PL_{SL0}$ is the pathloss of sidelink between the UE-A and the UE-B.

In one example, when a UE-A transmits PSSCH to a group of UEs for example including {UE-1, UE-2, . . . , UE-N} and the pathloss of sidelink between UE-A and the UEs in the target group is $\{PL_{1,1}, PL_{1,2}, \ldots, PL_{1,N}\}$ then the transmit power for UE-A transmitting groupcast PSSCH to {UE-1, UE-2, . . . , UE-N} is given by $$P_{PSSCH} = \min \left\{ \begin{array}{l} P_{CMAX}, \\ 10\log_{10}(2^\mu \times M_{PSSCH}) + P_{0,PSSCH} + \Delta + \\ \min\{\alpha_{PSSCH,1} \times \max\{PL_{1,1}, PL_{1,2}, \ldots PL_{1,N}\}, \alpha_{PSSCH,NR} \times PL_{NR}\} \end{array} \right\}$$

where $\alpha_{PSSCH,1}$ can be configured by higher layer parameter as the power control parameter for a groupcast transmission.

In one example, when a UE-A transmits PSSCH to broadcast to all the UEs. The UE-A can expect the maximal transmission range is L. Then the transmit power for UE-A transmitting broadcast PSSCH is given by: $P_{PSSCH}$ min $\{P_{C\ MAX}, 10\ \log_{10}(2^\mu \times M_{PSSCH}) + P_{0,PSSCH} + \Delta + \min\{\alpha_{PSSCH,SL2} \times PL_{SL2}, \alpha_{PSSCH,NR} \times PL_{NR}\}\}$ where $\alpha_{PSSCH,SL2}$ can be configured by higher layer parameter as the power control parameter for a broadcast transmission on sidelink. $PL_{SL2}$ is the pathloss corresponding the expected maximal transmission range L. $PL_{SL2}$ can be configured by higher layer. $PL_{SL2}$ can be calculated based on the estimated maximal transmission range L.

In one embodiment, a UE-A may calculate the Tx power $P_{PSCCH}$ for data channel PSCCH transmission as $P_{PSCCH}$ min$\{P_{C\ MAX}, 10\ \log_{10}(2^\mu \times M_{PSCCH}) + P_{0,PSCCH} + \alpha_{PSCCH} \times PL_{SL}\}$ where $P_{C\ MAX}$ is the configured maximal Tx power the UE-A can transmit, $M_{PSCCH}$ is the transmission bandwidth of PSCCH that can be expressed as the number PRBs, $P_{0,PSCCH}$ is configured by higher layer parameter as the power control parameter for PSCCH transmission that can be function of sidelink packet QoS and/or priority. $\alpha_{PSCCH}$ is configured by higher layer parameter as the power control parameter for PSCCH transmission that can be a function of packet type (for example, unicast transmission, groupcast transmission or broadcast transmission). $PL_{SL}$ is the pathloss of sidelink. $\mu$ is the parameter to represent the subcarrier spacing used for that PSFCH transmission. In one example, $\mu=1, 2, 4, 8, 16$ are for subcarrier spacing=15 KHz, 30 KHz, 60 KHz, 120 KHz and 240 KHz, respectively.

In one embodiment, when a UE-A transmits PSCCH to schedule PSSCH transmission to a UE-B and the pathloss of sidelink between UE-A and UE-B is $PL_0$, then the transmit power for UE-A transmitting PSSCH to UE-B is given by $P_{PSCCH}$ min$\{P_{C\ MAX}, 10\ \log_{10}(2^\mu \times M_{PSCCH}) + P_{0,PSCCH} + \alpha_{PSCCH,0} \times PL_0\}$ where $\alpha_{PSCCH,0}$ can be configured by higher layer parameter as the power control parameter for a PSCCH that schedules a unicast transmission and $PL_0$ is the pathloss of sidelink between the UE-A and the UE-B.

In one embodiment, when a UE-A transmits PSCCH to schedule PSSCH transmission to a group of UEs for example including {UE-1, UE-2, . . . , UE-N} and the pathloss of sidelink between the UE-A and the UEs in the target group is $\{PL_{1,1}, PL_{1,2}, \ldots, PL_{1,N}\}$ then the transmit power for UE-A transmitting groupcast PSSCH to {UE-1, UE-2, . . . , UE-N} is given by $P_{PSCCH}=\min\{P_{C\ MAX}, 10\ \log_{10}(2^\mu \times M_{PSCCH}) + P_{0,PSCCH} + \alpha_{PSCCH,1} \times \max\{PL_{1,1}, PL_{1,2}, \ldots, PL_{1,N}\}\}$ where $\alpha_{PSCCH,1}$ can be configured by higher layer parameter as the power control parameter for a PSCCH that schedules a groupcast transmission.

In one embodiment, when a UE-A transmits PSCCH to schedule a broadcast to all the UEs. The UE-A can expect the maximal transmission range is L. Then the transmit power for UE-A transmitting broadcast PSSCH is given by $P_{PSCCH}$ min$\{P_{C\ MAX}, 10\ \log_{10}(2^\mu \times M_{PSCCH}) + P_{0,PSCCH} + \alpha_{PSCCH,2} \times PL_2\}$ where $\alpha_{PSCCH,2}$ can be configured by higher layer parameter as the power control parameter for a PSCCH that schedules a broadcast transmission on sidelink. $PL_2$ is the pathloss corresponding the expected maximal transmission range L. $PL_2$ can be configured by higher layer. $PL_2$ can be calculated based on the estimated maximal transmission range L.

In one embodiment, a UE-A may calculate the Tx power $P_{PSCCH}$ for a PSCCH transmission as $P_{PSCCH}$ min$\{P_{C\ MAX}, 10\ \log_{10}(2^\mu \times M_{PSCCH}) + P_{0,PSCCH} + \min\{\alpha_{PSCCH,SL} \times PL_{SL}, \alpha_{PSCCH,NR} \times PL_{NR}\}\}$ where $P_{C\ MAX}$ is the configured maximal Tx power the UE-A can transmit, $M_{PSCCH}$ is the PSCCH transmission bandwidth that can be expressed in number of PRBs, $P_{0,PSCCH}$ is configured by higher layer parameter as the power control parameter for PSCCH transmission that can be function of sidelink packet QoS and/or priority. $\alpha_{PSCCH,SL}$ is configured by higher layer parameter as the sidelink power control parameter for PSCCH transmission that can be a function of packet type (for example, unicast transmission, groupcast transmission or broadcast transmission). $PL_{SL}$ is the pathloss of sidelink. $\alpha_{PSCCH,NR}$ is configured by higher layer parameter as the power control adjustment parameter considering the impact on uplink transmission and $PL_{NR}$ is the pathloss of link between UE-A and a serving gNB. $\mu$ is the parameter to represent the subcarrier spacing used for that PSFCH transmission. In one example, $\mu=1, 2, 4, 8, 16$ are for subcarrier spacing=15 KHz, 30 KHz, 60 KHz, 120 KHz, and 240 KHz, respectively.

In one embodiment, when a UE-A transmits PSCCH to schedule a unicast PSSCH transmission to a UE-B and the pathloss of sidelink between UE-A and UE-B is $PL_0$, then the transmit power for UE-A transmitting PSSCH to UE-B is given by $P_{PSCCH}=\min\{P_{C\ MAX}, 10\ \log_{10}(2^\mu \times M_{PSCCH}) + P_{0,PSCCH} + \Delta + \min\{\alpha_{PSCCH,SL0} \times PL_{SL0}, \alpha_{PSCCH,NR} \times PL_{NR}\}\}$ where $\alpha_{PSCCH,SL0}$ can be configured by higher layer parameter as the power control parameter for PSCCH that schedules a unicast transmission and $PL_{SL0}$ is the pathloss of sidelink between the UE-A and UE-B.

In one embodiment, when a UE-A transmits a PSCCH to schedule a PSSCH to a group of UEs for example including {UE-1, UE-2, . . . , UE-N} and the pathloss of sidelink between UE-A and the UEs in the target group is $\{PL_{1,1}, PL_{1,2}, \ldots, PL_{1,N}\}$ then the transmit power for UE-A transmitting groupcast PSSCH to {UE-1, UE-2, . . . , UE-N} is given by $$P_{PSCCH} = \min\left\{\begin{array}{l} P_{CMAX}, \\ 10\log_{10}(2^\mu \times M_{PSCCH}) + P_{0,PSCCH} + \Delta + \\ \min\{\alpha_{PSCCH,1} \times \max\{PL_{1,1}, PL_{1,2}, \ldots, PL_{1,N}\}, \alpha_{PSCCH,NR} \times PL_{NR}\} \end{array}\right\}$$

where $\alpha_{PSCCH,1}$ can be configured by higher layer parameter as the power control parameter for a PSCCH that schedules a groupcast transmission.

In one embodiment, when a UE-A transmits PSSCH to broadcast to all the UEs. The UE-A can expect the maximal transmission range is L. Then the transmit power for UE-A transmitting broadcast PSSCH is given by $P_{PSCCH}$ min $\{P_{C\ MAX}, 10\ \log_{10}(2^\mu \times M_{PSCCH}) + P_{0,PSCCH} + \Delta + \min\{\alpha_{PSCCH,SL2} \times PL_{SL2}, \alpha_{PSCCH,NR} \times PL_{NR}\}\}$ where $\alpha_{PSCCH,SL2}$ can be configured by higher layer parameter as the power control parameter for a PSCCH that schedules broadcast transmission on sidelink. $PL_{SL2}$ is the pathloss corresponding the expected maximal transmission range L. $PL_{SL2}$ can be configured by higher layer. $PL_{SL2}$ can be calculated based on the estimated maximal transmission range L.

In one embodiment, a UE-A may calculate the Tx power $P_{SL\_feedback}$ for a transmission on sidelink feedback channel as $P_{SL\_feedback}$ min$\{P_{C\ MAX}, 10\ \log_{10}(2^\mu \times M_{SL\_feedback}) + P_{0,SL\_feedback} + \alpha_{SL\_feedback} \times PL_{SL}\}$ where $P_{C\ MAX}$ is the configured maximal Tx power the UE-A can transmit, $M_{SL\_feedback}$ is the transmission bandwidth of sidelink feedback that can be expressed as the number PRBs, $P_{0,SL\_feedback}$ is configured by higher layer parameter as the power control parameter for feedback transmission that can be function of sidelink packet QoS and/or priority and feedback type (for example, HARQ ACK/NACK or CQI). $\alpha_{SL\_feedback}$ is configured by higher layer parameter as the power control parameter for sidelink feedback transmission that can be a function of corresponding packet type (for example, unicast transmission, groupcast transmission or broadcast transmission), and/or feedback types (for example HARQ ACK/NACK, CQI feedback). $PL_{SL}$ is the pathloss of sidelink. μ is the parameter to represent the subcarrier spacing used for that PSFCH transmission. In one example, μ=1, 2, 4, 8, 16 are for subcarrier spacing=15 KHz, 30 KHz, 60 KHz, 120 KHz, and 240 KHz, respectively.

In one embodiment, a UE-A may calculate the Tx power $P_{SL\_feedback}$ for a transmission on sidelink feedback channel as $P_{SL\_feedback}$ min{$P_{C\_MAX}$, 10 log$_{10}$($2^\mu \times M_{SL\_feedback}$)+$P_{0,SL\_feedback}$+min{$\alpha_{SL\_feedback} \times PL_{SL}$, $\alpha_{SL\_feedback,NR} \times PL_{NR}$}} where $P_{C\_MAX}$ is the configured maximal Tx power the UE-A can transmit, $M_{SL\_feedback}$ is the sidelink feedback transmission bandwidth that can be expressed in number of PRBs, $P_{0,SL\_feedback}$ s configured by higher layer parameter as the power control parameter for feedback transmission on sidelink feedback channel that can be function of sidelink packet QoS and/or priority. $\alpha_{SL\_feedback,SL}$ is configured by higher layer parameter as the sidelink power control parameter for feedback transmission on sidelink feedback channel that can be a function of packet type (for example, unicast transmission, groupcast transmission or broadcast transmission). $PL_{SL}$ is the pathloss of sidelink. $\alpha_{SL\_feedback,NR}$ is configured by higher layer parameter as the power control adjustment parameter considering the impact on uplink transmission and $PL_{NR}$ is the pathloss of link between UE-A and a serving gNB. μ is the parameter to represent the subcarrier spacing used for that PSFCH transmission. In one example, μ=1, 2, 4, 8, 16 are for subcarrier spacing=15 KHz, 30 KHz, 60 KHz, 120 KHz, and 240 KHz, respectively.

In one embodiment, if a UE-A transmit any PSSCH and PSCCH on same symbols, i.e., PSSCH and PSCCH are FDMed (frequency division multiplexing) multiplexed, the UE-A may share the Tx power between PSSCH and PSCCH. If the UE-A transmit PSSCH, PSCCH and sidelink feedback on same symbol, i.e., PSSCH, PSCCH and sidelink feedback channel are FDMed, the UE-A may share the Tx power between PSSCH, PSSCH and sidelink feedback channel.

In one embodiment, a UE-A may calculate the Tx power $P_{PSCCH}$, $P_{PSSCH}$, $P_{SL\_feedback}$ for PSCCH, PSSCH and sidelink feedback as given below if the transmission on PSCCH, PSSCH and sidelink feedback channel are FDMed, $$P_{PSSCH} = 10 \times \log_{10}\left(\frac{M_{PSSCH}}{M_{PSSCH} + a \times M_{PSCCH} + b \times M_{SL\_feedback}}\right) +$$

$$\min\{P_{CMAX}, 10\log_{10}(2^\mu \times M_{PSSCH} + a \times 2^\mu \times M_{PSCCH} + b \times 2^\mu \times M_{SL\_feedback}) + P_{0,PSCCH} + \Delta + \alpha_{PSSCH} \times PL_{SL}\}$$

$$P_{PSCCH} = 10 \times \log_{10}\left(\frac{a \times M_{PSCCH}}{M_{PSSCH} + a \times M_{PSCCH} + b \times M_{SL\_feedback}}\right) +$$

$$\min\{P_{CMAX}, 10\log_{10}(2^\mu \times M_{PSSCH} + a \times 2^\mu \times M_{PSCCH} + b \times 2^\mu \times M_{SL\_feedback}) + P_{0,PSCCH} + \Delta + \alpha_{PSSCH} \times PL_{SL}\}$$

$$P_{SL_{feedback}} = 10 \times \log_{10}\left(\frac{b \times M_{SL_{feedback}}}{M_{PSSCH} + a \times M_{PSCCH} + b \times M_{SL_{feedback}}}\right) +$$

$$\min\{P_{CMAX}, 10\log_{10}(2^\mu \times M_{PSSCH} + a \times 2^\mu \times M_{PSCCH} + b \times 2^\mu \times M_{SL_{feedback}}) + P_{0,PSCCH} + \Delta + \alpha_{PSSCH} \times PL_{SL}\}$$

where $P_{C\_MAX}$ is the configured maximal Tx power the UE-A can transmit, $M_{PSSCH}$ is the PSSCH transmission bandwidth that can be expressed in number of PRBs and $M_{PSCCH}$ is the PSCCH transmission bandwidth that can be expressed in number of PRBs and $M_{SL\_feedback}$ is the feedback transmission bandwidth that can be expressed in number of PRBs, $P_{0,PSSCH}$ is configured by higher layer parameter as the power control parameter for PSSCH transmission that can be function of sidelink packet QoS and/or priority. $\alpha_{PSSCH}$ is configured by higher layer parameter as the power control parameter for PSSCH transmission that can be a function of packet type (for example, unicast transmission, groupcast transmission or broadcast transmission). Δ is the power level adjustment parameter for MCS level. $PL_{SL}$ is the pathloss of sidelink. The parameter a and b can be configured by higher layer as the parameter to adjust the power sharing ratio between PSSCH, PSCCH and sidelink feedback channel. μ is the parameter to represent the subcarrier spacing used for that PSFCH transmission. In one example, μ=1, 2, 4, 8, 16 are for subcarrier spacing=15 KHz, 30 KHz, 60 KHz, 120 KHz and 240 KHz, respectively.

In one embodiment, a UE-A may calculate the Tx power $P_{PSCCH}$, $P_{PSSCH}$, $P_{SL\_feedback}$ for PSCCH, PSSCH and sidelink feedback as given below if the transmission on PSCCH, PSSCH and sidelink feedback channel are FDMed, $$P_{PSSCH} =$$
$$10 \times \log_{10}\left(\frac{M_{PSSCH}}{M_{PSSCH} + a \times M_{PSCCH} + b \times M_{SL\_feedback}}\right) + \min\{P_{CMAX},$$
$$10\log_{10}(2^\mu \times M_{PSSCH} + a \times 2^\mu \times M_{PSCCH} + b \times 2^\mu \times M_{SL\_feedback}) +$$
$$P_{0,PSCCH} + \Delta + \min\{\alpha_{PSSCH,SL} \times PL_{SL}, \alpha_{PSSCH,NR} \times PL_{NR}\}\}$$

$$P_{PSCCH} = 10 \times \log_{10}\left(\frac{a \times M_{PSSCH}}{M_{PSSCH} + a \times M_{PSCCH} + b \times M_{SL\_feedback}}\right) +$$
$$\min\{P_{CMAX},$$
$$10\log_{10}(2^\mu \times M_{PSSCH} + a \times 2^\mu \times M_{PSCCH} + b \times 2^\mu \times M_{SL\_feedback}) +$$
$$P_{0,PSCCH} + \Delta + \min\{\alpha_{PSSCH,SL} \times PL_{SL}, \alpha_{PSSCH,NR} \times PL_{NR}\}\}$$

$$P_{SL_{feedback}} = 10 \times \log_{10}\left(\frac{b \times M_{SL_{feedback}}}{M_{PSSCH} + a \times M_{PSCCH} + b \times M_{SL_{feedback}}}\right) +$$
$$\min\{P_{CMAX},$$
$$10\log_{10}(2^\mu \times M_{PSSCH} + a \times 2^\mu \times M_{PSCCH} + b \times 2^\mu \times M_{SL_{feedback}}) +$$
$$P_{0,PSCCH} + \Delta + \min\{\alpha_{PSSCH,SL} \times PL_{SL}, \alpha_{PSSCH,NR} \times PL_{NR}\}\}$$

where $P_{C\_MAX}$ is the configured maximal Tx power the UE-A can transmit, $M_{PSSCH}$ is the PSSCH transmission bandwidth that can be expressed in number of PRBs and $M_{PSCCH}$ is the PSCCH transmission bandwidth that can be expressed in number of PRBs and $M_{SL\_feedback}$ is the feedback transmission bandwidth that can be expressed in number of PRBs, $P_{0,PSSCH}$ is configured by higher layer parameter as the power control parameter for PSSCH transmission that can be function of sidelink packet QoS and/or priority. $\alpha_{PSSCH}$ is configured by higher layer parameter as the power control parameter for PSSCH transmission that can be a function of packet type (for example, unicast transmission, groupcast transmission or broadcast transmission). $\Delta$ is the power level adjustment parameter for MCS level. $PL_{SL}$ is the pathloss of sidelink. The parameter a and b can be configured by higher layer as the parameter to adjust the power sharing ratio between PSSCH, PSCCH and sidelink feedback channel. $\alpha_{PSSCH,NR}$ is configured by higher layer parameter as the power control adjustment parameter considering the impact on uplink transmission and $PL_{NR}$ is the pathloss of link between UE-A and a serving gNB. $\mu$ is the parameter to represent the subcarrier spacing used for that PSFCH transmission. In one example, $\mu$=1, 2, 4, 8, 16 are for subcarrier spacing=15 KHz, 30 KHz, 60 KHz, 120 KHz, and 240 KHz, respectively.

If the PSSCH transmission is groupcast for a group of receiver UEs, the pathloss of sidelink between the UE-A and all the receiver UEs in the target group may be included in the Tx power for PSCCH, PSSCH and sidelink feedback channel.

If the PSSCH transmission is broadcast transmission, the minimal transmission range and maximal transmission range of that broadcast transmission can be included in the Tx power for PSCCH, PSSCH and sidelink feedback channel.

One important issue for sidelink power control is obtaining the pathloss of sidelink. In one embodiment, a UE can measure a sidelink side reference signal transmitted by another UE on sidelink and then calculates the pathloss of sidelink between these two UEs.

In one embodiment, a UE-A can send a sidelink reference signal on sidelink to a UE-B. The UE-A can be requested to transmit the sidelink reference signal with configured transmit power level. The UE-B can be requested to measure the sidelink reference signal with assumed transmit power level that can be configured by higher layer to calculate the pathloss of sidelink between the UE-A and the UE-B.

In one embodiment, a UE-A can send sidelink reference signal on sidelink to a UE-B. The UE-B can be requested to measure the sidelink reference signal sent by the UE-A and measure the RSRP (reference signal received power) of the sidelink reference signal and feedback the measured RSRP to the UE-A.

In one embodiment, one UE can measure the RSRP of reference signals transmitted by other UE and reports the RSRP and the ID of UE that transmit the corresponding sidelink reference signal to a serving gNB. The serving gNB can estimate the mapping between transmission distance and pathloss for sidelink based on the reporting information from UEs. The serving gNB can signal the mapping between transmission range and pathloss for sidelink to the V2X UEs.

In the aforementioned embodiments, the UE may estimate the pathloss of sidelink and the pathloss of the link between the UE and a serving gNB for the Tx power control for sidelink transmission. To estimate the pathloss of sidelink, the UE can measure some reference signal transmitted on sidelink. To estimate the pathloss of link between the UE and the serving gNB, the UE can measure some reference signal transmitted by the serving gNB.

In one embodiment, a UE can be configured with one reference signal resource for measuring the pathloss of link between the gNB and the UE. The UE can be provided with a RS resource indexes and the configuration of that RS resource (e.g., including transmission configuration and Tx power). Such a RS resource can be a CSI-RS resource or SS/PBCH block sent by the gNB. To measure the RS configured for pathloss measurement for link between gNB and the UE, the UE can be requested to use the spatial domain filter that corresponds to the spatial domain filter used for sidelink transmission (for example PSSCH, PSCCH). That is useful in real-field deployment to ensure the UE use the correct transceiver to pathloss of link between gNB and the UE and thus the power control configuration for sidelink transmission is proper.

The same embodiment may be applied to the measurement of sidelink pathloss measurement. To measure the RS configured for sidelink pathloss, the UE can be requested to use the spatial domain filter that corresponds to the spatial domain filter used for sidelink transmission. In one example of V2X implementation, the vehicle would generally have multiple transceiver antennas. For example, one is installed at the front of the car and another one is installed at the back of the car.

The vehicle would use different transceiver antennas for different sidelink transmission. For example, the car uses the front antenna to transmit PSCCH/PSSCH to the UEs in front of that car but use the back antenna to transmit PSCCH/PSSCH to the UEs behind that car. Using different antenna would cause different interference level to the gNB transmission and also the pathloss between the car and the gNB are different. Therefore, the car may apply the pathloss corresponding to the antenna on the Tx power control for the transmission sent from that antenna. The same requirement is needed for the transmission.

In one embodiment, a UE can be configured to report RSRP information measured from one SL-RS (sidelink reference signal) in sidelink feedback control information (SFCI). In one example, a UE can be configured with one SFCI format X and in SFCI format X, the UE can be configured to report one or more of the following: RSRP (reference signal received power) measured based on one SL-RS resources; the sidelink pathloss measured from one SL-RS resources. The UE can calculate the pathloss of one sidelink by pathloss of sidelink=configured reference signal Tx power−RSRP measured from one configured SL-RS; and/or indicator of SL-RS resource.

In one example, a UE can be configured to measure one or more SL-RS resources and then report one or more indicator of SL-RS resources and the pathloss measured from each corresponding reported SL-RS.

In one example, a UE can be configured to measure one or more SL-RS resource and then report one or more (as configured) indicators of SL-RS. One use case is to configure the UE to report one indicator of the selected 'best' SL-RS which gives the least pathloss.

In one embodiment, the UE can be configured to report RSRP information measured from one or more SL-RS through uplink to the serving gNB. The UE can report the above information about sidelink measurement through PUCCH to the serving gNB.

In one embodiment, a UE-A can be configured to measure two CSI-RS resources: a first CSI-RS resources; a second CSI-RS resources sent by the serving gNB and to measure two SL-RS resources and a third SL-RS resources and a forth SL-RS resources sent by a UE-B through sidelink.

The UE-A can be requested to use a first receive unit to measure a first CSI-RS resources and a third SL-RS resources to calculate the pathloss of Uu link and sidelink, respectively. And the UE-A can be requested to use a second receive unit to measure a second CSI-RS resources and a fourth SL-RS resources to calculate the pathloss of Uu link and sidelink, respectively.

Then when the UE-A use a first transmitter to transmit to the UE-B, the UE-A may use the pathloss of sidelink measured from the receive unit that corresponding the first transmitter to calculate the Tx power for the transmission, and if in the coverage of gNB and shared spectrum is used, the UE-A may take into account the Uu link pathloss measured from the receiver unit that corresponds to the first transmitter to calculate the Tx power for the transmission.

In one embodiment, a serving gNB can send TPC (transmission power control) command for transmission on sidelink. The serving gNB can send TPC command for PSSCH and PSCCH transmission on sidelink. The serving gNB can send TPC command for feedback channel transmission on sidelink. The gNB can send a TPC command for sidelink to one sidelink UE-A by including one or more of the following information elements: a TPC command to indicate Tx power adjustment offset, for example one N1-bit field to indicate the power adjustment; and/or the target sidelink channel: for example, whether the indicated TPC command is for PSSCH, PSCCH, feedback channel or both PSSCH and PSCCH or for PSSCH/PSCCH/sidelink feedback channel.

In one example, the gNB can send a TPC command for sidelink to one sidelink UE-A by including one identifier of the sidelink connection to indicate the indicated TPC command may be applied to which sidelink transmission. In one instance, the sidelink connection can be identified by an ID of a receiver UE.

The UE-A can be signaled with receiver UE ID: a UE-B to indicate that the configured TPC command may be applied to the sidelink transmission between the UE-A and the UE-B. In one example, the sidelink connection can be identified by a ID of UE group. This is applicable for a sidelink groupcast transmission. In one example, the sidelink connection can be identified by special value of the ID to indicate that the indicated TPC command may be applied to broadcast transmission. In one example, the identifier of sidelink connection can be configured by the gNB.

In one embodiment, a serving gNB can send a downlink control signaling (for example one DCI format X) to schedule the transmission on sidelink to the UE-A and the UE-A is the transmitter UE for the scheduled sidelink transmission.

In the DCI, the serving gNB can include one or more of the following information elements: the ID of receiver UE or receiver UE group on sidelink; the resource allocation on sidelink; the transmission parameters for the scheduled transmission; and/or a TPC command field to indicate the TPC command for this scheduled transmission.

Then when the UE-A transmit packets on sidelink as scheduled by the serving gNB, the UE-A may apply the TPC command received in the DCI format X to calculate the transmit power for sidelink transmission.

In one embodiment, a serving gNB can send a downlink control signaling (for example one DCI format X1) to indicate the TPC commands for one or more sidelink connections. The DCI format X1 can include the following information: one or more pairs of {One identifier of a sidelink connection field SL_ID, TPC command field SL_TPC}.

In each pair, the field SL_TPC is the TCP command for the sidelink connection identified by the indicator SL_ID. The mapping between SL_ID and sidelink connection can be configured by the gNB. In one example, one SL_ID can be mapped to one sidelink connection that is identified by a ID of transmitter UE and ID of receiver UE or receiver UE group.

After the UE receives sidelink TPC command from the serving gNB, the UE may include the sidelink TPC command configured by the serving gNB in the tx power calculation for the transmission on corresponding sidelink connection. In one example, the UE may calculate the Tx power for PSSCH transmission on a first sidelink connection as follows: $P_{PSSCH,i}=\min\{P_{C\ MAX}, 10\ \log_{10}(2^\mu \times M_{PSSCH}) + P_{0,PSSCH} + \Delta + \alpha_{PSSCH} \times PL_{SL,i} + f_i\}$ where: $P_{C\ MAX}$ is maximal power that the UE can apply to PSSCH transmission, $M_{PSSCH}$ is bandwidth of PSSCH transmission expressed as the number of resource blocks for the scheduled PSSCH transmission, $PL_{SL,i}$ is the pathloss of sidelink indexed by i. $P_{PSSCH,i}$ is the calculated Tx power of PSSCH transmission on sidelink indexed by i. $f_i$ is the parameter that factors in the sidelink TPC command received from the serving gNB.

In one example, $f_i$ can be 0 if the UE does not receive sidelink TPC command from the serving gNB. In one example, the UE can update the value of $f_i$ when receiving one sidelink TPC command from the serving gNB as follows: $f_i = f_i + \delta_{i,n}$ where $\delta_{i,n}$ is one sidelink TCP command for sidelink indexed by i, which is received from the serving gNB. $\mu$ is the parameter to represent the subcarrier spacing used for that PSFCH transmission. In one example, $\mu$=1, 2, 4, 8, 16 are for subcarrier spacing=15 KHz, 30 KHz, 60 KHz, 120 KHz, and 240 KHz, respectively.

For the transmit power of PSCCH and sidelink feedback channel, the UE can apply similar embodiment as described above.

In one embodiment, a UE-A can send TPC command to a UE-B to adjust the Tx power for UE-B to transmit to UE-A on sidelink transmission for example PSSCH, PSCCH and sidelink feedback channel.

After the UE-B receives sidelink TPC command from the UE-A, the UE may include the sidelink TPC command configured by the UE-A in the tx power calculation for the transmission on corresponding sidelink connection. In one example, the UE-B may calculate the Tx power for PSSCH transmission sent to UE-A as follows $P_{PSSCH,B-A}=\min\{P_{C\ MAX}, 10\ \log_{10}(2^\mu \times M_{PSSCH}) + P_{0,PSSCH} + \Delta + \alpha_{PSSCH} \times PL_{SL,B-A} + f_{B-A}\}$ where: $P_{C\ MAX}$ is maximal power that the UE can apply to PSSCH transmission, $M_{PSSCH}$ is bandwidth of PSSCH transmission expressed as the number of resource blocks for the scheduled PSSCH transmission, $PL_{SL,B-A}$ is the pathloss of sidelink between UE-B and UE-A. $P_{PSSCH,B-A}$ is the calculated Tx power of PSSCH transmission on sidelink from UE-B to UE-A. $f_{B-A}$ is the parameter that factors in the sidelink TPC command received from the UE-A.

In one example, $f_{B-A}$ can be 0 if the UE-B does not receive sidelink TPC command from the UE-A. In one example, the UE-B can update the value of $f_{B-A}$ when receiving one sidelink TPC command from the UE-A as follows: $f_{B-A} = f_{B-A} + \delta_{B-A,n}$ where $\delta_{B-A,n}$ is one sidelink TCP command for sidelink between UE-B and UE-A, which is received from the UE-A. $\mu$ is the parameter to represent the subcarrier spacing used for that PSFCH transmission. In one example, $\mu$=1, 2, 4, 8, 16 are for subcarrier spacing=15 KHz, 30 KHz, 60 KHz, 120 KHz, and 240 KHz, respectively.

For the transmit power of PSCCH and sidelink feedback channel, the UE-B can apply similar embodiment as described above.

In one embodiment, a UE-A can include an TPC command in a sidelink control signaling (for example one SCI format X) that is a unicast transmission to a UE-B and the UE-B may include that TPC command in the calculation of Tx power of PSSCH and PSCCH transmission on sidelink to the UE-A.

In one example, a UE-A can send a SCI format X in PSCCH channel to schedule a unicast transmission of PSSCH to a UE-B. In the SCI format X, the following information can be included: the ID of source UE, i.e., the ID of UE-A. The ID of target UE, i.e., the ID of UE-B; the resource allocation and transmission parameters of PSSCH; and one sidelink TPC command for the transmission from the UE-B to the UE-A on sidelink.

When the UE-B receives that SCI format X, the UE-B can receive and decode PSSCH according to the scheduling information in SCI format X. And for the transmission from UE-B to UE-A, the UE-B may include the sidelink TPC command received in SCI format X in the calculation of transmit power.

In one embodiment, a UE can be requested to apply transmit power control on transmission on sidelink feedback channel, physical sidelink feedback channel (PSFCH). The UE can be requested to take into account either the pathloss between the UE and the serving BS or the pathloss of sidelink between the UE and another UE that is the receiver of the sidelink feedback transmission on PSFCH channel or both the pathloss between the UE and the serving BS and the sidelink pathloss between the UE and another UE that is the receiver of the sidelink feedback transmission on PSFCH channel.

In one embodiment, a UE-A may calculate the Tx power $P_{PSFCH}$ for a PSFCH transmission as $$P_{PSFCH} = \min\left\{\begin{array}{l} P_{CMAX}, \\ 10\log_{10}(2^\mu \times M_{PSFCH}) + P_{0,PSFCH} + \Delta_1 + \Delta_2 + \\ \min\{\alpha_{PSFCH,SL} \times PL_{SL}, \alpha_{PSFCH,Uu} \times PL_{Uu}\} \end{array}\right\}$$

where: $P_{C\_MAX}$ is the configured maximal Tx power the UE-A can transmit; $M_{PSSCH}$ is the bandwidth of PSFCH transmission that can be expressed in number of resource blocks for that PFSCH transmission; μ is the parameter to represent the subcarrier spacing used for that PSFCH transmission. In one example, μ=1, 2, 4, 8, 16 are for subcarrier spacing=15 KHz, 30 KHz, 60 KHz, 120 KHz, and 240 KHz, respectively.

$PL_{Uu}$ is the pathloss of link between UE-A and a serving BS and $\alpha_{PSFCH,BS}$ is configured by higher layer parameter as the power control adjustment parameter considering the impact on transmission on Uu interference. In one example, the UE-A can configured with one downlink CSI-RS resource for the UE-A to measure the Uu pathloss $PL_{Uu}$.

$PL_{SL}$ is the pathloss of link between UE-A and a UE-B who is the receiver of the PSFCH transmission and $\alpha_{PSFCH,SL}$ is configured by higher layer parameter as the power control adjustment parameter considering the impact on transmission on sidelink interference.

The UE-B is the UE who is supposed to be the receiver for sidelink transmission. For example, the sidelink feedback is HARQ ACK/NACK feedback for one PSSCH transmission, and then the $PL_{SL}$ is the sidelink pathloss of sidelink between the UE-A and the UE-B who transmits that PSSCH. For example, the sidelink feedback is one sidelink CSI and then the $PL_{SL}$ is the sidelink pathloss of sidelink between the UE-A and the UE-B who transmits sidelink reference signals for sidelink CSI measurement and reporting.

$\Delta_1$ can be parameter for power adjustment for PSFCH formats. In one example, there may be a PSFCH format 0 that is used by UE to report HARQ-ACK feedback and PSFCH format 1 that is used by the UE to report sidelink CSI, the UE can be configured or preconfigured with a value for PSFCH format 0 and a value for PSFCH format 1. To calculate Tx power for a first PSFCH transmission, the UE can be requested to use the value corresponding to the PSFCH format sent on the first PSFCH transmission.

$\Delta_2$ is a PSFCH transmission power adjustment component considering the payload size and coding rate in each PSFCH transmission.

The UE-A can be configured to follow the above embodiment to calculate Tx power for PSFCH if the UE-A is in the coverage of one serving BS and if the sidelink and Uu uplink use shared spectrum.

When the UE-A is out-of-coverage of a serving BS, i.e., if the UE-A is not in the coverage of a serving BS, the UE may calculate the Tx power $P_{PSFCH}$ for a PSFCH transmission as $$P_{PSFCH} = \min\left\{\begin{array}{l} P_{CMAX}, \\ 10\log_{10}(2^\mu \times M_{PSFCH}) + P_{0,PSFCH} + \Delta_1 + \Delta_2 + \alpha_{PSFCH,SL} \times PL_{SL} \end{array}\right\}.$$

When the UE-A is in coverage of a serving BS but the sidelink and Uu do not use shared spectrum, the UE-A can be requested to use this embodiment to calculate the Tx power for PSFCH transmission.

One deployment scenario is called dual connectivity, in which a UE is in connected to two BSs, one BS is master BS and another BS is secondary BS. For a V2X UE in dual connectivity, the transmission on sidelink might cause interference to master BS or secondary BS or both of the master and the secondary BSs. Therefore, to calculate the Tx power for a sidelink transmission, the UE can be requested to take into account the pathloss between the UE and the master BS, the pathloss between the UE and the secondary BS and the pathloss between the UE and a receiver UE.

For a UE-A to calculate the Tx power of one sidelink transmission sent from the UE-A to a UE-B, the UE-A can be requested to take into account one or more of the following parameters: the pathloss between the UE-A and the UE-B; the pathloss of Uu interface between the UE-A and his serving master BS; the pathloss of Uu interface between the UE-A and his serving secondary BS; the size of frequency bandwidth of the sidelink transmission; the MCS and transmission scheme applied on that sidelink transmission; and/or the priority and QoS requirement of the sidelink packet that is going to be transmitted in the sidelink transmission.

Figure 22:
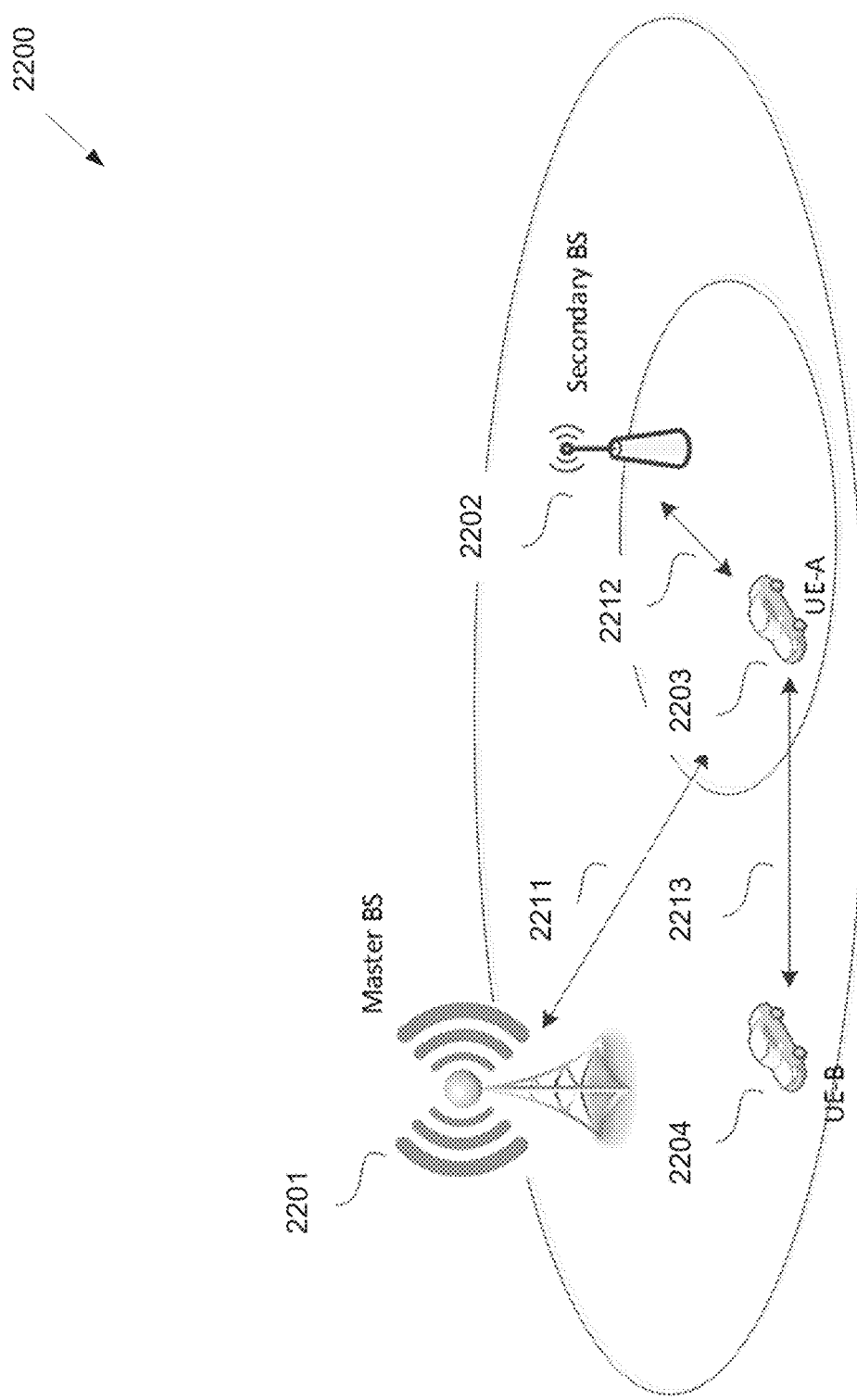
FIG. 22 illustrates example power control for sidelink in dual connectivity case according to embodiments of the present disclosure.

FIG. 22 illustrates example power control for sidelink in dual connectivity case 2200 according to embodiments of the present disclosure. The embodiment of the power control for sidelink in dual connectivity case 2200 illustrated in FIG. 22 is for illustration only. FIG. 22 does not limit the scope of the present disclosure to any particular implementation.

As shown in FIG. 22, a UE-A is in the connection with a master BS 2201 and a secondary BS 2202, i.e., the UE-A is configured with dual connectivity with the master BS 2201 and the secondary BS 2202. The UE-A has a packet to send to a UE-B 2204 through sidelink. To calculate the Tx power for the sidelink transmission that the UE-A 2203 transmits to the UE-B 2204, the UE-A 2203 can be requested to take into account the pathloss of link between the master BS 2201 and the UE-A 2203, the pathloss 2211 of link between the secondary BS 2202 and the UE-A 2203, and the pathloss of 2213 sidelink between the UE-A 2203 and the UE-B 2204.

The UE-A can be configured with various schemes to calculate the Tx power for a sidelink transmission to the UE-B: the UE-A can be configured to include all of the pathloss 2211, 2212, and 2213 in calculating the Tx power for on sidelink transmission; the UE-A can be configured to include the pathloss 2211 and 2213 in calculating the Tx power for on sidelink transmission; the UE-A can be configured to include the pathloss 2212 and 2213 in calculating the Tx power for on sidelink transmission; and/or the UE-A can be configured to include the pathloss 2213 in calculating the Tx power for on sidelink transmission.

In one embodiment, if a UE is configured with a MCG using E-UTRA radio access and with a SCG using NR radio access, or the UE is configured a MCG using NR radio access and SCG using E-UTRA radio access, or if the UE is configured with a MCG using NR radio access in FR1 or FR2 and with a SCG using NR radio access in FR2 or FR1, the UE can be configured to calculate the Tx power, $P_{SL}$, for a sidelink transmission as follows: $P_{SL} = \min\{P_{SL\text{-}C\ MAX}, 10\log_{10}(2^\mu \times M_{SL}) + P_{0,SL} + \min\{\alpha_{SL} \times PL_{SL}, \alpha_{Uu,MCG} \times PL_{MCG}, \alpha_{Uu,SCG} \times PL_{SCG}\}\}$ where the parameters in the calculation equations are: $M_{SL}$ is the frequency bandwidth of the sidelink transmission (e.g., PSCCH transmission, PSSCH transmission or PSFCH transmission). It can be expressed as the number of resource blocks; $\mu$ is the parameter to represent the subcarrier spacing used for that PSFCH transmission. In one example, $\mu = 1, 2, 4, 8, 16$ are for subcarrier spacing=15 KHz, 30 KHz, 60 KHz, 120 KHz, and 240 KHz, respectively; $P_{0,PSSCH}$ is configured by higher layer parameter as the power control parameter for PSSCH transmission that can be function of sidelink packet QoS and/or priority; $\alpha_{SL}$ is configured by higher layer parameter as the power control parameter for sidelink pathloss; $PL_{SL}$ is the pathloss of sidelink where the sidelink packet is transmitted; $\alpha_{Uu,MCG}$ is configured by higher layer parameter as the power control parameter for link between the UE and the MCG BS (i.e., the master BS in dual connectivity); $PL_{MCG}$ is the pathloss of link between the UE and the MCG BS (i.e., the master BS in dual connectivity); $\alpha_{Uu,SCG}$ is configured by higher layer parameter as the power control parameter for link between the UE and the SCG BS (i.e., the secondary BS in dual connectivity); $PL_{SCG}$ is the pathloss of link between the UE and the SCG BS (i.e., the secondary BS in dual connectivity); and $P_{SL\text{-}C\ MAX}$ is the configure UE transmit power for sidelink transmission.

The system can easily configure the sidelink power control for different deployment scenarios by configuring different values for $\alpha_{Uu,MCG}$, $\alpha_{Uu,SCG}$ and $\alpha_{SL}$. In one example, in a deployment scenario where the sidelink and the MCG use shared spectrum but the SCG is in different spectrum then the system can configure $\alpha_{Uu,SCG}$ to be 0 so that the interference to the SCG caused by the sidelink is not included.

Generally, a UE can transmit both a PSCCH (e.g., the control channel in sidelink) and a PSSCH (e.g., the data channel in sidelink). There are various schemes to multiplex a PSCCH and a PSSCH, for example, FDM (frequency division multiplexing), TDM (time division multiplexing) or using both FDM and TDM.

Figure 23:
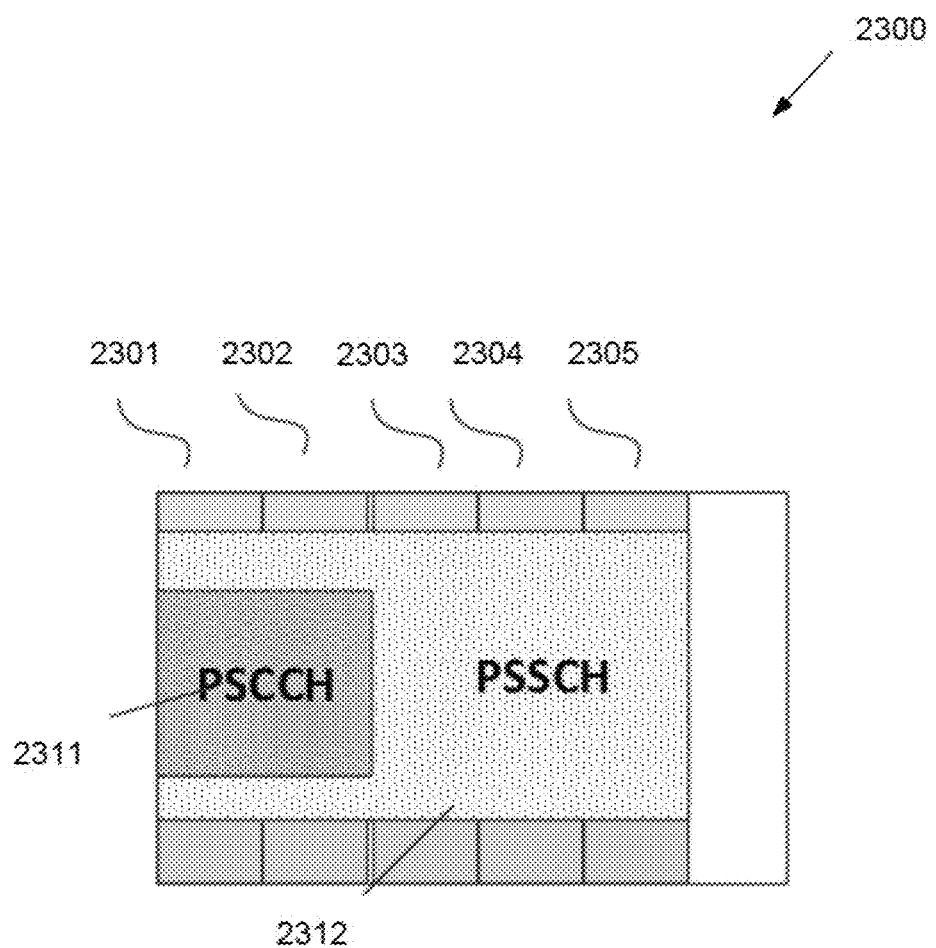
FIG. 23 illustrates an example multiplexing a PSCCH and the associated PSSCH according to embodiments of the present disclosure.

FIG. 23 illustrates an example multiplexing a PSCCH and the associated PSSCH 2300 according to embodiments of the present disclosure. The embodiment of the multiplexing a PSCCH and the associated PSSCH 2300 illustrated in FIG. 23 is for illustration only. FIG. 23 does not limit the scope of the present disclosure to any particular implementation.

An example of one embodiment of multiplexing a PSCCH and the associated PSSCH is shown in FIG. 23, where both TDM and FDM are used to multiplex a PSCCH and the associated PSSCH. As shown in FIG. 23, on symbols 2301 and 2302, both PSCCH 2311 and PSSCH 2312 are transmitted and occupy different resource blocks. Then on symbols 2303, 2304 and 2305, only PSSCH 2312 are transmitted. The PSCCH 2311 can transmit the control information that indicates the scheduling and transmission configuration of PSSCH 2312.

For such transmission scheme of PSCCH and PSSCH, the following questions may be resolved: how to allocate the Tx power to PSCCH and PSSCH on the symbols where both PSCCH and PSSCH are transmitted, i.e., the symbols 2301 and 2302 in FIG. 23; and what is the Tx power for PSSCH on the symbols where only PSSCH is transmitted, i.e., the symbols 2303, 2304 and 2305 in the example of FIG. 23.

To determine the transmit power of PSCCH and PSSCH shown in FIG. 23, one or more of the following principles may be used.

In one embodiment, on the symbols where both PSCCH and PSSCH are transmitted (e.g., symbols 2301 and 2302 in FIG. 23), the UE apply same transmit power density on PSCCH resource blocks and PSSCH resource blocks, and the UE apply same transmit power on all the symbols of PSCCH and PSSCH allocation, i.e., in FIG. 23, the symbols 2301, 2302, 2303, 2304, and 2305.

In one embodiment, on the symbols where both PSCCH and PSSCH are transmitted (e.g., symbols 2301 and 2302 in FIG. 23), the UE apply a transmit power density $PSD_1$ on the resource blocks of PSSCH and apply a power density $PSD_2$ on the resource blocks of PSCCH, where $PSD_2 = PSD_1 + \beta$, the offset $\beta$ can be a preconfigured value, e.g., 2 dB. Regarding the transmit power on symbols where only PSSCH are transmitted (e.g., the symbols 2303, 2304 and 2305 in the example of FIG. 23), there may be various embodiments.

In one embodiment, on the symbols where only PSSCH is transmitted (e.g., in FIG. 23, the symbols 2303, 2304, and 2305), the UE can apply the power density $PSD_1$ one all the resource blocks occupied by PSSCH.

In another embodiment, on the symbols where only PSSCH is transmitted (e.g., in FIG. 23, the symbols 2303, 2304, and 2305), the UE can apply the same transmit power as the transmit power applied on symbols where both PSSCH and PSCCH are transmitted (e.g., in FIG. 23, the symbols 2301 and 2302).

In one embodiment, a UE can calculate the transmit power for sidelink transmission PSCCH and PSSCH as follows.

In one example, on the symbols where both PSCCH and PSSCH are transmitted (e.g., in FIG. 23, the symbols 2301 and 2302), the UE can calculate the transmit power for PSCCH as:

$$P_{PSCCH} = 10 \times \log_{10}\left(\frac{\beta \times M_{PSCCH}}{M_{PSSCH,0} + \beta \times M_{PSCCH}}\right) +$$

$$\min\{P_{CMAX}, 10\log_{10}(2^\mu \times M_{PSSCH,0} + a \times 2^\mu \times M_{PSCCH}) +$$

$$P_{0,SL} + \Delta + \min\{\alpha_{SL} \times PL_{SL}, \alpha_{Uu} \times PL_{Uu}\}\}$$

and the UE can calculate the transmit power for PSSCH as:

$$P_{PSSCH,0} = 10 \times \log_{10}\left(\frac{M_{PSSCH,0}}{M_{PSSCH,0} + \beta \times M_{PSCCH}}\right) +$$
$$\min\{P_{CMAX}, 10\log_{10}(2^\mu \times M_{PSSCH,0} + a \times 2^\mu \times M_{PSCCH}) +$$
$$P_{0,SL} + \Delta + \min\{\alpha_{SL} \times PL_{SL}, \alpha_{Uu} \times PL_{Uu}\}\}$$

where the parameters are: $P_{PSCCH}$ is the transmit power on PSCCH; $P_{PSSCH,0}$ is the transmit power applied on PSSCH part on the symbols where both PSCCH and PSSCH are transmitted (e.g., in FIG. 23, the symbols 2301 and 2302); $M_{PSCCH}$ is the frequency bandwidth of PSCCH allocation, which can be expressed as the number of resource blocks allocated for PSCCH; $M_{PSSCH,0}$ is the frequency bandwidth of PSSCH on the symbols where both PSCCH and PSSCH are transmitted (e.g., on the symbols 2301 and 2302 in the example of FIG. 23), which can be expressed as the number of resource blocks allocated for PSSCH; μ is the parameter to represent the subcarrier spacing used for that PSFCH transmission, in one example, μ=1, 2, 4, 8, 16 are for subcarrier spacing=15 KHz, 30 KHz, 60 KHz, 120 KHz and 240 KHz, respectively; β can be one configured parameter, which is used to control the power allocation ratio between PSCCH and PSSCH. In one example, β=2 so that the power allocated to PSCCH is 3 dB higher than the power allocated to PSSCH; $P_{C\ MAX}$ is the maximal Tx power for sidelink transmission configured to one UE; $PL_{SL}$ is the pathloss of the sidelink where the PSSCH and PSCCH is transmitted; $\alpha_{SL}$ is one configured parameter, which can be used to control the weighting factor of sidelink pathloss; $PL_{Uu}$ is the pathloss of the Uu interface between the transmit UE and the serving BS; $\alpha_{Uu}$ is one configured parameter, which can be used to control weighting factor of Uu interface pathloss; $P_{0,SL}$ is provided by one higher layer parameter; and Δ is provided by higher layer parameter, which can be used as a function of traffic types or QoS of sidelink traffic.

In one embodiment, for the symbols where only PSSCH are transmitted (e.g., in the example of FIG. 23, the symbols of 2303, 2304, and 2305), the UE can calculate transmit power for PSSCH, $P_{PSSCH,1}$, as shown below embodiments.

In one embodiment, $$P_{PSSCH,1} = P_{PSSCH,0} + 10 \times \log_{10}\left(\frac{M_{PSSCH,1}}{M_{PSSCH,0}}\right)$$

where $M_{PSSCH,1}$ is the frequency bandwidth size of PSSCH, which can be expressed as the number of resource blocks allocated to PSSCH on each of the symbols where only PSSCH are transmitted (e.g., in the example of FIG. 23, the symbols of 2303, 2304, and 2305).

In such embodiment, it can be ensured that the UE may apply same PSD on the resource element allocated for PSSCHs in all the symbols where PSSCH is mapped.

In one embodiment, $P_{PSSCH,1} = P_{PSSCH,0} + P_{PSCCH}$. In such embodiment, it can be ensured that the UE may apply same Tx power on all the symbols where PSCCH and PSSCH are mapped (i.e., all the symbols of 2301 to 2305 in the example of FIG. 23). However, in this embodiment, the PSSCH PSD on symbols 2301 and 2302 are different from the PSSCH PSD on symbols 2303-3205, therefore the receiver UE may consider that power offset when decoding the PSSCH.

In one embodiment, $$P_{PSSCH,1} = P_{PSSCH,0} + 10 \times \log_{10}\left(\frac{M_{PSSCH,1}}{M_{PSSCH,0}}\right) + \delta,$$

where: δ can be one parameter configured by higher layer parameter or preconfigured; and $M_{PSSCH,1}$ is the frequency bandwidth size of PSSCH, which can be expressed as the number of resource blocks allocated to PSSCH on each of the symbols where only PSSCH are transmitted (e.g., in the example of FIG. 23, the symbols of 2303, 2304, and 2305).

There may be one of the following sidelink reference signals that are transmitted on sidelink: sidelink DM-RS (dedicated demodulation reference signals) for PSSCH; sidelink DM-RS for PSCCH; sidelink DM-RS for PSFCH; sidelink CSI-RS used for sidelink CSI measurement, for example measuring the CQI, RI, PMI, RSRP of sidelink; and sidelink PT-RS (phase tracking reference signal) that can be used to estimate and compensate phase noise in FR2 system.

For the sidelink DM-RS associated with one PSCCH, the UE can assume the ratio of PSCCH EPRE (energy per resource element) to DM-RS EPRE is given by a predefined value, in one example, 0 dB.

For sidelink DM-RS associated with one PSSCH, the UE can assume the ratio of PSSCH EPRE to DM-RS EPRE is calculated according to the number of DM-RS CDM groups without data, for example given by the following TABLE 7.

TABLE 7

A number of DM-RD CDM groups and configurations

| Number of DM-RS CDM groups without data | DM-RS configuration type 1 | DM-RS configuration type 2 |
|---|---|---|
| 1 | 0 dB | 0 dB |
| 2 | −3 dB | −3 dB |
| 3 | — | −4.77 dB |

For sidelink DM-RS associated with PSFCH, the UE can assume the ratio of PSFCH EPRE to DM-RS EPRE is given by a predefined or preconfigured value, for example 0 dB.

For sidelink PT-RS associated with PSSCH, the UE can assume the ratio of PSSCH EPRE to sidelink PT-RS EPRE is given as a function of number of PSSCH layers, for example as following TABLE 8.

TABLE 8

A number of PSSCH layers

| Configure | The number of PSSCH layers | | | | | |
|---|---|---|---|---|---|---|
| index | 1 | 2 | 3 | 4 | 5 | 6 |
| 0 | 0 | 3 | 4.77 | 6 | 7 | 7.78 |
| 1 | 0 | 0 | 0 | 0 | 0 | 0 |

In TABLE 8, the configure index can be a higher layer parameter or preconfigured parameter.

For the sidelink CSI-RS, the UE can be configured or preconfigured with an EPRE value through a higher layer parameter SL-CSI-RS-Power. In another embodiment, the UE can configured or preconfigured with a power offset with respect to the sidelink SS/PBCH block through a higher layer parameter poweroffset-SL-CSI-RS and configured with EPRE of sidelink SS/PBCH through a higher layer parameter SL-SS-PBCH-BlockPower, and then the UE can derive the EPRE of sidelink CSI-RS according to the parameters poweroffset-SL-CSI-RS and SL-SS-PBCH-BlockPower.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
 a processor configured to determine:
  a first pathloss and a second pathloss,
  a first transmit power for a physical sidelink shared channel (PSSCH) based on the first pathloss and the second pathloss, and
  a second transmit power for the PSSCH based on the first pathloss and the second pathloss; and
 a transceiver, operably connected to the processor, configured to transmit the PSSCH using:
  the first transmit power over a first set of symbols where the transceiver also transmits a physical sidelink control channel (PSCCH), and
  the second transmit power over a second set of symbols where the transceiver only transmits the PSSCH.

2. The UE of claim 1, wherein:
 the transceiver is further configured to receive a first reference signal (RS); and
 the processor is further configured to determine the first pathloss based on the first RS.

3. The UE of claim 1, wherein:
 the transceiver is further configured to:
  transmit a second reference signal (RS), and
  receive a measurement for the second RS; and
 the processor is further configured to determine the second pathloss from the measurement.

4. The UE of claim 3, wherein the measurement is a reference signal received power (RSRP) value.

5. The UE of claim 1, wherein:
 the transceiver is further configured to receive first and second configurations for respective first and second values; and
 the processor is further configured to determine:
  the first transmit power based on the first pathloss scaled by the first value and on the second pathloss scaled by the second value, and
  the second transmit power based on the first pathloss scaled by the first value and on the second pathloss scaled by the second value.

6. The UE of claim 1, wherein:
 the processor is further configured to determine a third transmit power for a PSCCH based on the first pathloss and the second pathloss; and
 the transceiver is further configured to transmit the PSCCH using the third transmit power.

7. The UE of claim 1, wherein the transceiver is further configured to transmit the PSSCH and the PSCCH over the first set of symbols using frequency domain multiplexing.

8. The UE of claim 1, wherein the processor is further configured to determine:
 a type of transmission for the PSSCH and the PSCCH, the type of transmission including a unicast transmission, a groupcast transmission, or a broadcast transmission, and
 the first transmit power and the second transmit based on the type of transmission.

9. The UE of claim 1, wherein:
 the transceiver is further configured to receive a configuration for a power; and
 the processor is further configured to determine the first transmit power and the second transmit power based on the power.

10. The UE of claim 1, wherein the transceiver is further configured to receive a physical sidelink feedback channel (PSFCH) that includes acknowledgement information corresponding to a transport block included in the PSSCH transmission.

11. A method comprising:
 determining:
  a first pathloss and a second pathloss,
  a first transmit power for a physical sidelink shared channel (PSSCH) based on the first pathloss and the second pathloss, and
  a second transmit power for the PSSCH based on the first pathloss and the second pathloss; and
 transmitting the PSSCH using:
  the first transmit power over a first set of symbols that are used for transmitting also a physical sidelink control channel (PSCCH), and
  the second transmit power over a second set of symbols that are used for transmitting only the PSSCH.

12. The method of claim 11, further comprising:
 receiving a first reference signal (RS); and
 determining the first pathloss based on the first RS.

13. The method of claim 11, further comprising:
 transmitting a second reference signal (RS);
 receiving a measurement for the second RS; and
 determining the second pathloss from the measurement.

14. The method of claim 13, wherein the measurement is a reference signal received power (RSRP) value.

15. The method of claim 11, further comprising:
 receiving first and second configurations for respective first and second values; and
 determining:
  the first transmit power based on the first pathloss scaled by the first value and on the second pathloss scaled by the second value, and
  the second transmit power based on the first pathloss scaled by the first value and on the second pathloss scaled by the second value.

16. The method of claim 11, further comprising:
 determining a third transmit power for a PSCCH based on the first pathloss and the second pathloss; and
 transmitting the PSCCH using the third transmit power.

17. The method of claim 11, further comprising transmitting the PSSCH and the PSCCH over the first set of symbols using frequency domain multiplexing.

18. The method of claim 11, further comprising determining:
 a type of transmission for the PSSCH and the PSCCH, the type of transmission including a unicast transmission, a groupcast transmission, or a broadcast transmission, and
 the first transmit power and the second transmit based on the type of transmission.

19. The method of claim 11, further comprising:
  receiving a configuration for a power; and
  determining the first transmit power and the second transmit power based on the power.

20. The method of claim 11, further comprising receiving a physical sidelink feedback channel (PSFCH) that includes acknowledgement information corresponding to a transport block included in the PSSCH transmission.

* * * * *